US012734022B2

(12) United States Patent
Takada et al.

(10) Patent No.: US 12,734,022 B2
(45) Date of Patent: Sep. 15, 2026

(54) DENTURE BASE AND MANUFACTURING METHOD FOR THE SAME

(71) Applicant: KABUSHIKI KAISHA SHOFU, Kyoto (JP)

(72) Inventors: Hajime Takada, Kyoto (JP); Fumio Imahori, Kyoto (JP); Masayoshi Nishizawa, Kyoto (JP); Hidefumi Fujimura, Kyoto (JP); Manabu Fujii, Kyoto (JP)

(73) Assignee: KABUSHIKI KAISHA SHOFU, Kyoto (JP)

( * ) Notice: Subject to any disclaimer, the term of this patent is extended or adjusted under 35 U.S.C. 154(b) by 678 days.

(21) Appl. No.: 18/123,681

(22) Filed: Mar. 20, 2023

(65) Prior Publication Data

US 2023/0301760 A1 Sep. 28, 2023

(30) Foreign Application Priority Data

Mar. 23, 2022 (JP) ................................ 2022-046978
Feb. 6, 2023 (JP) ................................ 2023-016386

(51) Int. Cl.
*A61C 13/01* (2006.01)
*A61C 13/10* (2006.01)
(Continued)

(52) U.S. Cl.
CPC .......... *A61C 13/01* (2013.01); *A61C 13/1003* (2013.01); *B33Y 50/00* (2014.12); *B33Y 80/00* (2014.12)

(58) Field of Classification Search
CPC ..... A61C 13/01; A61C 13/0001; A61C 13/10; A61C 13/1003; B33Y 50/00; B33Y 80/00
(Continued)

(56) References Cited

U.S. PATENT DOCUMENTS 4,194,288 A * 3/1980 Hass .................... A61C 13/097 433/197
4,345,900 A * 8/1982 Katz .................. A61C 13/1013 433/171
(Continued)

FOREIGN PATENT DOCUMENTS

CN 1575783 A * 2/2005 ......... A61C 13/0001
DE 20206315 U1 * 6/2002 ............. A61C 13/01
(Continued)

OTHER PUBLICATIONS

Extended European Search Report issued Jul. 28, 2023 in European Application No. 23163195.3.
(Continued)

*Primary Examiner* — Matthew M Nelson
(74) *Attorney, Agent, or Firm* — Wenderoth, Lind & Ponack, L.L.P.

(57) ABSTRACT

A denture base of the present disclosure includes: a base main body; and a plurality of sockets provided in the base main body and each having a concave shape. The plurality of sockets are provided along a shape of the base main body. The base main body includes a socket partition wall provided between adjacent sockets of the plurality of sockets. The socket partition wall is provided with a groove that communicates with the adjacent sockets each other. The plurality of sockets communicate with each other through the groove.

13 Claims, 34 Drawing Sheets

(51) Int. Cl.
*B33Y 50/00* (2015.01)
*B33Y 80/00* (2015.01)

(58) Field of Classification Search
USPC .......................................................... 433/199.1
See application file for complete search history.

(56) References Cited

U.S. PATENT DOCUMENTS

| | | | | |
|---|---|---|---|---|
| 9,901,429 | B2 * | 2/2018 | Liechtung | A61C 13/0003 |
| 12,274,599 | B2 * | 4/2025 | Grobbee | A61C 8/0048 |
| 2010/0086899 | A1 * | 4/2010 | Holzner | A61C 13/0013<br>433/199.1 |
| 2012/0258426 | A1 * | 10/2012 | Boe | A61C 13/01<br>433/171 |
| 2012/0258430 | A1 * | 10/2012 | Ruppert | A61C 13/10<br>433/199.1 |
| 2016/0100917 | A1 * | 4/2016 | Howe | A61C 13/0004<br>264/16 |
| 2016/0324730 | A1 * | 11/2016 | Lee | A61C 13/0004 |
| 2017/0367798 | A1 * | 12/2017 | Sagolla | A61C 13/0006 |
| 2018/0008384 | A1 * | 1/2018 | Schulter | A61B 6/032 |
| 2018/0147036 | A1 * | 5/2018 | Boehm | A61C 13/01 |
| 2018/0344438 | A1 * | 12/2018 | Boehm | A61C 13/0004 |
| 2019/0090995 | A1 * | 3/2019 | Ruppert | A61C 13/1016 |
| 2019/0105133 | A1 * | 4/2019 | Nakao | A61C 13/01 |
| 2019/0247169 | A1 * | 8/2019 | Fisker | A61C 13/1016 |
| 2019/0336254 | A1 * | 11/2019 | Hasan | A61C 9/0053 |
| 2019/0358004 | A1 * | 11/2019 | Häfele | A61C 13/04 |
| 2019/0388198 | A1 * | 12/2019 | Okumura | A61C 13/1009 |
| 2020/0022790 | A1 * | 1/2020 | Fisker | A61C 13/0024 |
| 2020/0261192 | A1 * | 8/2020 | Hasan | A61C 13/1006 |
| 2020/0390528 | A1 * | 12/2020 | Hasan | B29C 64/40 |
| 2021/0205055 | A1 * | 7/2021 | Slocum, Jr. | A61C 13/26 |
| 2022/0031434 | A1 * | 2/2022 | Fujii | A61C 13/1013 |
| 2022/0096216 | A1 * | 3/2022 | Sato | A61C 13/10 |
| 2022/0233288 | A1 * | 7/2022 | Isobe | A61C 13/1003 |
| 2023/0134818 | A1 * | 5/2023 | Alsina Font | A61C 13/0004<br>433/201.1 |
| 2023/0301760 | A1 * | 9/2023 | Takada | A61C 13/01 |

FOREIGN PATENT DOCUMENTS

| | | | | | |
|---|---|---|---|---|---|
| DE | 102017117491 | A1 | * | 2/2019 | A61C 13/01 |
| EP | 3443932 | A1 | * | 2/2019 | A61C 13/0022 |
| GB | 1388611 | A | * | 3/1975 | A61C 13/04 |
| IL | 41944 | A | * | 12/1977 | A61C 13/06 |
| JP | 2017-18264 | | | 1/2017 | |
| JP | 2018500071 | A | * | 1/2018 | A61C 13/0015 |
| JP | 2018102853 | A | * | 7/2018 | |
| JP | 6522103 | B2 | * | 5/2019 | A61C 13/1016 |
| JP | 2019528997 | A | * | 10/2019 | A61C 13/10 |
| JP | 2021-522892 | | | 9/2021 | |
| JP | 2022054155 | A | * | 4/2022 | A61C 13/1016 |
| JP | 2023143733 | A | * | 10/2023 | |
| JP | 7498442 | B1 | * | 6/2024 | |
| WO | WO-2012061659 | A2 | * | 5/2012 | A61C 13/10 |
| WO | WO-2015194449 | A1 | * | 12/2015 | A61C 13/01 |
| WO | 2018/159507 | | | 9/2018 | |
| WO | WO-2020065305 | A1 | * | 4/2020 | A61C 13/0019 |
| WO | WO-2021101801 | A1 | * | 5/2021 | B33Y 80/00 |
| WO | 2021/144492 | | | 7/2021 | |
| WO | WO-2021144492 | A1 | * | 7/2021 | A61C 9/0046 |
| WO | WO-2021181114 | A1 | * | 9/2021 | A61C 13/01 |

OTHER PUBLICATIONS

Okada, Masatoshi et al., "A Study on Metal Bonding Type of Heat-curing Denture Base Resin-Reinforcing Effect of Co—Cr alloy wired in the Resin Basin", Journal of the Japan Prosthodontic Society, 1985, vol. 29. No. 1, pp. 78-84 (with partial English translation).

Nakahira, Yoshiki et al., "Application of Self-cured 4-META Adhesive Resin Removable Prosthodontic Appliances—Reinforcing Effect of Wire used at Denture Repair", Journal of the Japan Prosthodontic Society, 1986, vol. 30, No. 5, pp. 1190-1197 (with partial English translation).

Nakahira, Yoshiki et al., "Application of Self-curing Type 4-META Adhesive Resin to Removable Prosthodontic Appliances—Reinforcement of Self-cured Type Resin Base Using Co—Cr Alloy Wrought Clasp Wires", Journal of the Japan Prosthodontic Society, 1986, vol. 30, No. 1, pp. 235-241 (with partial English translation).

Miyamoto, Masashi, "Studies on Reinforcement by Affixing Metal Plate Part 2: An Experimental Study on the Upper Full Denture", Journal of ther Japan Prosthodontic Society, 1988, vol. 32, No. 4, pp. 853-859 (with partial English translation).

Imamura, Mototaka et al., "Self-cure Acrylate Resin Reinforced with Glass Fiber Part 1: Bending and Tensile Test", Japanese Journal of Pediatric Dentistry, 1988, vol. 26, No. 2, pp. 328-335 (with partial English translation).

Mitsuo, Sakoh et al., "Effect of Various Reinforcing Materials for Resin Denture Base", Journal of the Japan Prosthodontic Society, 2004, vol. 48, No. 4, pp. 592-601 (with partial English translation).

Nobuaki, Mori et al., "The Effect of Woven Glass Fiber Reinforced Composites on the Transverse Strength of Three Denture Base Resins", Journal of the Japan Prosthodontic Society, 2004, vol. 48, No. 5, pp. 781-786 (with partial English translation).

Hagiwara, Tsuneo, "Current Status of 3D Printing Material and its Future Aspect", Journal of the Imaging Society of Japan, 2015, vol. 54, No. 4, pp. 293-300 (with partial English translation).

Ohkubo, Chikahiro, "Present status and future aspects of CAD/CAM system for removable dentures", Journal of the Japanese Society for Dental Materials and Devices, 2020, vol. 39, No. 1, pp. 55-57 (with partial English translation).

Kanazawa, Manabu, Fabricating Method for Full Dentures Applying CAD/CAM Technology, Ann Jpn Prosthodont Soc, 2013, vol. 5, No. 2, pp. 126-129 (with partial English translation).

* cited by examiner 50
10
20
30
60
37R
67R
36R
66R
35R
65R
34R
64R
33R
63R
32R
62R
31R
61R
31L
61L
32L
62L
33L
63L
34L
64L
35L
65L
36L
66L
37L
67L MESIAL SIDE
DISTAL SIDE
MESIAL SIDE
DISTAL SIDE
LEFT SIDE
RIGHT SIDE
CL1
10
20
30
60
31L
32L
33L
34L
35L
36L
37L
61L
62L
63L
64L
65L
66L
67L
31R
32R
33R
34R
35R
36R
37R
61R
62R
63R
64R
65R
66R
67R START
ST1
ACQUIRE INTRAORAL SCAN DATA
ST2
ARRANGE, IN SCAN DATA, VIRTUAL ARTIFICIAL TOOTH DATA INCLUDING PLURALITY OF VIRTUAL ARTIFICIAL TEETH CONNECTED TO ONE ANOTHER
ST3
CREATE DENTURE BASE DATA BY FORMING VIRTUAL GINGIVA PORTION BASED ON SCAN DATA IN WHICH VIRTUAL ARTIFICIAL TOOTH DATA IS ARRANGED
ST4
PRODUCE DENTURE BASE BASED ON DENTURE BASE DATA
END

<COMPARATIVE EXAMPLE 1>

<COMPARATIVE EXAMPLE 1>

<EXAMPLE 1>

<EXAMPLE 1>

<COMPARATIVE EXAMPLE 1>

<EXAMPLE 1>

<COMPARATIVE EXAMPLE 1>

<EXAMPLE 1>

<COMPARATIVE EXAMPLE 1>

<EXAMPLE 1>

<COMPARATIVE EXAMPLE 1>

<EXAMPLE 1>

DENTURE BASE AND MANUFACTURING METHOD FOR THE SAME

CROSS REFERENCE TO RELATED APPLICATION

This application claims benefit of priority to Japanese Patent Application 2022-046978, filed Mar. 23, 2022 and Japanese Patent Application 2023-016386, filed Feb. 6, 2023, the entire content of which is incorporated herein by reference.

BACKGROUND

Technical Field

The present disclosure relates to a denture base and a manufacturing method for the same.

Background Art

Masatoshi Okada et al., "A Study on Metal Bonding Type of Heat-curing Denture Base Resin—Reinforcing Effect of Co—Cr alloy wires in the Resin Base—", the Journal of the Japan Prosthodontic Society, 1985, Vol. 29, No. 1, p. 78-84, Yoshiki Nakahira et al., "Application of Self-cured 4-META Adhesive Resin Removable Prosthodontic Appliances—Reinforcing Effect of Wire used at Denture Repair—", the Journal of the Japan Prosthodontic Society, 1986, Vol. 30, No. 5, p. 1190-1197, Yoshiki Nakahira et al., "Application of Self-curing Type 4-META Adhesive Resin to Removable Prosthodontic Appliances—Reinforcement of Self-cured Type Resin Base Using Co—Cr Alloy Wrought Clasp Wires—", the Journal of the Japan Prosthodontic Society, 1986, Vol. 30, No. 1, p. 235-241, Masashi Miyamoto, "Studies on Reinforcement by Affixing Metal Plate Part 2. An Experimental Study on the Upper Full Denture", the Journal of the Japan Prosthodontic Society, 1988, Vol. 32, No. 4, p. 853-859, Mototaka Imamura et al., "Self-cure Dental Acrylate Resin Reinforced with Glass Fiber Part 1: Bending and Tensile Test", the Japanese Journal of Pediatric Dentistry, 1988, Vol. 26, No. 2, p. 328-335, Sakoh Mitsuo et al., "Effect of Various Reinforcing Materials for Resin Denture Base", the Journal of the Japan Prosthodontic Society, 2004, Vol. 48, No. 4, p. 592-601, and Mori Nobuaki et al., "The Effect of Woven Glass Fiber Reinforced Composites on the Transverse Strength of Three Denture Base Resins", the Journal of the Japan Prosthodontic Society, 2004, Vol. 48, No. 5, p. 781-786 examine whether a reinforcing effect is obtained in a denture by devises of embedding a commercially available reinforcing material into a PMMA resin or attaching a metal plate to a denture surface. These studies have found that a reinforcing effect can be obtained in a denture by embedding a reinforcing material into a metal adhesive resin.

Meanwhile, in recent years, a manufacturing technology for a denture by a CAD/CAM method has been developed. As disclosed in Tsuneo HAGIWARA, "Current Status of 3D Printing Material and its Future Aspect", Journal of the Imaging Society of Japan, 2015, Vol. 54, No. 4, p. 293-300, Chikahiro OHKUBO, "Present status and future aspects of CAD/CAM system for removable dentures", the Journal of the Japanese Society for Dental Materials and Devices, 2020, Vol. 39, No. 1, p. 55-57, and Manabu Kanazawa, "Fabricating Method for Full Dentures Applying CAD/CAM Technology", Ann Jpn Prosthodont Soc, 2013, Vol. 5, No. 2, p. 126-129, the development of denture manufacturing technology by a 3D printer is remarkable, and a denture having excellent dimensional accuracy and surface property can be manufactured.

JP 2021-522892 A discloses a 3D printing method for a denture having excellent dimensional accuracy and surface property. In JP 2017-18264 A and WO 2018/159507 A, denture base data is created on the basis of occlusion data obtained from a patient, a denture base is shaped by milling or 3D printing, and an artificial tooth is bonded to a socket portion of the denture base to produce a plate denture. Due to this, efficiency and standardization of denture production are achieved.

Dentures are mainly produced by a resin cast method in which a dental technician performs work model production and articulator attachment after a dentist performs impression taking and bite taking. In dentures produced by the resin cast method, the denture base is often an acrylic resin, and thus a denture user may unexpectedly drop the acrylic resin denture or may damage the denture due to occlusion or the like.

In response to the above-described problem, as disclosed in Masatoshi Okada et al. "A Study on Metal Bonding Type of Heat-curing Denture Base Resin-Reinforcing Effect of Co—Cr alloy wires in the Resin Base—", the Journal of the Japan Prosthodontic Society, 1985, Vol. 29, No. 1, p. 78-84, Yoshiki Nakahira et al., "Application of Self-cured 4-META Adhesive Resin Removable Prosthodontic Appliances-Reinforcing Effect of Wire used at Denture Repair—", the Journal of the Japan Prosthodontic Society, 1986, Vol. 30, No. 5, p. 1190-1197, Yoshiki Nakahira et al., "Application of Self-curing Type 4-META Adhesive Resin to Removable Prosthodontic Appliances-Reinforcement of Self-cured Type Resin Base Using Co—Cr Alloy Wrought Clasp Wires—", the Journal of the Japan Prosthodontic Society, 1986, Vol. 30, No. 1. p. 235-241, Masashi Miyamoto, "Studies on Reinforcement by Affixing Metal Plate Part 2. An Experimental Study on the Upper Full denture", the Journal of the Japan Prosthodontic Society, 1988, Vol. 32, No. 4, p. 853-859, Mototaka Imamura et al., "Self-cure Dental Acrylate Resin Reinforced with Glass Fiber Part 1: Bending and Tensile Test", the Japanese Journal of Pediatric Dentistry, 1988, Vol. 26, No. 2, p. 328-335, Sakoh Mitsuo et al., "Effect of Various Reinforcing Materials for Resin Denture Base", the Journal of the Japan Prosthodontic Society, 2004, Vol. 48, No. 4, p. 592-601, and Mori Nobuaki et al., "The Effect of Woven Glass Fiber Reinforced Composites on the Transverse Strength of Three Denture Base Resins", the Journal of the Japan Prosthodontic Society, 2004, Vol. 48, No. 5, p. 781-786, an attempt is made, in clinical practice, to reinforce the denture by embedding a reinforcing material such as metal or glass fiber into the denture base.

However, embedding the reinforcing material into the denture base has problems such as complication of work and visible color tone of the reinforcing material that impairs aesthetics.

On the other hand, as disclosed in Tsuneo HAGIWARA, "Current Status of 3D Printing Material and its Future Aspect", Journal of the Imaging Society of Japan, 2015, Vol. 54, No. 4, p. 293-300, Chikahiro OHKUBO, "Present status and future aspects of CAD/CAM system for removable dentures", the Journal of the Japanese Society for Dental Materials and Devices, 2020, Vol. 39, No. 1, p. 55-57, and Manabu Kanazawa, "Fabricating Method for Full dentures Applying CAD/CAM Technology", Ann Jpn Prosthodont Soc, 2013, Vol. 5, No. 2, p. 126-129, the development of denture manufacturing technology by a 3D printer is remarkable, and a denture having excellent dimensional accuracy and surface property can be produced.

JP 2021-522892 A discloses a 3D printing method for a denture having excellent dimensional accuracy and surface property. JP 2017-18264 A and WO 2018/159507 A disclose production of a denture by 3D printing.

However, the stereolithographic resin used in 3D printing has a problem in toughness. At present, there is a case where the toughness of the stereolithographic resin does not have performance that can be used in a final product, and thus there is a risk that a denture produced by 3D printing is also broken due to dropping or the like similarly to a denture produced by the resin cast method.

Tsuneo HAGIWARA, "Current Status of 3D Printing Material and its Future Aspect", Journal of the Imaging Society of Japan, 2015, Vol. 54, No. 4, p. 293-300, Chikahiro OHKUBO, "Present status and future aspects of CAD/CAM system for removable dentures", the Journal of the Japanese Society for Dental Materials and Devices, 2020, Vol. 39, No. 1, p. 55-57, and Manabu Kanazawa, "Fabricating Method for Full dentures Applying CAD/CAM Technology", Ann Jpn Prosthodont Soc, 2013, Vol. 5, No. 2, p. 126-129, and JP 2021-522892 A, JP 2017-18264 A, and WO 2018/159507 A do not disclose strength and problems of dentures manufactured by 3D printing.

Therefore, the present inventors have intensively studied with focus on the problem of improving the strength of a denture produced by 3D printing. As a result, the present inventors have studied a denture base in which a plurality of sockets where a plurality of artificial teeth are arranged are communicated, and have found that the strength of the denture can be improved by producing a denture using the denture base. Specifically, the present inventors have found a structure of a denture base in which a plurality of sockets communicate with each other via a groove by providing the groove in a socket partition wall provided between adjacent sockets. The plurality of sockets communicate with each other through the groove, whereby an adhesive for bonding the denture base and the plurality of artificial teeth is continuously disposed over the plurality of sockets. Due to this, the adhesive is continuously disposed over the plurality of sockets, whereby the strength of the denture can be improved by the adhesive.

SUMMARY OF THE INVENTION

An object of the present disclosure is to provide a denture base in which a continuous adhesive can be disposed over a plurality of sockets, and a manufacturing method for the denture base.

A denture base according to one aspect of the present disclosure includes:

- a base main body; and
- a plurality of sockets provided in the base main body and having a concave shape, wherein
  - the plurality of sockets are provided along a shape of the base main body,
  - the base main body includes a socket partition wall provided between adjacent sockets among the plurality of sockets,
  - the socket partition wall is provided with a groove that communicates with the adjacent sockets each other, and
  - the plurality of sockets communicate with each other through the groove.

A manufacturing method for a denture base according to one aspect of the present disclosure is a manufacturing method for a denture base to be executed by a computer, the method including:

- acquiring intraoral scan data;
- arranging, in the scan data, virtual artificial tooth data including a plurality of interconnected virtual artificial teeth; and
- creating denture base data by forming a virtual gingiva portion on a basis of the scan data in which the virtual artificial tooth data is arranged, in which
- the denture base includes
- a base main body, and
- a plurality of sockets provided in the base main body and having a concave shape,
  - the plurality of sockets are provided along a shape of the base main body,
  - the base main body includes a socket partition wall provided between adjacent sockets among the plurality of sockets,
  - the socket partition wall is provided with a groove that communicates with the adjacent sockets each other, and
  - the plurality of sockets communicate with each other through the groove.

According to the present disclosure, a denture base in which a continuous adhesive can be disposed over a plurality of sockets, and a manufacturing method for the denture base are provided.

DETAILED DESCRIPTION

Figure 1:
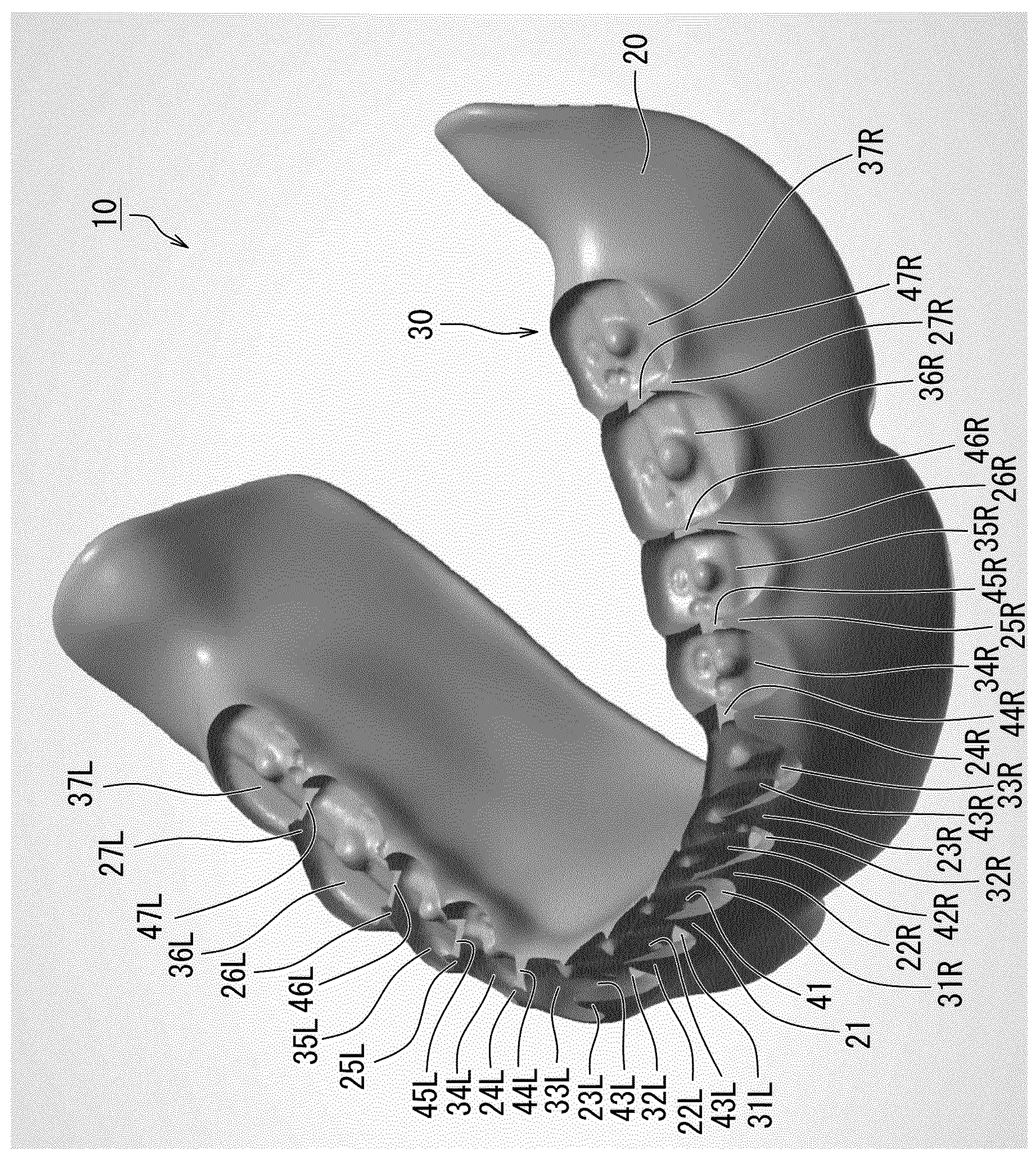
FIG. 1 is a perspective view of a denture base of a first embodiment according to the present disclosure.

Hereinafter, one aspect of the present disclosure will be described.

A plate denture of one aspect of the present disclosure is produced by bonding, with an adhesive, a plurality of artificial teeth to a denture base shaped on the basis of denture base data. The denture base has a plurality of sockets into which the plurality of artificial teeth are fitted. In a part of the socket, at least six or more adjacent sockets are continuously formed, and the adhesive applied to the continuous sockets is continuously formed in a seamless manner. That is, unlike the conventional denture base, the denture base has sockets that are partially or entirely continuous.

The plate denture is provided with a groove in an adjacent surface between the adjacent sockets, and a portion corresponding to the coronal papilla is not formed by the denture base. On the other hand, on the labial and the lingual of the denture other than the adjacent surface, the coronal papilla is formed by the denture base, which is excellent in terms of aesthetics.

Conventionally, when artificial teeth are arrayed in denture production, it is considered that when a depth of a socket (a height of an adjacent surface of the socket with the adjacent teeth) for holding the artificial teeth is larger, the artificial teeth are easily held, and a thickness of the adhesive for bonding the artificial teeth and the denture base becomes uniform, and therefore adhesion strength between the artificial teeth and the denture base is improved. However, in the configuration of the denture base of one aspect of the present disclosure, the adhesive layer coupled with the adjacent teeth is formed by continuously forming the plurality of sockets, that is, by forming the adjacent surface of the socket with the adjacent teeth together with the basal surface, or by forming the adjacent surface of the socket with the adjacent teeth shallow, that is, by forming the height of the adjacent surface of the socket with the adjacent teeth low. Due to this, the strength of the plate denture can be improved.

A manufacturing method for a plate denture of one aspect of the present disclosure is to produce a single ready-made artificial tooth adhesive type 3D print denture. The manufacturing method for a plate denture can produce a reinforced 3D print denture and the like obtained by production by bonding single ready-made artificial teeth to a denture base with a continuous adhesive. A plate denture of one aspect of the present disclosure is also called a reinforcement denture. In the reinforcement denture, for example, by forming the shape of the adhesive into a continuous wave shape and a U shape, broken due to dropping is less likely to occur as compared with a conventional ready-made artificial tooth adhesive type 3D print denture. Since the reinforcement denture does not use a commercially available reinforcing material, the reinforcing work does not become complicated, and aesthetics is not deteriorated due to the color tone of the reinforcing material.

The plurality of artificial teeth used in the plate denture of one aspect of the present disclosure may be either single artificial teeth or coupled artificial teeth. The single artificial teeth exhibits a particularly excellent reinforcing effect. In particular, a particularly preferable reinforcing effect is exhibited in a plate denture in which single artificial teeth are arranged in two or more adjacent sockets.

A plate denture of one aspect of the present disclosure is a single ready-made artificial tooth adhesive type 3D print denture, and includes a denture base to which at least two or more sockets into which the single ready-made artificial teeth are incorporated are connected. In the site to which the socket is connected, the single ready-made artificial teeth and the denture base are bonded by a continuous adhesive. 14 sockets may be connected, or the adhesive may extend to the denture base rear edge. The single ready-made artificial tooth adhesive type 3D print denture refers to a denture including single ready-made artificial teeth, an adhesive, and a 3D print denture base.

The height of the connection between the sockets can be expressed as a relative ratio in a case where the basal surface (extension line of the basal surface) of the socket is 0 and the height to the portion (contact point) where the adjacent surfaces of the artificial teeth come into contact with each other is 100 in the cross-sectional direction (perpendicular direction) of the connection. In the plate denture, in the cross-sectional direction of the connection of the socket, when the intersection of the cross section of the connection of the socket and the extension line of the basal surface of the socket is a reference point, and the height from the reference point to a contact point between adjacent surfaces of the artificial teeth is 100, the height of the connection between adjacent sockets from the reference point is preferably 20 or less, particularly preferably 10 or less, and more preferably 5 or less. In the conventional denture production, the height of the adjacent surfaces of the sockets is substantially the same (95 or more) as the height in which the adjacent surfaces of the artificial teeth are in contact with each other.

Here, a measurement method for the height of the connection between the sockets is optional, and a method using general-purpose CAD software is considered as an example. First, the shape data of the denture base and the shape data of the artificial teeth are read into the general-purpose CAD software, and a point is arranged at a position of an adjacent surface contact point between the artificial teeth. The arranged point is perpendicularly moved toward the basal surface, a point is arranged at the intersection with the extension line of the basal surface, and an interval from the adjacent surface contact point is measured. This interval is defined as 100. Next, a perpendicular line is extended toward the basal surface at the adjacent surface contact point between the adjacent artificial teeth (in the cross-sectional direction of the connection) at the connection between the sockets in the created denture base, and an interval between points at which a tangent line of the basal surface perpendicularly intersects is measured. Then, assuming that the height of the adjacent surface contact point of the artificial teeth is 100, the value of the height of the connection between the sockets is calculated.

The adhesive layer used for bonding the plurality of artificial teeth to the denture base is continuously disposed on the adjacent sockets via the connection. It is preferable that the adhesive layer has a wave shape when viewed from the side surface, and has a U shape when viewed from the upper surface and the lower surface. The continuous adhesive layer may be disposed continuously on two or more sockets, or six or more sockets may be disposed continuously. The adhesive layer may be disposed in connection with the 14 sockets. Due to this, the plate denture is reinforced by the continuous adhesive layer.

The adhesive may be a dental resin having adhesiveness with the single ready-made artificial teeth and the denture base. A powder-liquid mixture type autopolymer resin is preferable. However, a casting resin, a heat-curing resin, or a photopolymerization resin may be used.

The position of the artificial teeth of the reinforcement denture may be a position where the artificial teeth are arrayed in a patient-specific positional relationship, or may be a position where a standard dentition is reproduced. The standard dentition refers to a dentition standardized from information on an average value of positions where human teeth have grown.

The reinforcement denture can also be used as a partial denture. When used as a partial denture, it is preferable that the reinforcement denture includes a first requirement of being an abutment device, a second requirement of being an adjacent surface plate, a third requirement of being a coupler, a fourth requirement of being artificial teeth, a fifth requirement of being a denture base having at least two or more sockets to which single ready-made artificial teeth are incorporated are connected, and a sixth requirement of being an adhesive for bonding the single ready-made artificial teeth and the denture base. The first requirement, the second requirement, or the third requirement need not be included in the constituent elements from the viewpoint of simplification of design, but when all of the first through sixth requirements are included, the denture is excellent in functionality.

First Embodiment (Denture Base)

A denture base of the first embodiment according to the present disclosure will be described. In the present embodiment, a plate denture base produced using CAD/CAM technology, in particular, a full denture base produced using 3D printing technology will be described.

Figure 2:
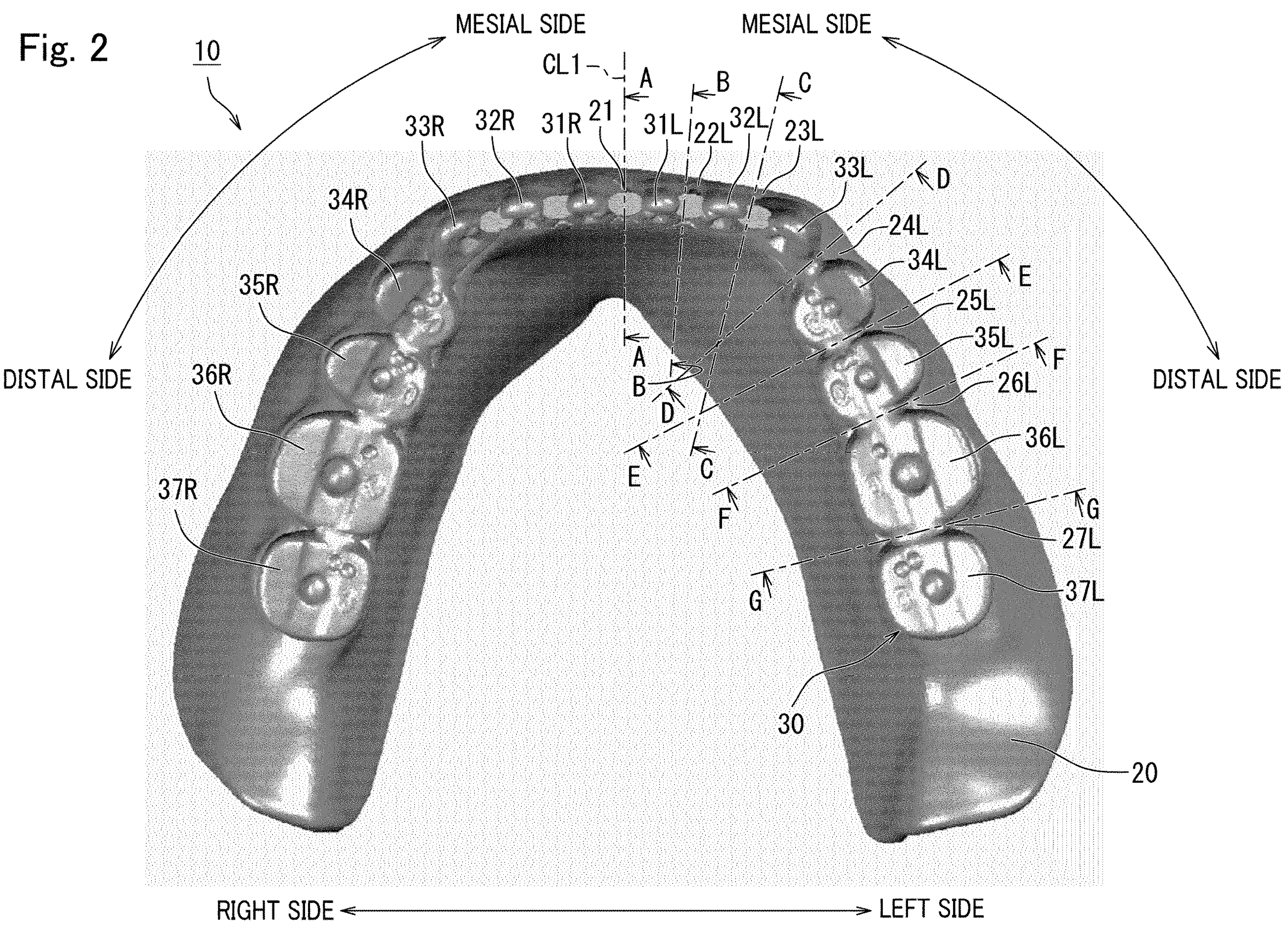
FIG. 2 is a plan view of the denture base of the first embodiment according to the present disclosure.

FIG. 1 is a perspective view of the denture base of the first embodiment according to the present disclosure. FIG. 2 is a plan view of the denture base of the first embodiment according to the present disclosure. As illustrated in FIGS. 1 and 2, a denture base 10 includes a base main body 20 and a plurality of sockets 30 provided in the base main body 20. The denture base 10 illustrated in FIGS. 1 and 2 illustrates a mandibular full denture base.

The base main body 20 is a main body portion of the denture base 10, and is a portion where a plurality of artificial teeth are arranged. The base main body 20 is a portion that is disposed on an oral mucosa of the patient and in contact with the gingiva. The base main body 20 has a shape corresponding to the intraoral shape of the patient.

In the present embodiment, the denture base 10 is a full denture base, and the base main body 20 has a dental arch shape. As illustrated in FIG. 2, the base main body 20 has, for example, a U shape. The base main body 20 has a bilaterally symmetrical shape with respect to a center line CL1. The center line CL1 is a center line of the base main body 20. In the base main body 20, a side close to the center line CL1 is called a "mesial side", and a side far from the center line CL1 is called a "distal side". In the base main body 20, the left side and the right side of the base main body 20 are defined with reference to the center line CL1.

The base main body 20 is provided with the plurality of sockets 30. The plurality of sockets 30 have a concave shape. The plurality of sockets 30 are holes or recesses in which the plurality of artificial teeth are arranged. Each of the plurality of sockets 30 has a concave shape corresponding to the shape of the artificial tooth. In other words, the plurality of sockets 30 are concave portions in which the plurality of artificial teeth are arranged.

The plurality of sockets 30 are provided along the shape of the base main body 20 (i.e., along the length, or longitudinal extent, of the base main body 20). In the present embodiment, the plurality of sockets 30 are provided side by side in a U shape.

The plurality of sockets 30 include first to seventh sockets 31L and 31R to 37L and 37R on both left and right sides of the base main body 20 with reference to the center line CL1. In the reference signs "31L and 31R to 37L and 37W" indicating the first to seventh sockets, "L" means the left side, and "R" means the right side. For example, the reference sign "31L" denotes the first socket provided on the left side of the base main body 20, and the reference sign "31W" denotes the first socket provided on the right side of the base main body 20.

The first sockets 31L and 31R are provided near the center line CL1 of the base main body 20. Specifically, the first sockets 31L and 31R are provided on the left and right sides of the base main body 20 across the center line CL1 of the base main body 20. The first sockets 31L and 31R are adjacent to each other. Artificial teeth of central incisors are arranged in the first sockets 31L and 31R. Therefore, the first sockets 31L and 31R have a concave shape corresponding to the shape of the basal surface of the artificial tooth of the central incisor.

The second sockets 32L and 32R are provided on the distal side of the base main body 20 relative to the first sockets 31L and 31R. The second socket 32L is provided on the left side of the base main body 20 on the distal side relative to the first socket 31L, and is adjacent to the first socket 31L. The second socket 32R is provided on the right side of the base main body 20 on the distal side relative to the first socket 31R, and is adjacent to the first socket 31R. Artificial teeth of lateral incisors are arranged in the second sockets 32L and 32R. Therefore, the second sockets 32L and 32R have a concave shape corresponding to the shape of the basal surface of the artificial tooth of the lateral incisor.

The third sockets 33L and 33R are provided on the distal side of the base main body 20 relative to the second sockets 32L and 32R. The third socket 33L is provided on the left side of the base main body 20 on the distal side relative to the second socket 32L, and is adjacent to the second socket 32L. The third socket 33R is provided on the right side of the base main body 20 on the distal side relative to the second socket 32R, and is adjacent to the second socket 32R. Artificial teeth of lateral incisors are arranged in the third sockets 33L and 33R. Therefore, the third sockets 33L and 33R have a concave shape corresponding to the shape of the basal surface of the artificial tooth of a canine tooth.

The fourth sockets 34L and 34R are provided on the distal side of the base main body 20 relative to the third sockets 33L and 33R. The fourth socket 34L is provided on the left side of the base main body 20 on the distal side relative to the third socket 33L, and is adjacent to the third socket 33L. The fourth socket 34R is provided on the right side of the base main body 20 on the distal side relative to the third socket 33R, and is adjacent to the third socket 33R. Artificial teeth of first premolars are arranged in the fourth sockets 34L and 34R. Therefore, the fourth sockets 34L and 34R have a concave shape corresponding to the shape of the basal surface of the artificial tooth of the first premolar.

The fifth sockets 35L and 35R are provided on the distal side of the base main body 20 relative to the fourth sockets 34L and 34R. The fifth socket 35L is provided on the left side of the base main body 20 on the distal side relative to the fourth socket 34L, and is adjacent to the fourth socket 34L. The fifth socket 35R is provided on the right side of the base main body 20 on the distal side relative to the fourth socket 34R, and is adjacent to the fourth socket 34R. Artificial teeth of second premolars are arranged in the fifth sockets 35L and 35R. Therefore, the fifth sockets 35L and 35R have a concave shape corresponding to the shape of the basal surface of the artificial tooth of the second premolar.

The sixth sockets 36L and 36R are provided on the distal side of the base main body 20 relative to the fifth sockets 35L and 35R. The sixth socket 36L is provided on the left side of the base main body 20 on the distal side of the fifth socket 35L, and is adjacent to the fifth socket 35L. The sixth socket 36R is provided on the right side of the base main body 20 on the distal side relative to the fifth socket 35R, and is adjacent to the fifth socket 35R. Artificial teeth of first molars are arranged in the sixth sockets 36L and 36R. Therefore, the sixth sockets 36L and 36R have a concave shape corresponding to the shape of the basal surface of the artificial tooth of the first molar.

The seventh sockets 37L and 37R are provided on the distal side of the base main body 20 relative to the sixth sockets 36L and 36R. The seventh socket 37L is provided on the left side of the base main body 20 on the distal side of the sixth socket 36L, and is adjacent to the sixth socket 36L. The seventh socket 37R is provided on the right side of the base main body 20 on the distal side relative to the sixth socket 36R, and is adjacent to the sixth socket 36R. Artificial teeth of second molars are arranged in the seventh sockets 37L and 37R. Therefore, the seventh sockets 37L and 37R have a concave shape corresponding to the shape of the basal surface of the artificial tooth of the second molar.

The base main body 20 includes first to seventh socket partition walls 21 to 27L and 27R provided between adjacent sockets among the plurality of sockets 30. In the reference signs "22L and 22R to 27L and 27R" indicating the second to seventh socket partition walls, "L" means the left side, and "R" means the right side. For example, the reference sign "22L" denotes the second socket partition wall provided on the left side of the base main body 20, and the reference sign "22W" denotes the second socket partition wall provided on the right side of the base main body 20.

The first to seventh socket partition walls 21 to 27L and 27R are parts of walls defining the first to seventh sockets 31L and 31R to 37L and 37R, and separate adjacent sockets from each other. The first to seventh socket partition walls 21 to 27L and 27R extend in a direction intersecting with the direction in which the sockets are adjacent to each other.

The first socket partition wall 21 is provided at the center of the base main body 20. The first socket partition wall 21 is provided between the two first sockets 31L and 31R provided across the center line CL1 of the base main body 20.

The second socket partition walls 22L and 22R are provided between the first sockets 31L and 31R and the second sockets 32L and 32R on both the left and right sides of the base main body 20, respectively. The second socket partition wall 22L is provided between the first socket 31L and the second socket 32L on the left side of the base main body 20. The second socket partition wall 22R is provided between the first socket 31R and the second socket 32R on the right side of the base main body 20.

The third socket partition walls 23L and 23R are provided between the second sockets 32L and 32R and the third sockets 33L and 33R on both the left and right sides of the base main body 20, respectively. The third socket partition wall 23L is provided between the second socket 32L and the third socket 33L on the left side of the base main body 20. The third socket partition wall 23R is provided between the second socket 32R and the third socket 33R on the right side of the base main body 20.

The fourth socket partition walls 24L and 24R are provided between the third sockets 33L and 33R and the fourth sockets 34L and 34R on both the left and right sides of the base main body 20, respectively. The fourth socket partition wall 24L is provided between the third socket 33L and the fourth socket 34L on the left side of the base main body 20. The fourth socket partition wall 24R is provided between the third socket 33R and the fourth socket 34R on the right side of the base main body 20.

The fifth socket partition walls 25L and 25R are provided between the fourth sockets 34L and 34R and the fifth sockets 35L and 35R on both the left and right sides of the base main body 20, respectively. The fifth socket partition wall 25L is provided between the fourth socket 34L and the fifth socket 35L on the left side of the base main body 20. The fifth socket partition wall 25R is provided between the fourth socket 34R and the fifth socket 35R on the right side of the base main body 20.

The sixth socket partition walls 26L and 26R are provided between the fifth sockets 35L and 35R and the sixth sockets 36L and 36R on both the left and right sides of the base main body 20, respectively. The sixth socket partition wall 26L is provided between the fifth socket 35L and the sixth socket 36L on the left side of the base main body 20. The sixth socket partition wall 26R is provided between the fifth socket 35R and the sixth socket 36R on the right side of the base main body 20.

The seventh socket partition walls 27L and 27R are provided between the sixth sockets 36L and 36R and the seventh sockets 37L and 37R on both the left and right sides of the base main body 20, respectively. The seventh socket partition wall 27L is provided between the sixth socket 36L and the seventh socket 37L on the left side of the base main body 20. The seventh socket partition wall 27R is provided between the sixth socket 36R and the seventh socket 37R on the right side of the base main body 20.

The first to seventh socket partition walls 21 to 27L and 27R are provided with first to seventh grooves 41 to 47L and 47R through which adjacent sockets communicate. In the reference signs "42L and 42R to 47L and 47W" indicating the second to seventh grooves, "L" means the left side, and "R" means the right side. For example, the reference sign "42L" denotes the second groove provided in the second socket partition wall 22L on the left side of the base main body 20, and the reference sign "42W" denotes the second groove provided in the second socket partition wall 22R on the right side of the base main body 20.

The first groove 41 is provided in the first socket partition wall 21, and allows the adjacent two first sockets 31L and 31R to communicate with each other. The second grooves 42L and 42R are provided in the second socket partition walls 22L and 22R, and allow the first sockets 31L and 31R to communicate with the second sockets 32L and 32R. The third grooves 43L and 43R are provided in the third socket partition walls 23L and 23R, and allow the second sockets 32L and 32R to communicate with the third sockets 33L and 33R. The fourth grooves 44L and 44R are provided in the fourth socket partition walls 24L and 24R, and allow the third sockets 33L and 33R to communicate with the fourth sockets 34L and 34R. The fifth grooves 45L and 45R are provided in the fifth socket partition walls 25L and 25R, and allow the fourth sockets 34L and 34R to communicate with the fifth sockets 35L and 35R.

In this manner, the first to seventh sockets 31L and 31R to 37L and 37R communicate with each other through the first to seventh grooves 41 to 47L and 47R. Due to this, when the plurality of artificial teeth are bonded to the first to seventh sockets 31L and 31R to 37L and 37R with the adhesive, the adhesive is continuously disposed on the first to seventh sockets 31L and 31R to 37L and 37R via the first to seventh grooves 41 to 47L and 47R. That is, the adhesive is continuously disposed over the first to seventh sockets 31L and 31R to 37L and 37R in a seamless manner.

A detailed structure of the sixth groove 46L will be described with reference to FIG. 3. The structures of the first to fifth and seventh grooves 41 to 45L and 47L are basically similar to the structure of the sixth groove 46L.

Figure 3:
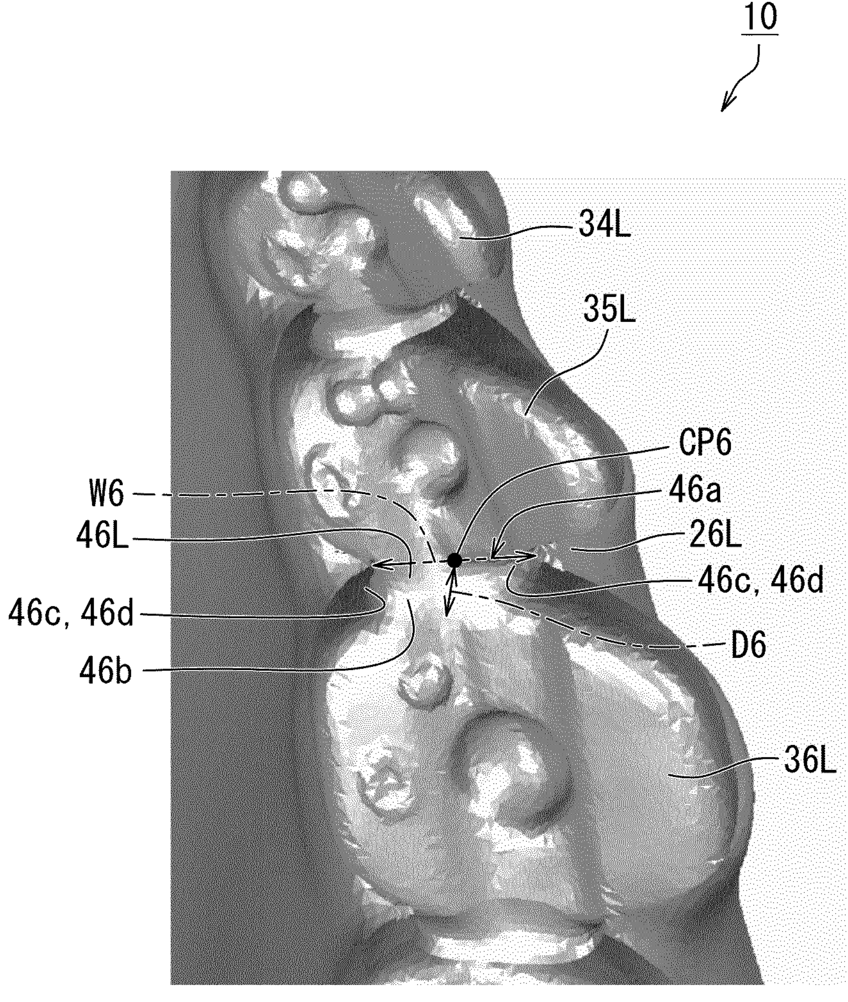
FIG. 3 is a partially enlarged perspective view of the denture base of the first embodiment according to the present disclosure.

FIG. 3 is a partially enlarged perspective view of the denture base of the first embodiment according to the present disclosure. FIG. 3 is an enlarged perspective view of a part provided with the fifth socket 35L and the sixth socket 36L. As illustrated in FIG. 3, the sixth socket partition wall 26L is provided between the fifth socket 35L and the sixth socket 36L. The sixth socket partition wall 26L is provided with the sixth groove 46L. The sixth groove 46L is defined by a bottom surface 46*b* and two side walls 46*c* extending from the bottom 46*b* facing each other. An opening 46*a* is defined by a region sandwiched between the two side walls 46*c* when the sixth groove 46L is viewed from the depth direction. As can be seen in FIGS. 1-3, a bottom surface 46*b* of the groove 46L is higher in a depth direction than the basal (bottom) surface of the adjacent fifth socket 35L and the sixth socket 36L.

The two side walls 46*c* have inclined walls 46*d* inclined in a direction in which the distance between the two side walls 46*c* increases from the bottom 46*b* toward the opening 46*a*. The inclined wall 46*d* is inclined in a direction in which a width W6 of the sixth groove 46L widens.

When viewed from the depth direction of the sixth groove 46L, the opening 46*a* of the sixth groove 46L is larger than the bottom 46*b*.

The thickness of the sixth socket partition wall 26L decreases toward the sixth groove 46L. Specifically, the thickness of the sixth socket partition wall 26L decreases continuously toward the sixth groove 46L. That is, the sixth socket partition wall 26L has a shape tapered toward the direction in which the two side walls 46*c* defining the sixth groove 46L face each other.

(Plate Denture)

Figure 4:
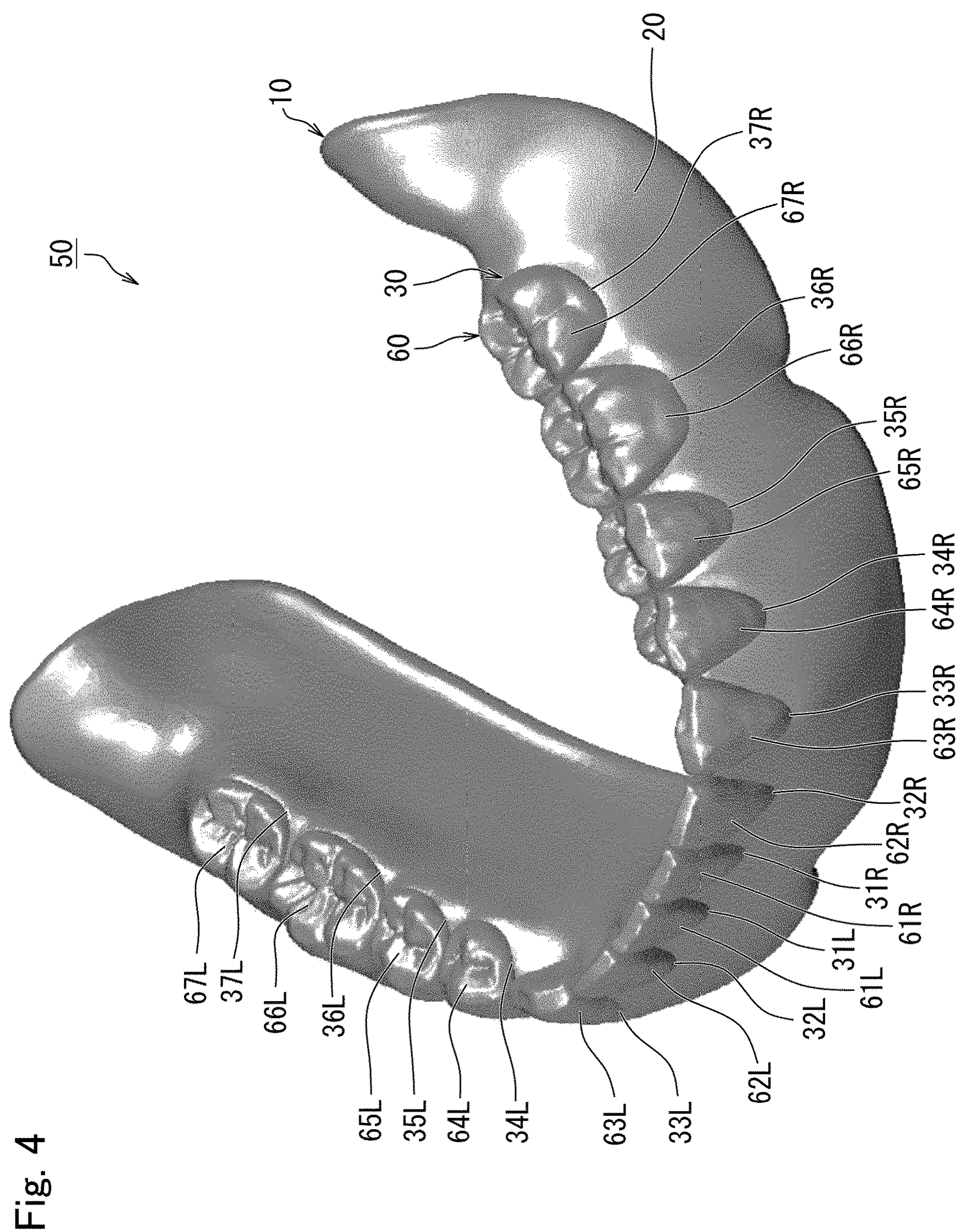
FIG. 4 is a perspective view of a plate denture of the first embodiment according to the present disclosure.
Figure 5:
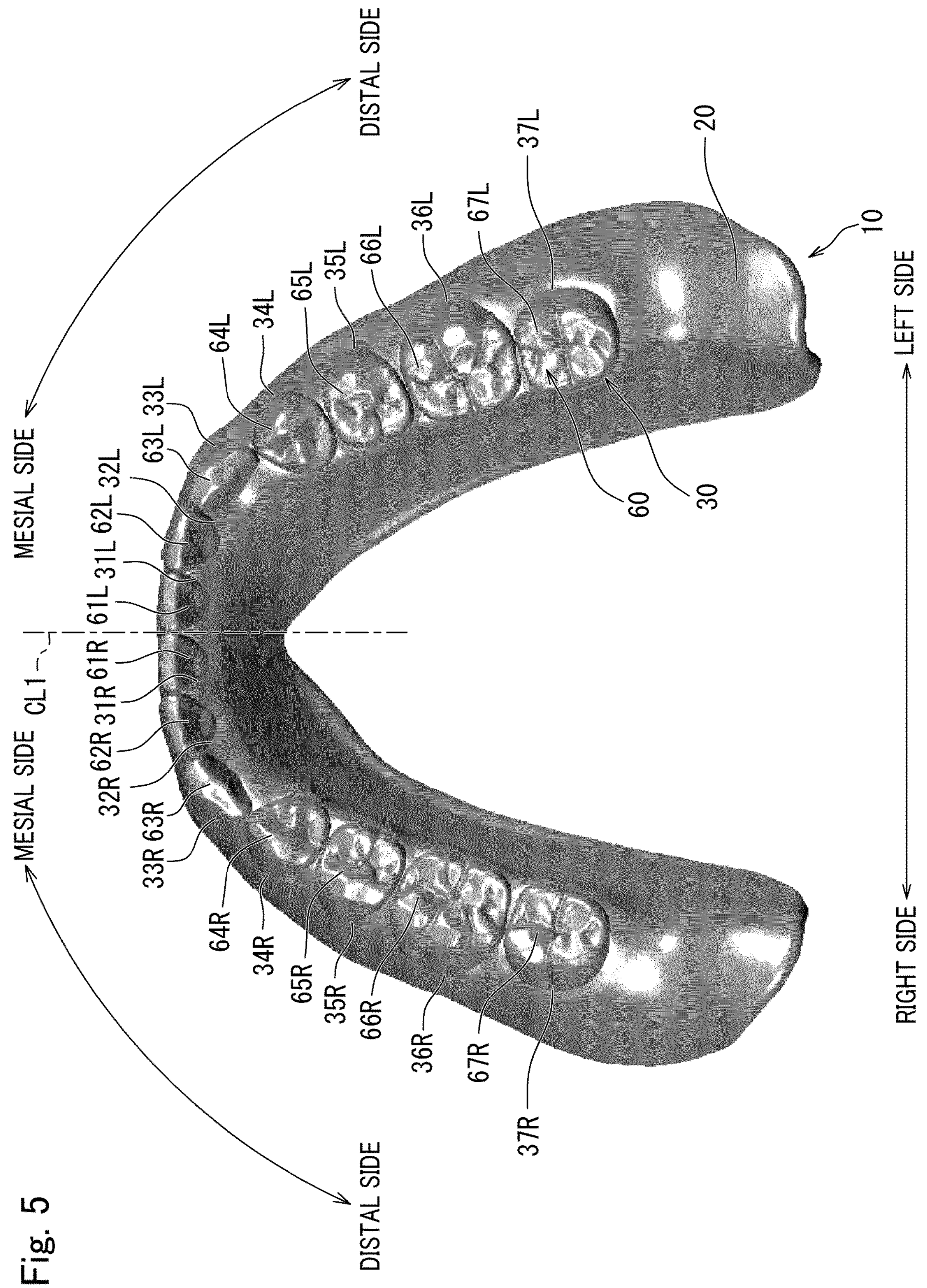
FIG. 5 is a plan view of the plate denture of the first embodiment according to the present disclosure.
Figure 6:
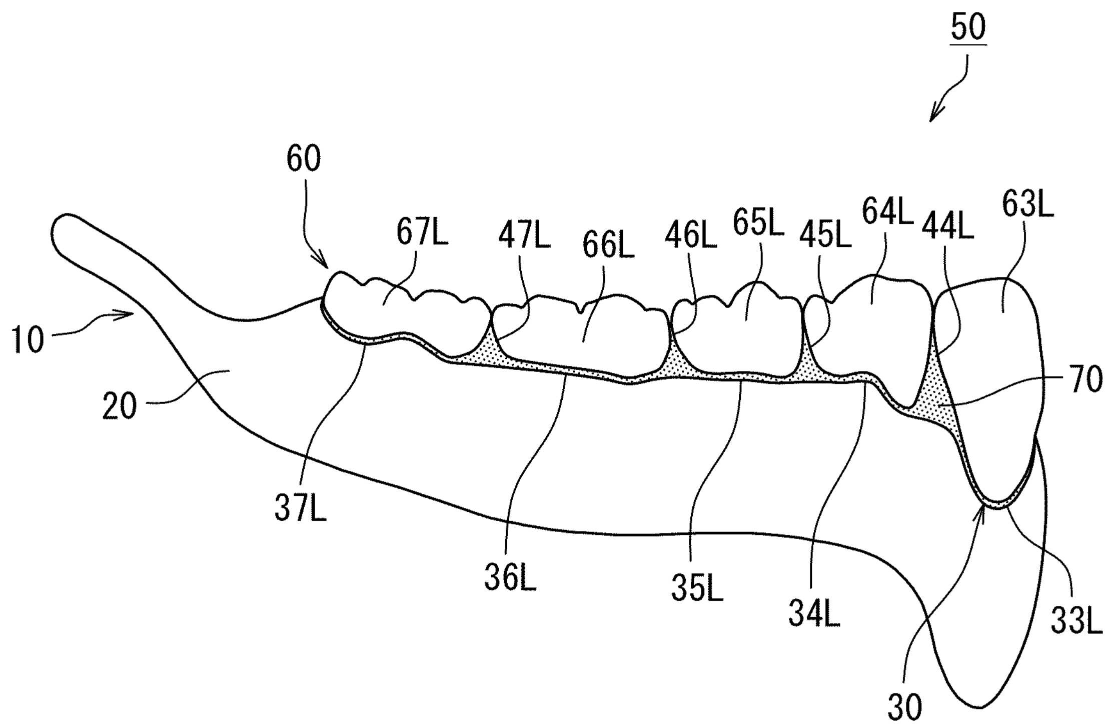
FIG. 6 is a cross-sectional view of molar teeth part of the plate denture of the first embodiment according to the present disclosure.

FIG. 4 is a perspective view of a plate denture of the first embodiment according to the present disclosure. FIG. 5 is a plan view of the plate denture of the first embodiment according to the present disclosure. FIG. 6 is a cross-sectional view of molar teeth part of the plate denture of the first embodiment according to the present disclosure. A plate denture 50 illustrated in FIGS. 4 to 6 indicates a mandibular full denture. FIG. 6 illustrates a cross section of the molar teeth part on the left side of the mandibular full denture. However, the other parts have a similar configuration.

As illustrated in FIGS. 4 to 6, the plate denture 50 includes the denture base 10, a plurality of artificial teeth 60, and an adhesive 70.

The plurality of artificial teeth 60 are arranged on the plurality of sockets 30 of the denture base 10. The plurality of artificial teeth 60 are bonded to the denture base 10 with the adhesive 70. The plurality of artificial teeth 60 include a plurality of artificial teeth independent of one another, the artificial teeth being selected from a central incisor, a lateral incisor, a canine tooth, a first premolar, a second premolar, a first molar, or a second molar.

In the present embodiment, since the plate denture 50 is a full denture, the plurality of artificial teeth 60 includes 14 artificial teeth 61L and 61R to 67L and 67R including central incisors, lateral incisors, canine teeth, first premolars, second premolars, first molars, and second molars. The 14 artificial teeth are independent from one another and are not continuous to each other. The plurality of artificial teeth 61L and 61R to 67L and 67R are arranged in the plurality of sockets 31L and 31R to 37L and 37R.

The adhesive 70 is disposed on the plurality of sockets 30 of the denture base 10 to bond the denture base 10 and the plurality of artificial teeth 60. The adhesive 70 is also disposed in the grooves 41 to 47L and 47R provided in the socket partition walls 21 to 27L and 27R of the denture base 10. Due to this, the adhesive 70 is continuously disposed on the plurality of sockets 30 via the grooves 41 to 47L and 47R.

For example, the adhesive 70 is disposed in a U shape continuous over the plurality of sockets 30. The strength of the denture base 10 can be reinforced by disposing the adhesive 70 over the plurality of sockets 30 in a continuous state seamlessly.

The adhesive 70 disposed in the grooves 41 to 47L and 47R bonds adjacent artificial teeth to each other. That is, the adhesive 70 bonds the adjacent surfaces of the adjacent artificial teeth to each other. Due to this, since the plurality of artificial teeth 60, are bonded with the adhesive 70 also in the direction in which the artificial teeth are adjacent to each other, the bonding of the plurality of artificial teeth 60 becomes stronger.

As the adhesive 70, for example, a dental resin can be used. The dental resin may be, for example, a powder-liquid mixture type autopolymer resin. Alternatively, the dental resin may be a casting resin, a heat-curing resin, or a photopolymerization resin.

(Manufacturing Method for Denture Base)

Figure 7:
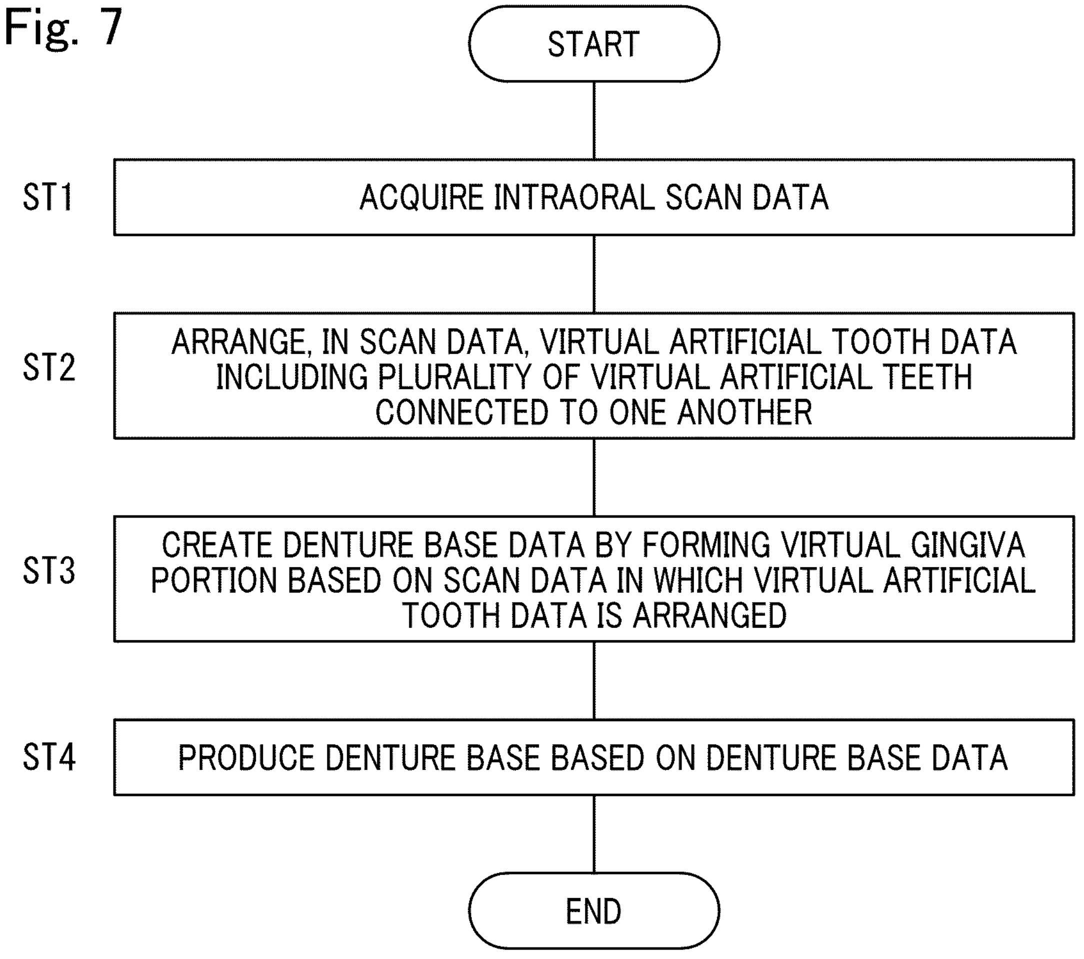
FIG. 7 is a flowchart of a manufacturing method for the denture base of the first embodiment according to the present disclosure.
Figure 8A:
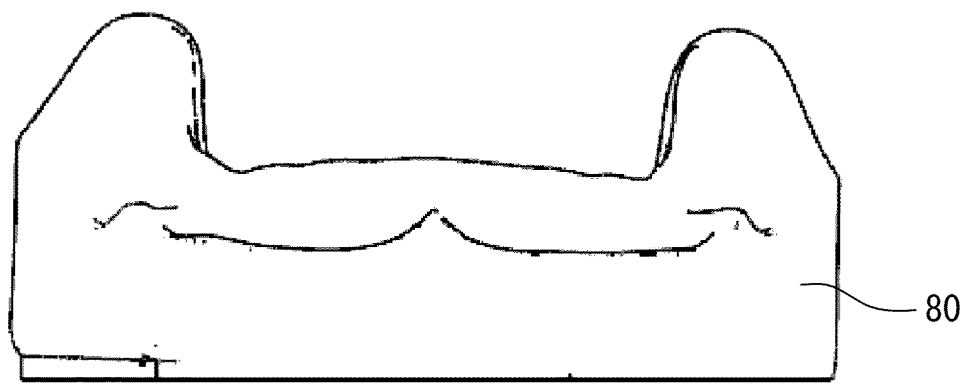
FIG. 8A is a schematic view illustrating an example of steps of the manufacturing method for the denture base of the first embodiment according to the present disclosure.
Figure 8B:
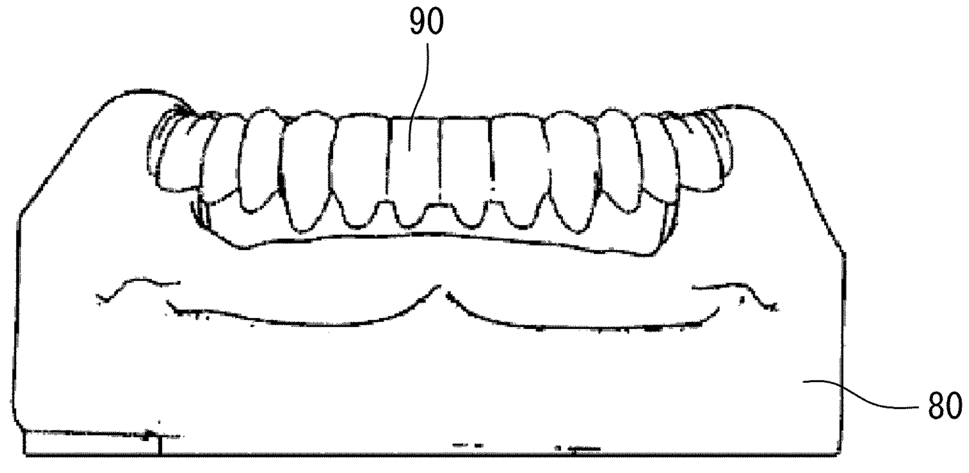
FIG. 8B is a schematic view illustrating an example of steps of the manufacturing method for the denture base of the first embodiment according to the present disclosure.
Figure 8C:
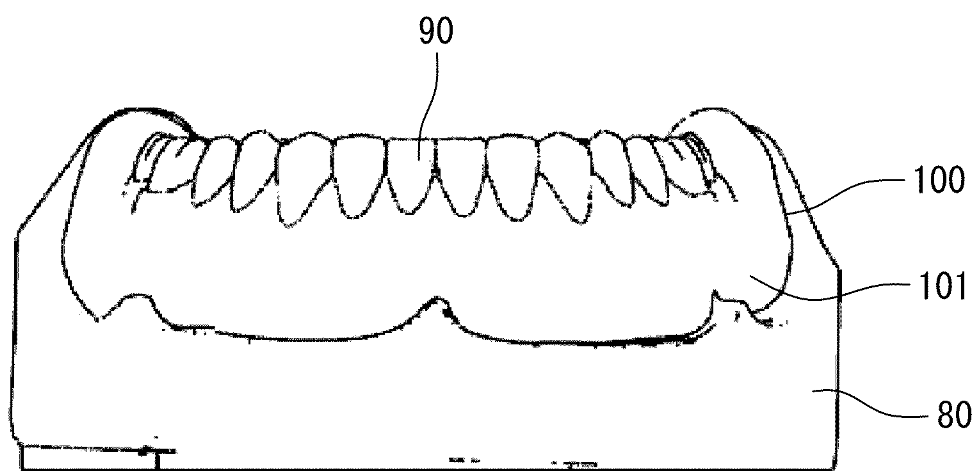
FIG. 8C is a schematic view illustrating an example of steps of the manufacturing method for the denture base of the first embodiment according to the present disclosure.

FIG. 7 is a flowchart of a manufacturing method for the denture base of the first embodiment according to the present disclosure. FIGS. 8A to 8C are schematic views illustrating examples of steps of the manufacturing method for the denture base of the first embodiment according to the present disclosure.

As illustrated in FIG. 7, the manufacturing method for the denture base 10 includes steps ST1 to ST4. The manufacturing method is performed by, for example, a manufacturing device. The manufacturing device includes a processor and a memory storing instructions executable by the processor. For example, the manufacturing device is a computer.

In step ST1, intraoral scan data 80 is acquired.

FIG. 8A illustrates an example of intraoral scan data. As illustrated in FIG. 8A, the intraoral scan data 80 is data representing the intraoral shape attached with the denture base 10 to be manufactured.

For example, the intraoral scan data 80 may be acquired by scanning the oral cavity of the patient using a scanner, or may be acquired by scanning a model that reproduces the oral cavity of the patient. Alternatively, the intraoral scan data 80 may be acquired by being received from an external device using a communication device.

Returning to FIG. 7, in step ST2, virtual artificial tooth data 90 coupled with a plurality of virtual artificial teeth is arranged in the scan data 80.

FIG. 8B illustrates a state in which the virtual artificial tooth data is arranged in the intraoral scan data acquired in step ST1. As illustrated in FIG. 8B, the virtual artificial tooth data 90 is arranged on the intraoral scan data 80. The virtual artificial tooth data 90 is used to create denture base data in the intraoral scan data 80.

Here, the virtual artificial tooth data 90 will be described.

Figure 9:
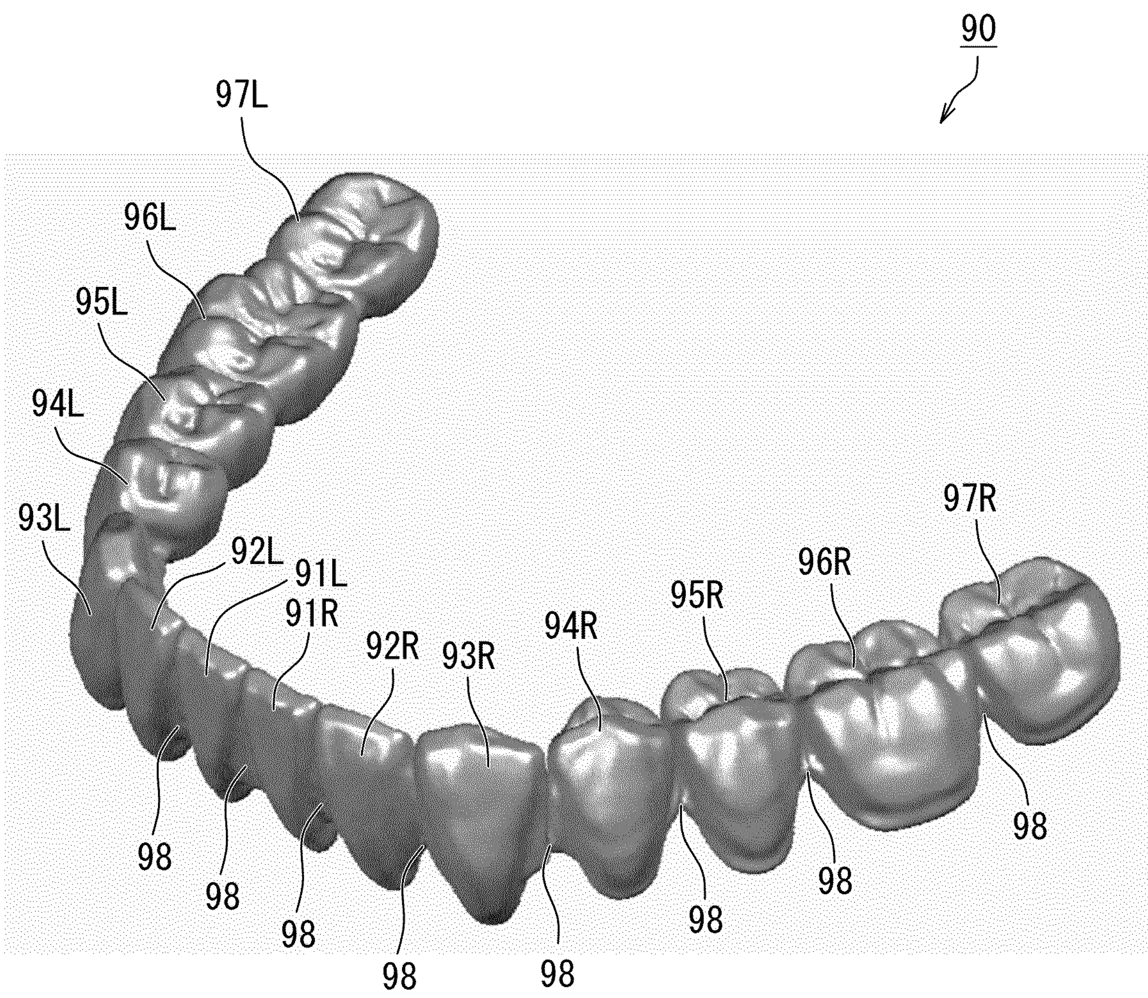
FIG. 9 is a perspective view illustrating an example of virtual artificial tooth data.

FIG. 9 is a perspective view illustrating an example of virtual artificial tooth data. As illustrated in FIG. 9, the virtual artificial tooth data 90 includes first to seventh virtual artificial teeth 91L and 91R to 97L and 97R. The virtual artificial tooth data 90 is data in which the first to seventh virtual artificial teeth 91L and 91R to 97L and 97R are arranged side by side in a dental arch shape. In the virtual artificial tooth data 90, the first to seventh virtual artificial teeth 91L to 97L are arranged on the left side, and the first to seventh virtual artificial teeth 91R to 97R are arranged on the right side.

The first virtual artificial teeth 91L and 91R are virtual artificial teeth of central incisors. The second virtual artificial teeth 92L and 92R are virtual artificial teeth of lateral incisors. The third virtual artificial teeth 93L and 93R are virtual artificial teeth of canine teeth. The fourth virtual artificial teeth 94L and 94R are virtual artificial teeth of first premolars. The fifth virtual artificial teeth 95L and 95R are virtual artificial teeth of second premolars. The sixth virtual artificial teeth 96L and 96R are virtual artificial teeth of first molars. The seventh virtual artificial teeth 97L and 97R are virtual artificial teeth of second molars.

The first to seventh virtual artificial teeth 91L and 91R to 97L and 97R are used to provide a plurality of sockets to denture base data to be created in step ST3 described later.

The virtual artificial tooth data 90 connects and continuous with adjacent virtual artificial teeth 91L and 91R to 97L and 97R. Specifically, the virtual artificial tooth data 90 includes a coupling part 98 that couples adjacent virtual artificial teeth. In the virtual artificial tooth data 90, the coupling part 98 couples and integrates the adjacent virtual artificial teeth 91L and 91R to 97L and 97R.

The coupling part 98 is provided between the left and right first virtual artificial teeth 91L and 91R of the virtual artificial tooth data 90. The coupling part 98 is provided between the first virtual artificial teeth 91L and 91R and the second virtual artificial teeth 92L and 92R, between the second virtual artificial teeth 92L and 92R and the third virtual artificial teeth 93L and 93R, between the third virtual artificial teeth 93L and 93R and the fourth virtual artificial teeth 94L and 94R, between the fourth virtual artificial teeth 94L and 94R and the fifth virtual artificial teeth 95L and 95R, between the fifth virtual artificial teeth 95L and 95R and the sixth virtual artificial teeth 96L and 96R, and between the sixth virtual artificial teeth 96L and 96R and the seventh virtual artificial teeth 97L and 97R, respectively, on the left and right of the virtual artificial tooth data 90.

The coupling part 98 is used to provide a groove in denture base data 100 to be created in step ST3 described later. The coupling part 98 is formed in, for example, a plate shape. The shape and/or size of the coupling part 98 may be changed according to the shape and/or size of the groove created in the denture base data 100.

Returning to FIG. 7, in step ST3, the denture base data 100 is created on the basis of the scan data 80 in which the virtual artificial tooth data 90 is arranged. The denture base data 100 is data representing the shape of the denture base 10.

FIG. 8C is a view in which the denture base data 100 is created in the scan data 80 in which the virtual artificial tooth data 90 is arranged. As illustrated in FIG. 8C, the denture base data 100 is created in accordance with the shape of the virtual artificial tooth data 90 and the intraoral shape of the scan data 80.

In step ST3, a virtual gingiva portion 101 of the denture base data 100 is formed along the outer shape of the virtual artificial tooth data 90 and the outer shape of the intraoral scan data 80. The virtual gingiva portion 101 is formed avoiding a portion where the virtual artificial tooth data 90 and the scan data 80 exist. The virtual gingiva portion 101 corresponds to the base main body 20 of the denture base 10.

In the present embodiment, the virtual gingiva portion 101 is formed along the outer shape of tooth root portions of the first to seventh virtual artificial teeth 91L and 91R to 97L and 97 and the outer shape of the coupling part 98.

After the virtual gingiva portion 101 is formed, the virtual artificial tooth data 90 and the scan data 80 are deleted. Due to this, in the virtual gingiva portion 101, the plurality of sockets corresponding to the tooth root shapes of the first to seventh virtual artificial teeth 91L and 91R to 97L and 97R are formed in the portion from which the first to seventh virtual artificial teeth 91L and 91R to 97L and 97R have been removed. That is, the plurality of sockets in which the first to seventh virtual artificial teeth 91L and 91R to 97L and 97R can be arranged are formed in the portion from which the first to seventh virtual artificial teeth 91L and 91R to 97L and 97R have been deleted. In the socket partition wall provided between the adjacent sockets, a groove that allows the adjacent sockets to communicate with each other is formed in a portion where the coupling part 98 has been removed.

In this way, the denture base data 100 representing the shape of the denture base 10 is completed. The completed denture base data 100 includes the base main body and the plurality of sockets provided in the base main body and having a concave shape. In the denture base data 100, the plurality of sockets are provided along the shape of the base main body, and the base main body has socket partition walls provided between adjacent sockets among the plurality of sockets. The socket partition wall is provided with a groove allowing the adjacent sockets to communicate with each other, and the plurality of sockets are communicated by the groove.

Returning to FIG. 7, in step ST4, the denture base 10 is produced on the basis of the denture base data 100. For example, in step ST4, the denture base 10 is produced by the 3D printer on the basis of the denture base data 100 created in step ST3.

Thus, the denture base 10 can be produced by performing steps ST1 to ST4 of the manufacturing method described above.

(Manufacturing Method for Plate Denture)

Figure 10:
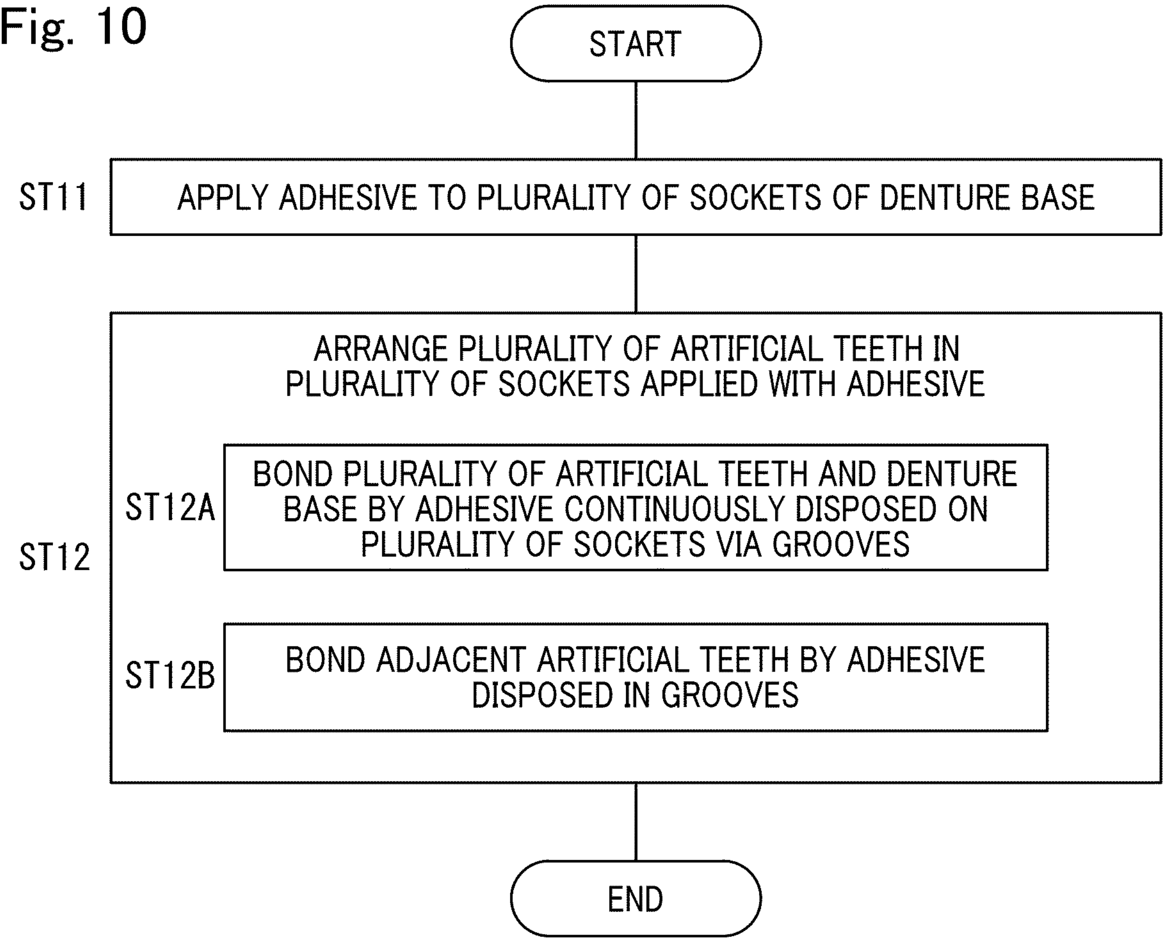
FIG. 10 is a flowchart of a manufacturing method for the plate denture of the first embodiment according to the present disclosure.

FIG. 10 is a flowchart of the manufacturing method for the plate denture of the first embodiment according to the present disclosure.

As illustrated in FIG. 10, the manufacturing method for the plate denture 50 includes steps ST11 and ST12. The manufacturing method is performed by, for example, a manufacturing device. The manufacturing device includes a processor and a memory storing instructions executable by the processor. For example, the manufacturing device is a computer.

In step ST11, the adhesive 70 is applied to the plurality of sockets 30 of the denture base 10. For example, in step ST11, the adhesive 70 is not applied to the grooves 41 to 47L, and the adhesive 70 is applied to the plurality of sockets 30. In step ST11, the adhesive 70 may be applied to the plurality of sockets 30 and the plurality of grooves 41 to 47L.

In step ST12, the plurality of artificial teeth 60 are arranged on the plurality of sockets 30 applied with the adhesive 70. Due to this, the plurality of artificial teeth 60 are bonded by the adhesive 70 in a state of being arranged in the plurality of sockets 30.

Step ST12 includes steps ST12A and ST12B.

In step ST12A, the plurality of artificial teeth 60 and the denture base 10 are bonded to each other by the adhesive 70 continuously disposed on the plurality of sockets 30 via the grooves 41 to 47L. For example, when the plurality of artificial teeth 60 are arranged in the plurality of sockets 30, the adhesive 70 applied to the plurality of sockets 30 is pushed by the artificial teeth 60 and flows into the grooves 41 to 47L. Due to this, the continuous adhesive 70 is formed across the plurality of sockets 30 via the plurality of grooves 41 to 47L. For this reason, the adhesive 70 bonds the plurality of artificial teeth 60 arranged in the plurality of sockets 30 and the denture base 10 in a state of being continuous in a seamless manner between the adjacent sockets.

In step ST12B, the adjacent artificial teeth 60 are bonded by the adhesive 70 disposed in the grooves 41 to 47L. Due to this, the plurality of artificial teeth 60 are also bonded to each other by the adhesive 70.

Thus, by performing steps ST11 and ST12 of the above manufacturing method, the plate denture 50 can be produced.

(Effects)

According to the denture base 10, the plate denture 50, and the manufacturing method for these of the first embodiment according to the present disclosure, the following effects can be achieved.

The denture base 10 of the first embodiment according to the present disclosure includes the base main body 20 and the plurality of sockets 30 provided in the base main body 20 and having a concave shape. The plurality of sockets 30 are provided along the shape of the base main body 20. The base main body 20 includes the socket partition walls 21 to 27L and 27R provided between adjacent sockets among the plurality of sockets 30. The socket partition walls 21 to 27L and 27R are provided with the first to seventh grooves 41 to 47L and 47R through which adjacent sockets communicate with each other. The plurality of sockets 30 communicate with each other through the grooves 41 to 47L and 47R.

With such a configuration, the adhesive 70 can be continuously disposed over the plurality of sockets 30. Specifically, the denture base 10 is provided with the socket partition walls 21 to 27L and 27R that separate adjacent sockets, and the socket partition walls 21 to 27L and 27R are provided with the grooves 41 to 47L and 47R that allow the adjacent sockets to communicate with each other. The plurality of sockets 30 communicate with each other via the grooves 41 to 47L and 47R. That is, spaces in which the plurality of artificial teeth 60 are arranged defined by the plurality of sockets 30 are continuous via the grooves 41 to 47L and 47R. Due to this, the adhesive 70 for bonding the plurality of artificial teeth 60 to the plurality of sockets 30 can be continuously disposed over the plurality of sockets 30. As a result, the denture base 10 can be reinforced by the adhesive 70.

In recent years, as a method for producing a denture base, a method for producing a denture base by a 3D printer has been developed. The denture base produced by the 3D printer is produced using, for example, a stereolithographic material. The stereolithographic material is lower in strength than a dental material used in the case of producing a denture base by a general method. Therefore, when a plate denture is produced using a denture base produced by a 3D printer, there is a problem that the plate denture is easily broken due to impact such as dropping. In the denture base 10 of the first embodiment according to the present disclosure, since the adhesive 70 can be continuously disposed over the plurality of sockets 30 via the grooves 41 to 47L and 47R, the denture base 10 can be reinforced by the adhesive 70. Due to this, when the plate denture 50 is produced using the denture base 10 produced by a 3D printer, the adhesive 70 can improve the strength of the denture base 10. As a result, the plate denture 50 using the denture base 10 produced by a 3D printer is less likely to break even when dropped.

The base main body 20 has a dental arch shape. The plurality of sockets 30 include first to seventh sockets 31L and 31R to 37L and 37R on both left and right sides of the base main body 20 with reference to the center line CL1. The first sockets 31L and 31R are provided near the center line CL1 of the base main body 20. The second sockets 32L and 32R are provided on the distal side of the base main body 20 relative to the first sockets 31L and 31R. The third sockets 33L and 33R are provided on the distal side of the base main body 20 relative to the second sockets 32L and 32R. The fourth sockets 34L and 34R are provided on the distal side of the base main body 20 relative to the third sockets 33L and 33R. The fifth sockets 35L and 35R are provided on the distal side of the base main body 20 relative to the fourth sockets 34L and 34R. The sixth sockets 36L and 36R are provided on the distal side of the base main body 20 relative to the fifth sockets 35L and 35R. The seventh sockets 37L and 37R are provided on the distal side of the base main body 20 relative to the sixth sockets 36L and 36R. The socket partition walls include the first to seventh socket partition walls 21 to 27L and 27R. The first socket partition wall 21 is provided between the two first sockets 31L and 31R provided across the center line CL1 of the base main body 20. The second socket partition walls 22L and 22R are provided between the first sockets 31L and 31R and the second sockets 32L and 32R on both the left and right sides of the base main body 20, respectively. The third socket partition walls 23L and 23R are provided between the second sockets 32L and 32R and the third sockets 33L and 33R on both the left and right sides of the base main body 20, respectively. The fourth socket partition walls 24L and 24R are provided between the third sockets 33L and 33R and the fourth sockets 34L and 34R on both the left and right sides of the base main body 20, respectively. The fifth socket partition walls 25L and 25R are provided between the fourth sockets 34L and 34R and the fifth sockets 35L and 35R on both the left and right sides of the base main body 20, respectively. The sixth socket partition walls 26L and 26R are provided between the fifth sockets 35L and 35R and the sixth sockets 36L and 36R on both the left and right sides of the base main body 20, respectively. The seventh socket partition walls 27L and 27R are provided between the sixth sockets 36L and 36R and the seventh sockets 37L and 37R on both the left and right sides of the base main body 20, respectively. The grooves include the first to seventh grooves 41 to 47L and 47R. The first groove 41 is provided in the first socket partition wall 21, and allows the adjacent two first sockets 31L and 31R to communicate with each other. The second grooves 42L and 42R are provided in the second socket partition walls 22L and 22R, and allow the first sockets 31L and 31R to communicate with the second sockets 32L and 32R. The third grooves 43L and 43R are provided in the third socket partition walls 23L and 23R, and allow the second sockets 32L and 32R to communicate with the third sockets 33L and 33R. The fourth grooves 44L and 44R are provided in the fourth socket partition walls 24L and 24R, and allow the third sockets 33L and 33R to communicate with the fourth sockets 34L and 34R. The fifth grooves 45L and 45R are provided in the fifth socket partition walls 25L and 25R, and allow the fourth sockets 34L and 34R to communicate with the fifth sockets 35L and 35R. The sixth grooves 46L and 46R are provided in the sixth socket partition walls 26L and 26R, and allow the fifth sockets 35L and 35R to communicate with the sixth sockets 36L and 36R. The seventh grooves 47L and 47R are provided in the seventh socket partition walls 27L and 27R, and allow the sixth sockets 36L and 36R to communicate with the seventh sockets 37L and 37R. The first to seventh sockets 31L and 31R to 37L and 37R communicate with each other through the first to seventh grooves 41 to 47L and 47R.

With such a configuration, when the denture base 10 is a full denture base, the adhesive 70 can be continuously disposed on the 14 sockets 30. Due to this, the denture base 10 can be further reinforced.

Depths D1 to D3 of the first to third grooves 41 to 43L and 43R are larger than depths D4 to D7 of the fourth to seventh grooves 44L and 44R to 47L and 47R.

With such a configuration, in the first to third grooves 41 to 43L and 43R, as compared with the fourth to seventh grooves 44L and 44R to 47L and 47R, more adhesive 70 can be disposed in the groove depth direction, that is, the height direction of the base main body 20. Due to this, the portion provided with the first to third sockets 31L and 31R to 33L and 33R can be reinforced more firmly by the adhesive 70. For example, in the base main body 20 having a dental arch shape, when receiving an impact such as dropping, a portion provided with the first to third sockets 31L and 31R to 33L and 33R is more likely to break in the height direction of the base main body 20 than a portion provided with the fourth to seventh sockets 34L and 34R to 37L and 37R. Therefore, by increasing the depths of the first to third grooves 41 to 43L and 43R, more adhesive 70 can be disposed in the depth direction of the first to third grooves 41 to 43L and 43R. The adhesive 70 disposed in the first to third grooves 41 to 43L can improve the strength in the height direction of the base main body 20. That is, the strength of the denture base 10 can be improved by allowing more adhesive 70 to be disposed in the portion provided with the first to third sockets 31L and 31R to 33L and 33R, which is a portion easily broken by external force such as impact.

The depth D3 of the third grooves 43L and 43R is larger than the depths D1 and D2 of the first and second grooves 41, 42L, and 42R.

With such a configuration, by forming the third grooves 43L and 43R deepest among the first to third grooves 41 to 43L and 43R, more adhesive 70 can be disposed in the third grooves 43L and 43R. Due to this, the portion provided with the third sockets 33L and 33R and the fourth sockets 34L and 34R can be reinforced more firmly by the adhesive 70.

Widths W4 to W7 of the fourth to seventh grooves 44L and 44R to 47L and 47R are larger than widths W1 to W3 of the first to third grooves 41 to 43L and 43R.

With such a configuration, in the fourth to seventh grooves 44L and 44R to 47L and 47R, as compared with the first to third grooves 41 to 43L and 43R, more adhesive 70 can be disposed in the width direction of the groove, that is, the direction from the labial side toward the palatal side of the base main body 20. Due to this, the fourth to seventh artificial teeth disposed in the fourth to seventh sockets 34L and 34R to 37L and 37R can be more firmly bonded to each other.

The grooves 41 to 47L and 47R are defined by the bottoms 41*b* to 47*b* and two side walls 41*c* to 47*c* extending from the bottoms 41*b* to 47*b* facing each other. Openings 41*a* to 47*a* of the grooves 41 to 47L and 47R in the depth direction of the grooves are defined by the two side walls 41*c* to 47*c*, and are larger than bottom 41*b* to 47*b* of the grooves 41 to 47L and 47R.

With such a configuration, more adhesives 70 can be disposed near the openings 41*a* to 47*a* than the bottoms 41*b* and 47*b* of the grooves 41 to 47L and 47R. Due to this, it is possible to improve the adhesive strength among the plurality of artificial teeth 60 while more firmly reinforcing the denture base 10 with the adhesive 70. By enlarging the openings 41*a* to 47*a* of the grooves 41 to 47L and 47R, the adhesive 70 is easily applied.

The two side walls 41*c* to 47*c* have inclined walls 41*d* to 47*d* inclined in a direction of increasing the distance between the two side walls 41*c* to 47*c* from the bottoms 41*b* to 47*b* of the grooves 41 to 47L and 47R toward the openings 41*a* to 47*a*.

With such a configuration, when the plurality of artificial teeth 60 are arranged to the plurality of sockets 30 and bonded, the adhesive 70 easily flows from the bottoms 41*b* and 47*b* of the grooves 41 to 47L and 47R toward the openings 41*a* to 47*a*. As a result, the adhesive 70 becomes easily disposed in the grooves 41 to 47L and 47R in the depth direction of the groove.

The thickness of socket partition walls 21 to 27L and 27R decreases toward the grooves 41 to 47L and 47R.

With such a configuration, when the plurality of artificial teeth 60 are arranged on the plurality of sockets 30 applied with the adhesive 70, the adhesive 70 easily flows into the grooves 41 to 47L and 47R. As a result, the adhesive 70 becomes easily disposed in the grooves 41 to 47L and 47R.

The plate denture 50 of the first embodiment according to the present disclosure includes the denture base 10, the plurality of artificial teeth 60, and the adhesive 70. The plurality of artificial teeth 60 are arranged on the plurality of sockets 30 of the denture base 10. The adhesive 70 is continuously disposed on the plurality of sockets 30 via the grooves 41 to 47L and 47R of the denture base 10, and bonds the plurality of artificial teeth 60 and the denture base 10.

With this configuration, the strength of the plate denture 50 can be improved. Specifically, by continuously arranging the adhesive 70 over the plurality of sockets 30, the denture base 10 can be reinforced by the adhesive 70. For example, there is a problem that the denture base 10 produced by a 3D printer is easily broken when receiving an impact such as dropping. Even when produced using the denture base 10 produced by a 3D printer, the plate denture 50 can be reinforced by the adhesive 70. Due to this, even if receiving an impact such as dropping, the plate denture 50 is less likely to break.

The adhesive 70 bonds the artificial teeth adjacent to each other in the grooves 41 to 47L and 47R.

With such a configuration, the adjacent artificial teeth can also be bonded to each other by the adhesive 70, and thus the plurality of artificial teeth 60 can be firmly bonded to each other, and the strength of the plate denture 50 can be improved.

The adhesive 70 is a dental resin.

With such a configuration, the strength of the plate denture 50 can be further improved by the adhesive 70.

The plurality of artificial teeth 60 include a plurality of artificial teeth independent of one another, the artificial teeth being selected from a central incisor, a lateral incisor, a canine tooth, a first premolar, a second premolar, a first molar, or a second molar.

With such a configuration, the adhesive 70 is disposed between the independent artificial teeth, and the adjacent artificial teeth are more reliably adhered by the adhesive 70.

The manufacturing method for the denture base 10 of the first embodiment according to the present disclosure is executed by a computer and includes steps ST1 to ST3. In step ST1, intraoral scan data 80 is acquired. In step ST2, the virtual artificial tooth data 90 including the plurality of virtual artificial teeth 91L and 91R to 97L and 97R connected to each other is arranged in the scan data 80. In step ST3, the denture base data 100 is created by forming the virtual gingiva portion 101 on the basis of the scan data 80 in which the virtual artificial tooth data 90 is arranged. The denture base data 100 includes the base main body and the plurality of sockets provided in the base main body and having a concave shape. The plurality of sockets are provided along the shape of the base main body. The base main body has the socket partition wall provided between adjacent sockets of the plurality of sockets, and the socket partition wall is provided with the groove that allows the adjacent sockets to communicate with each other. The plurality of sockets are communicated by the grooves.

With this configuration, the denture base data 100 for manufacturing the denture base 10 in which the adhesive 70 can be continuously disposed over the plurality of sockets 30 can be created. The denture base data 100 is design data indicating the shape of the denture base 10. On the basis of the denture base data 100, the denture base 10 can be manufactured by, for example, a 3D printer or a processing device.

The virtual artificial tooth data 90 includes the coupling part 98 that couples adjacent virtual artificial teeth among the plurality of virtual artificial teeth 91L and 91R to 97L and 97R. Step ST3 of creating the denture base data 100 includes forming the virtual gingiva portion 101 along the outer shape of the coupling part 98 between the adjacent virtual artificial teeth.

With such a configuration, the virtual gingiva portion 101 can be formed while avoiding the portion provided with the coupling part 98. Due to this, by removing the portion provided with the coupling part 98, the groove corresponding to the shape of the coupling part 98 can be formed in the portion.

The manufacturing method for the denture base 10 includes step ST4 of producing the denture base 10 by a 3D printer on the basis of the denture base data 100.

With such a configuration, the denture base 10 can be easily created with a 3D printer.

The manufacturing method for the plate denture 50 of the first embodiment according to the present disclosure is executed by a computer, and includes steps ST11 and ST12. In step ST11, the adhesive 70 is applied to the plurality of sockets 30 of the denture base 10 produced by the manufacturing method for the denture base 10 described above. In step ST12, the plurality of artificial teeth 60 are arranged on the plurality of sockets 30 applied with the adhesive 70.

With such a configuration, by reinforcing the denture base 10 by the adhesive 70, the plate denture 50 with improved strength can be produced.

Step ST12 includes bonding the plurality of artificial teeth 60 and the denture base 10 to each other by the adhesive 70 continuously disposed on the plurality of sockets 30 via the grooves 41 to 47L and 47R.

With such a configuration, the adhesive 70 is continuously disposed over the plurality of sockets 30 via the grooves 41 to 47L and 47R, and the denture base 10 can be further reinforced. This makes it possible to manufacture the plate denture 50 with further improved strength.

Step ST12 includes bonding adjacent artificial teeth by the adhesive 70 disposed in the grooves 41 to 47L and 47R.

With such a configuration, the adhesive 70 can bond the adjacent artificial teeth to each other, and the plurality of artificial teeth 60 can be more firmly bonded. This makes it possible to manufacture the plate denture 50 with further improved strength.

In the present embodiment, an example in which the denture base 10 is a full denture base has been described, but the present disclosure is not limited to this. For example, the denture base 10 may be a partial denture base. The partial denture base is provided with two or more adjacent sockets among the first to seventh sockets 31L and 31R to 37L and 37R.

Figure 11:
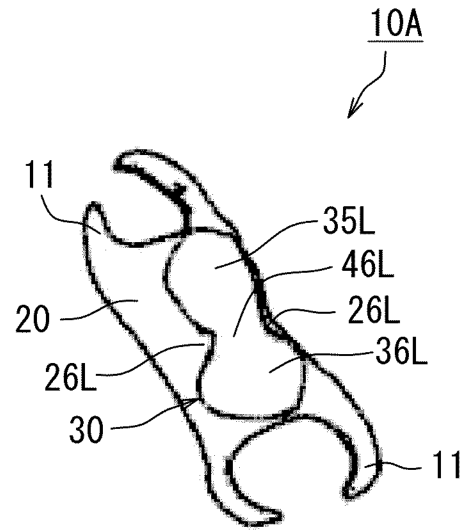
FIG. 11 is a schematic diagram illustrating an example of a partial denture base.
Figure 12:
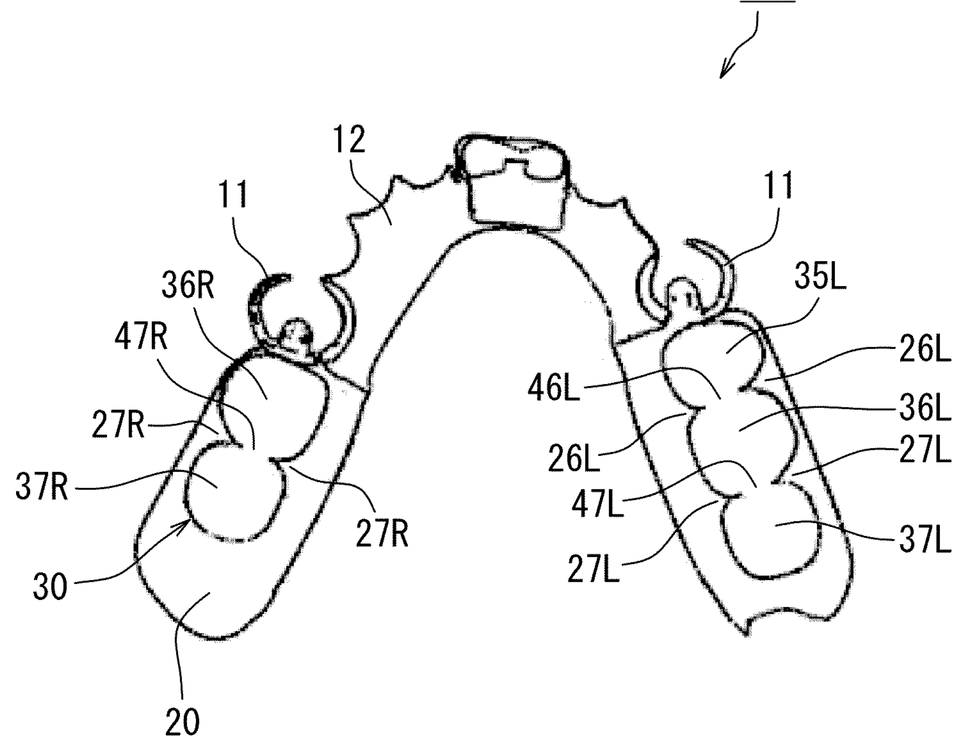
FIG. 12 is a schematic diagram illustrating an example of a partial denture base.

FIGS. 11 and 12 are schematic diagrams illustrating examples of a partial denture base.

A denture base 10A illustrated in FIG. 11 is a denture base in which the fifth socket 35L and the sixth socket 36L are provided in the base main body 20. The denture base 10A includes a retainer 11. The retainer 11 is a device that retains the denture base 10A so as not to be detached. The retainer 11 is, for example, a clasp or a rest. The retainer 11 may be called an abutment device.

In the denture base 10A, the groove 46L is provided in the sixth socket partition wall 26L between the fifth socket 35L and the sixth socket 36L, and the fifth socket 35L and the sixth socket 36L communicate with each other by the groove 46L.

A denture base 10B illustrated in FIG. 12 is a denture base in which the sixth socket 36R and the seventh socket 37R are provided on the right side of the base main body 20, and the fifth to seventh sockets 35L to 37L are provided on the left side of the base main body 20. The denture base 10B includes the retainer 11 on each of the right side and the left side of the base main body 20. In the denture base 10B, the left and right base main bodies are connected by a major connector 12. The major connector 12 is formed in a U shape.

On the right side of the base main body 20 of the denture base 10B, the groove 47R is provided in the seventh socket partition wall 27R between the sixth socket 36R and the seventh socket 37R, and the sixth socket 36R and the seventh socket 37R communicate with each other by the groove 47R. On the left side of the base main body 20 of the denture base 10B, the groove 46L is provided in the sixth socket partition wall 26L between the fifth socket 35L and the sixth socket 36L, and the groove 47L is provided in the seventh socket partition wall 27L between the sixth socket 36L and the seventh socket 37L. The fifth socket 35L and the sixth socket 36L communicate with each other by the groove 46L, and the sixth socket 36L and the seventh socket 37L communicate with each other by the groove 47L.

Even in the denture bases 10A and 10B, which are such partial denture bases, the adhesive 70 can be continuously disposed over the plurality of sockets 30, and the same effects as those of the denture base 10 can be achieved.

In the present embodiment, an example in which the plate denture 50 is a full denture has been described, but the present disclosure is not limited to this. For example, the plate denture 50 may be a partial denture.

In the present embodiment, an example in which the denture base 10 is produced by a 3D printer has been described, but the present disclosure is not limited to this. The denture base 10 may be produced by a device other than the 3D printer. For example, the denture base 10 may be formed of a material other than the stereo lithographic material.

In the present embodiment, an example in which the plurality of artificial teeth 60 are a plurality of artificial teeth independent from one another has been described, but the present disclosure is not limited to this. For example, the plurality of artificial teeth 60 may include coupled artificial teeth in which two or more artificial teeth are coupled.

In the manufacturing method for the denture base 10 and the plate denture 50 in the present embodiment, the steps may be changed, added, reduced, divided, and integrated depending on the environment or the like to be applied.

In the present embodiment, the examples of the manufacturing method for the denture base 10 and the plate denture 50 have been described, but the present disclosure is not limited to this. The present disclosure may be implemented by a program for executing the manufacturing method or a computer-readable recording medium recording the program for executing the manufacturing method. For example, the computer-readable medium may include the manufacturing method as computer-readable instructions executable by the processor. The computer-readable media may include various types of volatile and nonvolatile recording media, for example, a random access memory (RAM), a read-only memory (ROM), a programmable read-only memory (PROM), an electrically programmable read-only memory (PROM), an electrically erasable read-only memory (EPROM), a flash memory, some other tangible data storage devices, sand some combinations thereof.

Examples

Creation of Shape Data of Denture Base of Comparative Example 1

As comparative example 1, denture base data 200 to which a plurality of sockets are not connected, that is, in which a plurality of sockets do not communicate with each other was designed. In comparative example 1, an edentulous jaw model was scanned with a technical desktop scanner (E1, 3 Shape, Denmark), and full denture design was performed with dental CAD software (Dental Designer 2020, 3 Shape). comparative example 1 was designed under the condition that a socket into which single ready-made artificial teeth were incorporated was formed in a denture base. The denture base data 200 of comparative example 1 obtained by the design is illustrated in FIGS. 13 and 14.

Figure 13:
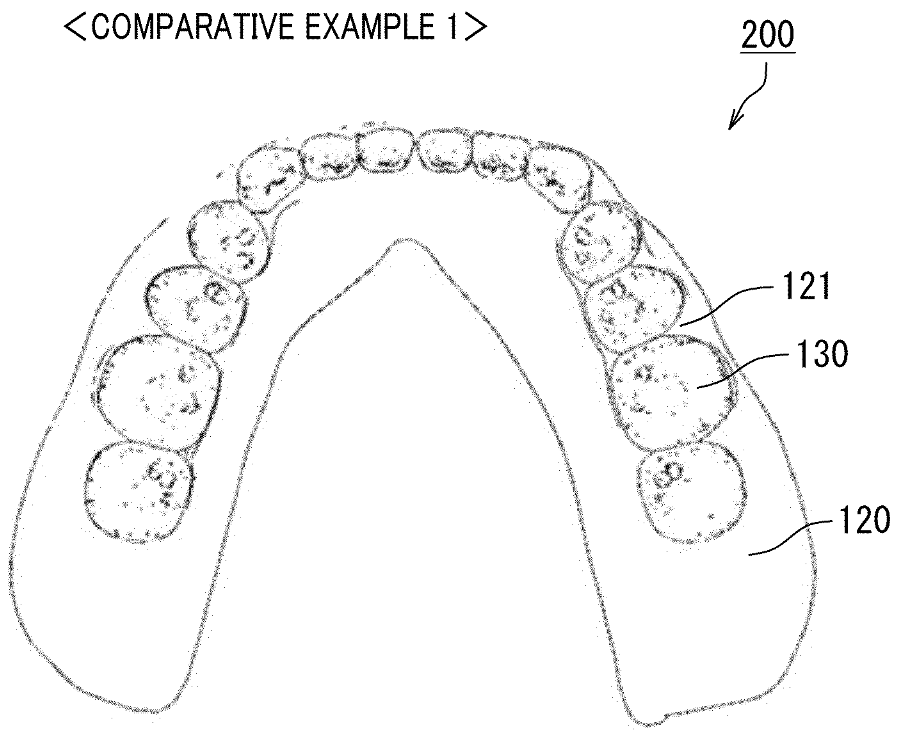
FIG. 13 is a schematic plan view of denture base data of comparative example 1.
Figure 14:
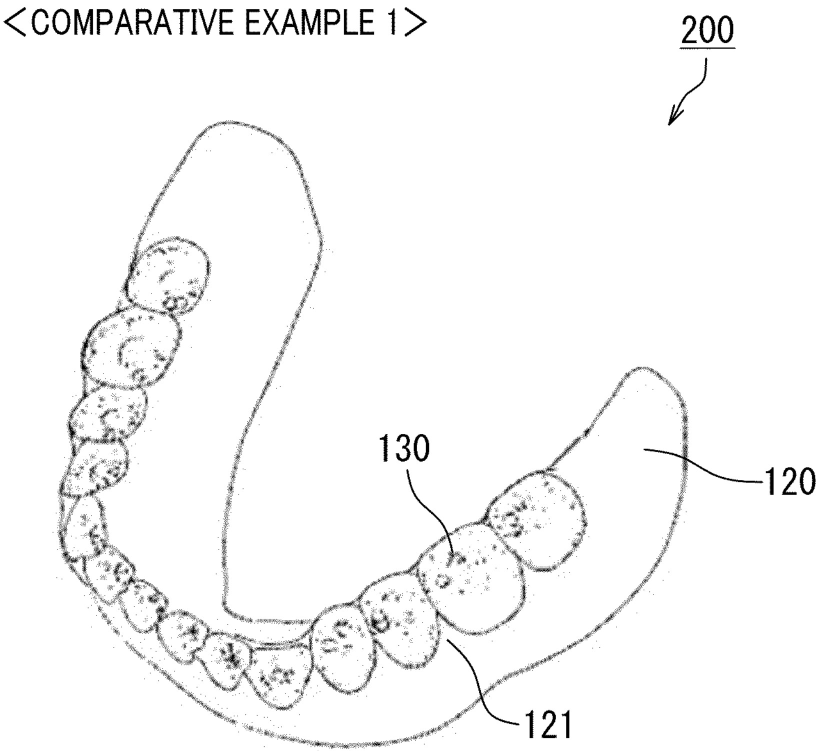
FIG. 14 is a schematic perspective view of the denture base data of comparative example 1.

As illustrated in FIGS. 13 and 14, the denture base data 200 of comparative example 1 includes a base main body 220 and a plurality of sockets 230 provided in the base main body 220. The base main body 220 has a dental arch shape, that is, a U shape. The plurality of sockets 230 are separated by socket partition walls 221 provided between the adjacent sockets, and are independent of one another. That is, the plurality of sockets 230 do not communicate with each other and are not continuous to each other.

Creation of Shape Data of Denture Base of Example 1

Figure 15:
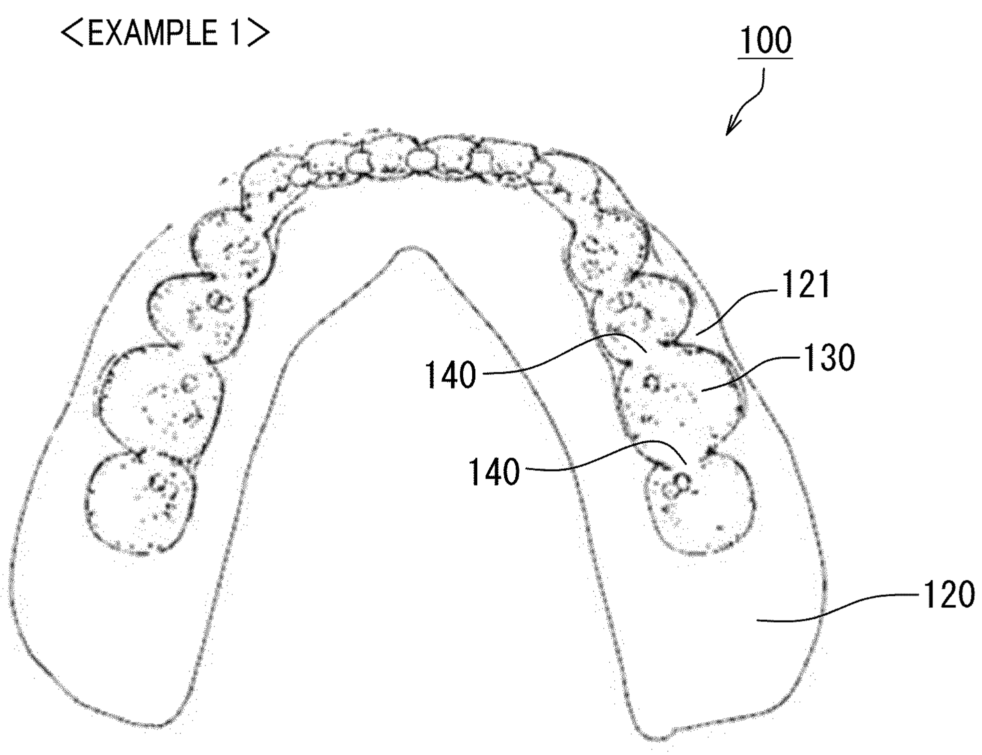
FIG. 15 is a schematic plan view of denture base data of example 1.
Figure 16:
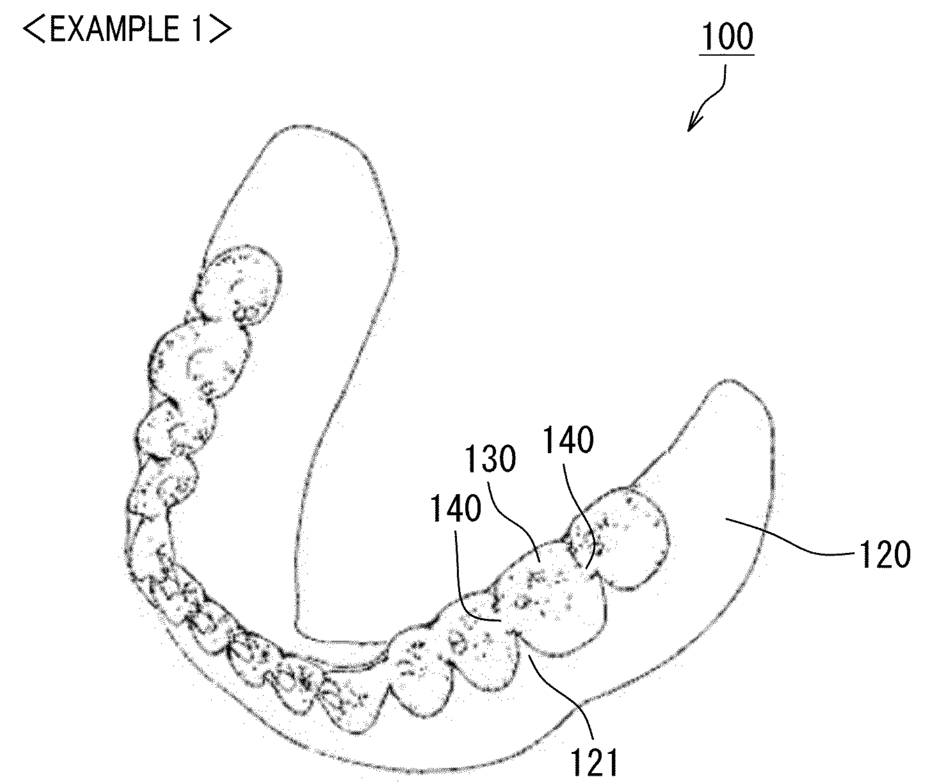
FIG. 16 is a schematic perspective view of the denture base data of example 1.

As example 1, the denture base data 100 of the first embodiment according to the present disclosure was designed. In example 1, the denture base data 200 created in comparative example 1 was loaded into general-purpose CAD software (Rhinoceros 3D, Robert McNeel & Associates, USA), cylindrical data having a diameter of 2.0 mm and a height of 4.0 mm was arranged in the lower embrasure for the socket in the anterior teeth part, and the shape data of and the cylindrical data the denture base were deleted by Boolean operation (difference) to connect the plurality of sockets 30. In the socket in the molar teeth part, a cube having a length of 3.0 mm, a width of 3.0 mm, and a height of 3.0 mm was disposed in the lower embrasure, and the shape data and the cylindrical data of the denture base were deleted by the Boolean operation (difference) to connect the plurality of sockets 30. As described above, shape data of the denture base 10 to which 14 sockets are connected was created. For the height of the connection between the sockets, in the cross-sectional direction of the connection, when the basal surface of the socket was set to 0 and the height to the portion (contact point) where the adjacent surfaces of the artificial teeth are in contact with each other was set to 100, the height of the connection was set to 5 in the present example. FIGS. 15 and 16 illustrate the obtained shape data of the denture base of example 1.

As illustrated in FIGS. 15 and 16, the denture base data 100 of example 1 includes a base main body 120 and a plurality of sockets 130 provided in the base main body 120. Socket partition walls 121 provided between the adjacent sockets are provided with grooves 140 that allow the adjacent sockets to communicate with each other. The plurality of sockets 230 are communicated and continuous by the grooves 141. The denture base data 100 of example 1 has the same shape as that of the denture base data 200 of comparative example 1 except that the grooves 140 are provided.

Comparative Analysis of Socket Shapes of Molar Teeth Part in Denture Base Data of Comparative Example 1 and Example 1

Figure 17:
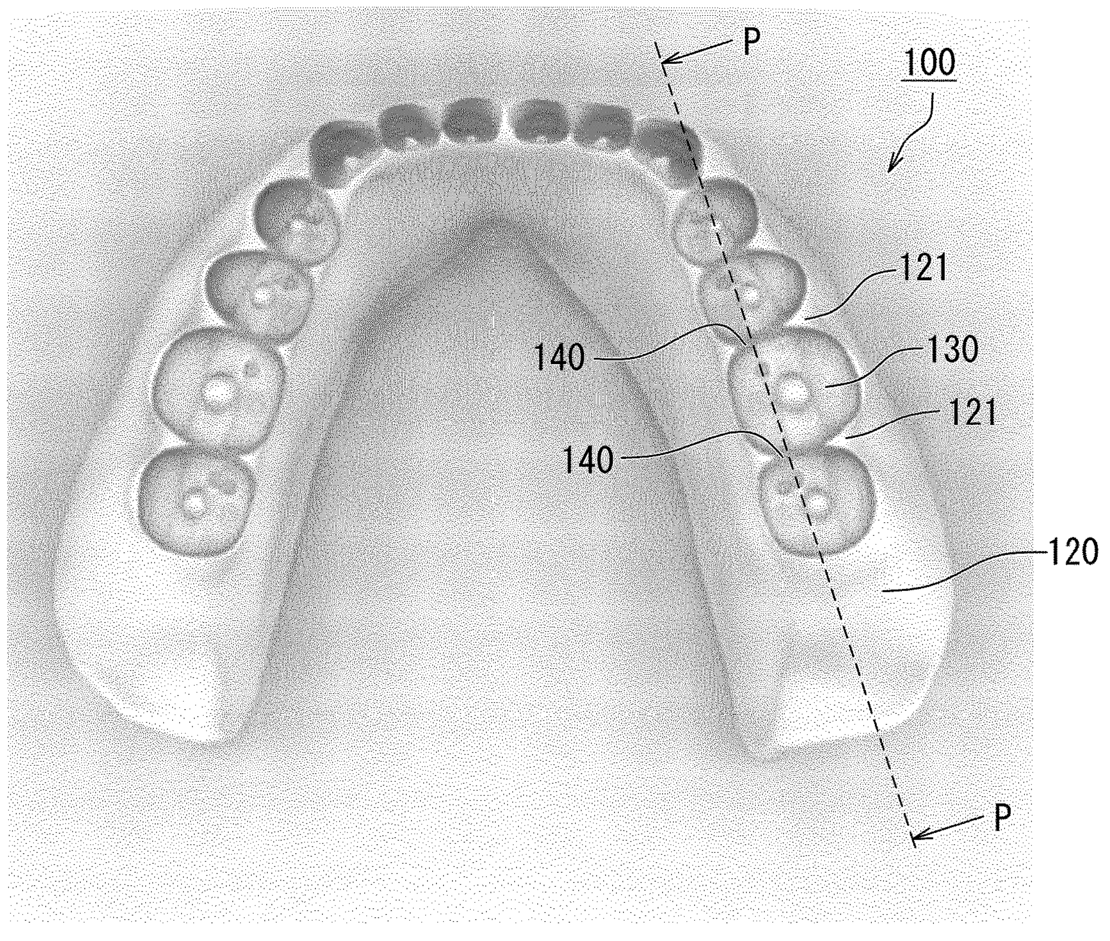
FIG. 17 is a cross-sectional analysis site in molar teeth part of the denture base data of example 1.
Figure 18:
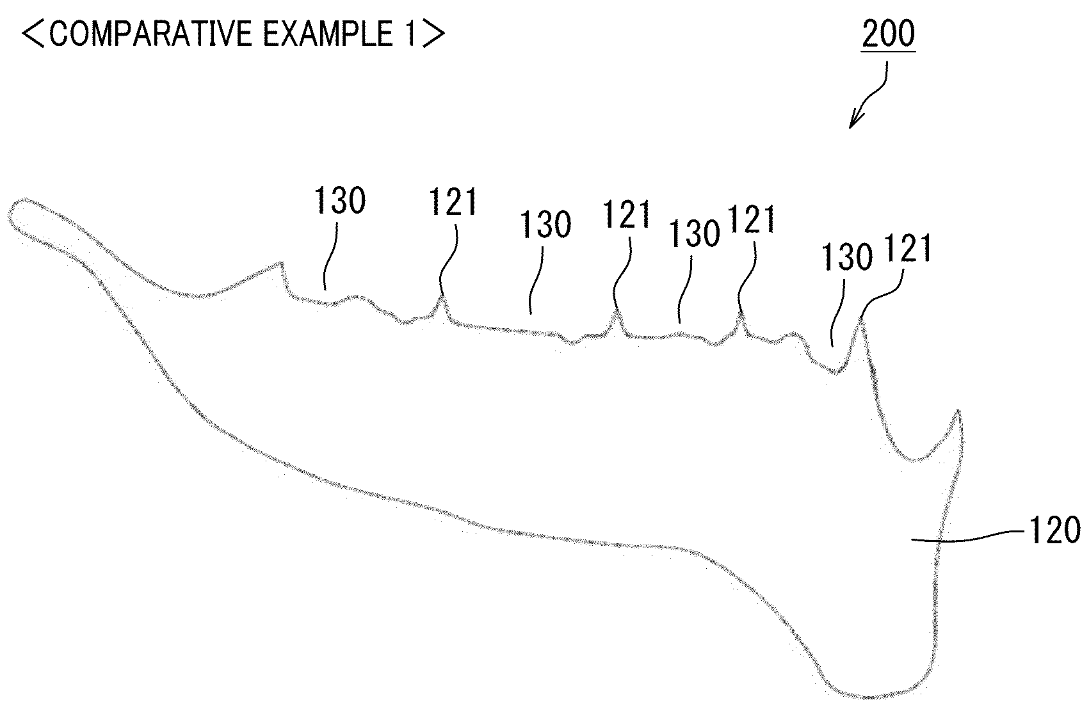
FIG. 18 is a schematic cross-sectional view of molar teeth part of the denture base data of comparative example 1.
Figure 19:
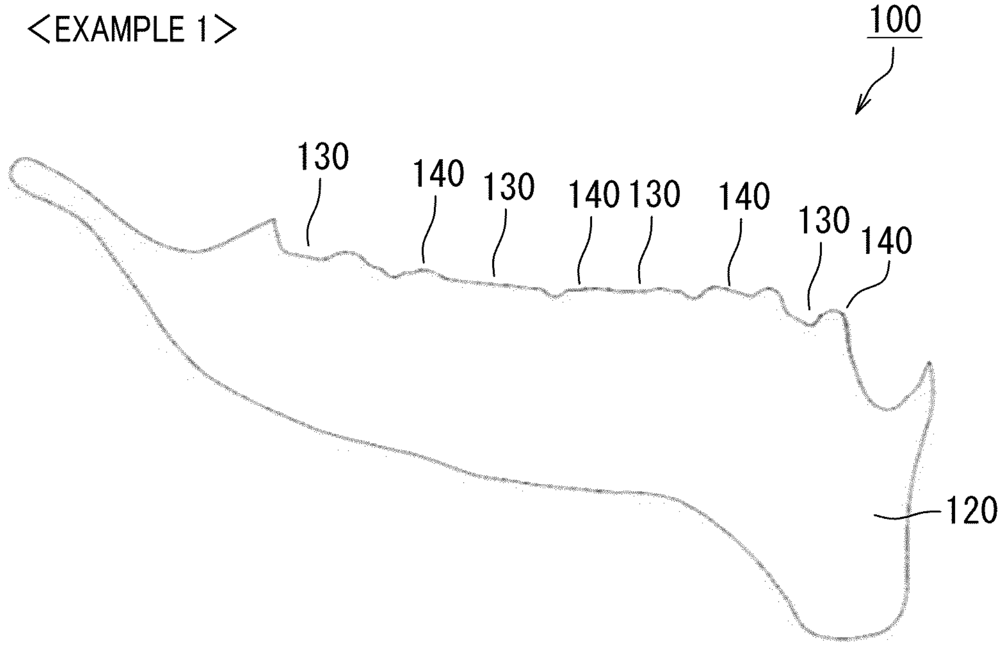
FIG. 19 is a schematic cross-sectional view of molar teeth part of the denture base data of example 1.

The molar teeth part of the denture base data 100 and 200 of comparative example 1 and example 1 were analyzed in cross section and compared. The molar teeth part of the denture base data 100 and 200 refer to portions of the socket where the first premolars to the second molars are arranged. FIG. 17 illustrates a cross-sectional analysis site of the molar teeth part of example 1. As illustrated in FIG. 17, a cross section obtained by cutting the molar teeth part of the denture base data 100 along line P-P was used as a cross-sectional analysis site. In comparative example 1, the cross-sectional analysis of the molar teeth part was performed in the same manner as in example 1. FIG. 18 illustrates a cross section of the molar teeth part of the denture base data 200 of comparative example 1. FIG. 19 illustrates a cross section of the molar teeth part of the denture base data 100 of example 1. As illustrated in FIG. 18, in the socket shape of the molar teeth part in the denture base data 200 of comparative example 1, it was confirmed that the individual sockets 130 were independent. That is, in the molar teeth part of the denture base data 200 of comparative example 1, the adjacent sockets 130 are separated from each other by the socket partition wall 121 and do not communicate with each other. On the other hand, as illustrated in FIG. 19, in the socket shape of the molar teeth part in the denture base data 100 of example 1, it was confirmed that the sockets 130 were connected to each other. That is, in the molar teeth part of the denture base data 100 of example 1, the adjacent sockets 130 communicate with each other by the groove 140, and the plurality of sockets 130 are continuous.

Comparative Analysis of Socket Shapes of Anterior Teeth Part in Denture Base Data of Comparative Example 1 and Example 1

Figure 20:
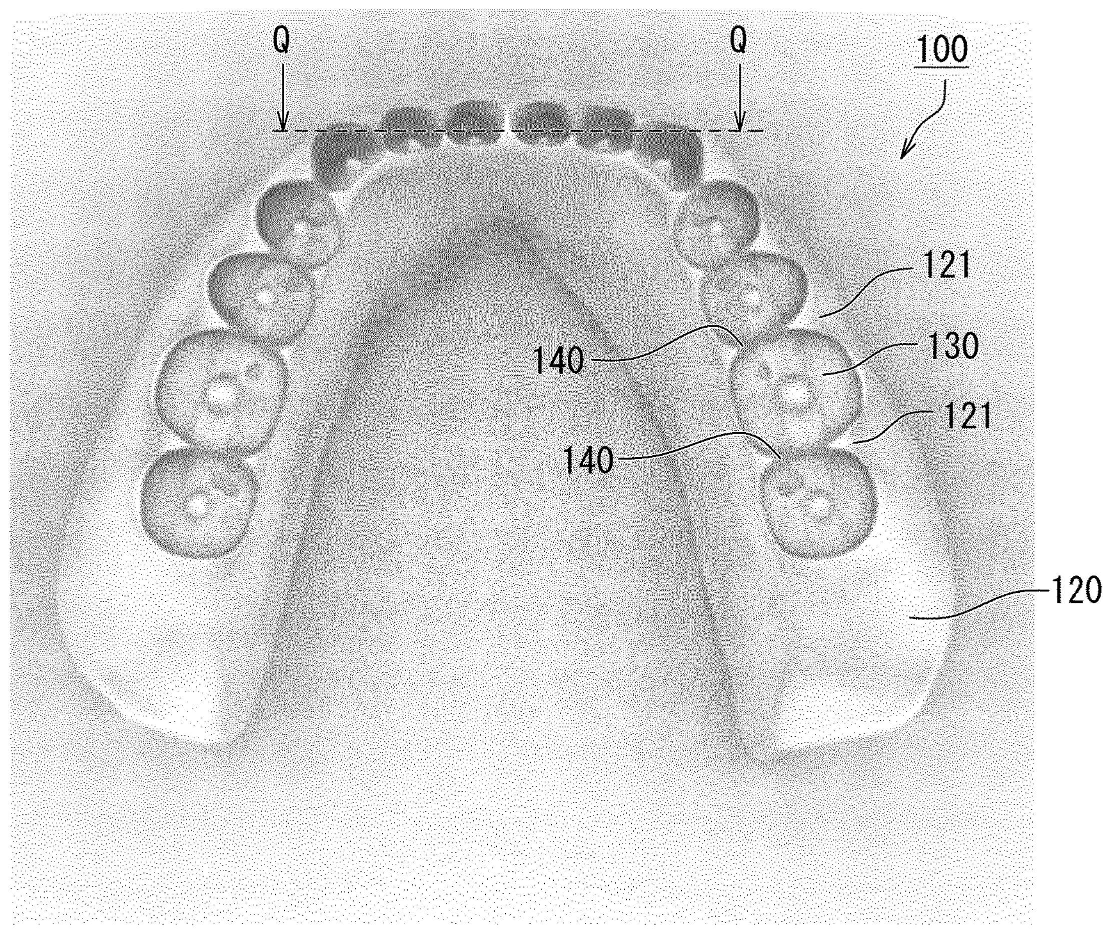
FIG. 20 is a cross-sectional analysis site in anterior teeth part of the denture base data of example 1.
Figure 21:
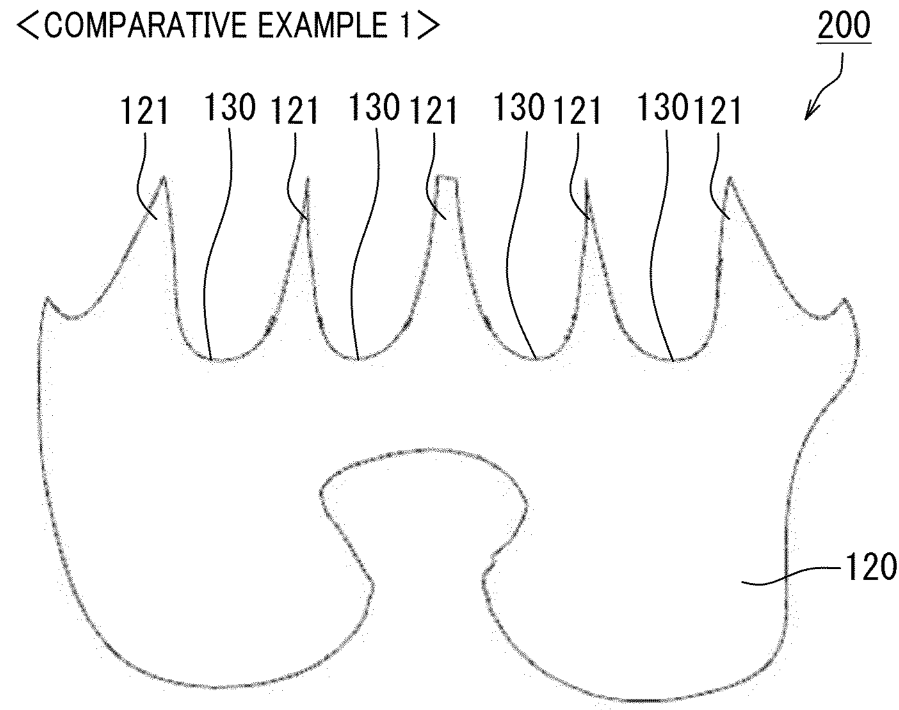
FIG. 21 is a schematic cross-sectional view of anterior teeth part of the denture base data of comparative example 1.
Figure 22:
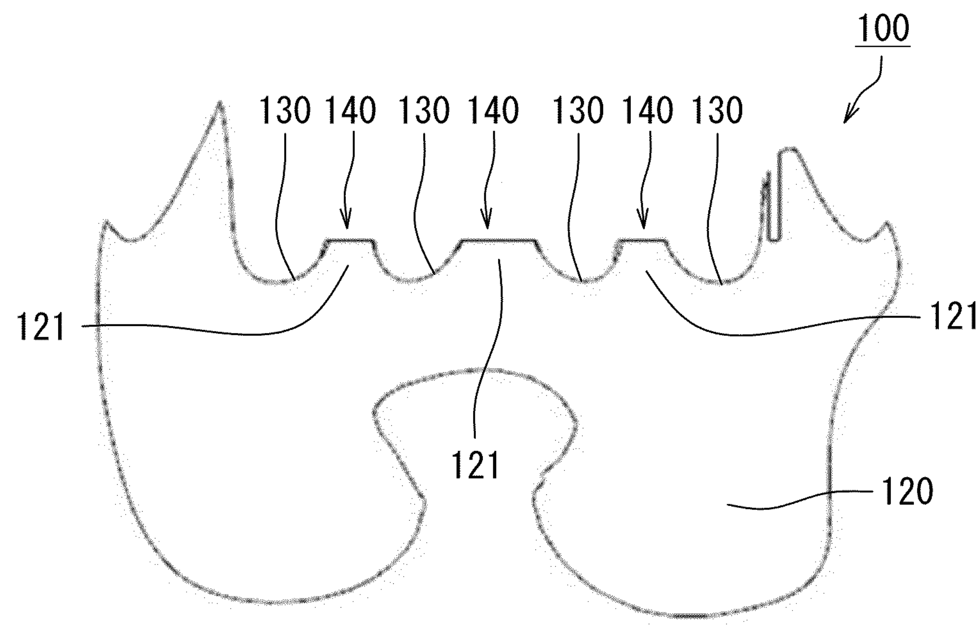
FIG. 22 is a schematic cross-sectional view of anterior teeth part of the denture base data of example 1.

The anterior teeth part of the denture base data 100 and 200 of comparative example 1 and example 1 were analyzed in cross section and compared. The anterior teeth part of the denture base data 100 and 200 refer to portions of the socket where the central incisors to the canine teeth are arranged. FIG. 20 illustrates a cross-sectional analysis site of the anterior teeth part of example 1. As illustrated in FIG. 20, a cross section obtained by cutting the anterior teeth part of the denture base data 100 along line Q-Q was used as a cross-sectional analysis site. In comparative example 1, the cross-sectional analysis of the anterior teeth part was performed in the same manner as in example 1. FIG. 21 illustrates a cross section of the anterior teeth part of the denture base data 200 of comparative example 1. FIG. 22 illustrates a cross section of the anterior teeth part of the denture base data 100 of example 1. As illustrated in FIG. 21, it was confirmed that the socket shapes in the denture base data 200 of comparative example 1 were independent from one another. That is, in the anterior teeth part of the denture base data 200 of comparative example 1, the adjacent sockets 130 are separated from each other by the socket partition wall 121 and do not communicate with each other. On the other hand, as illustrated in FIG. 22, in the socket shape of the anterior teeth part in the denture base data 100 of example 1, it was confirmed that the sockets 130 were connected to each other. That is, in the anterior teeth part of the denture base data 100 of example 1, the adjacent sockets 130 communicate with each other by the groove 140, and the plurality of sockets 130 are continuous.

Comparative Analysis of Socket Connection Site Shape in Denture Base Data of Example 1

Figure 23:
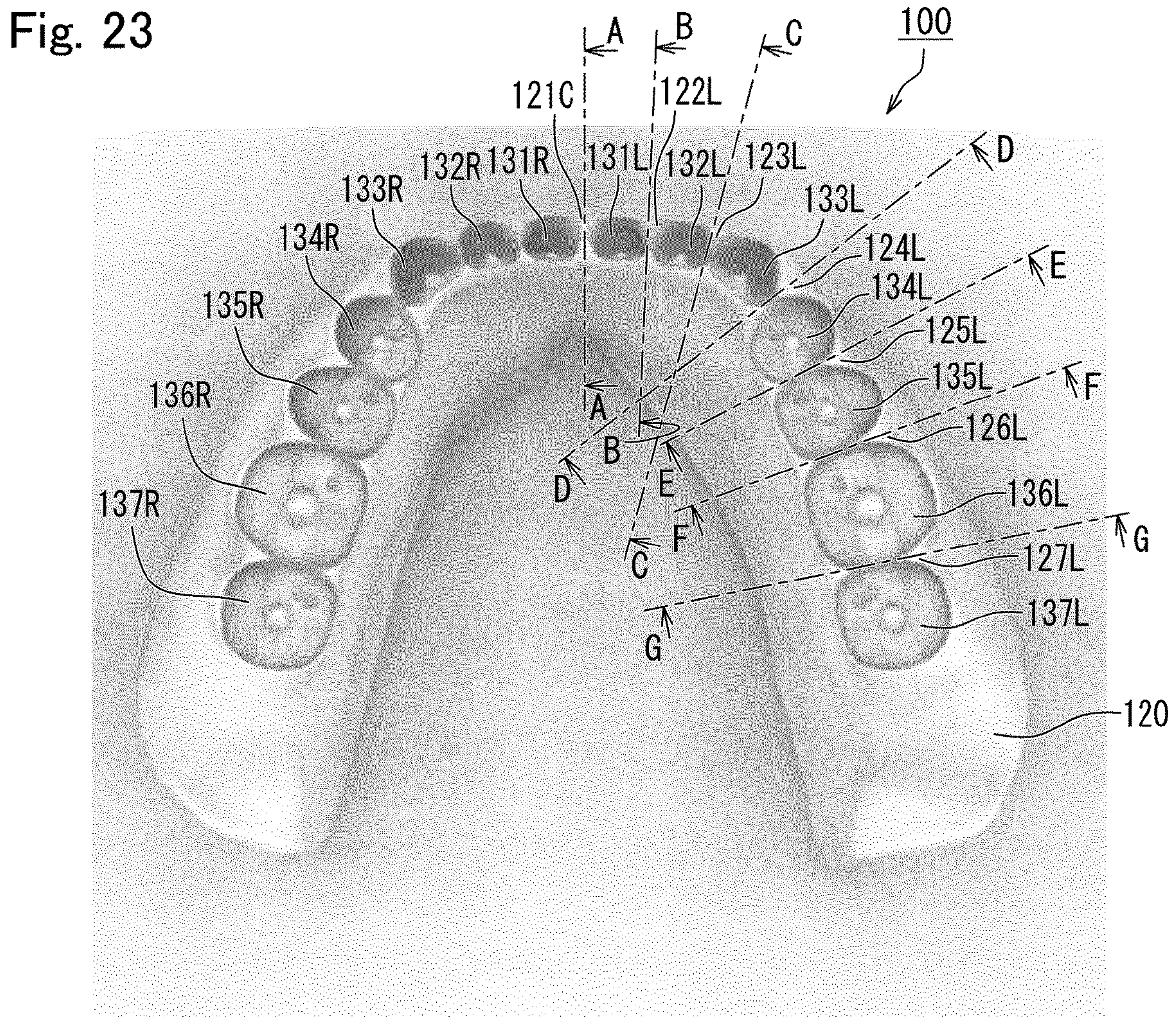
FIG. 23 is a cross-sectional analysis site in a socket connection of the denture base data of example 1.
Figure 24:
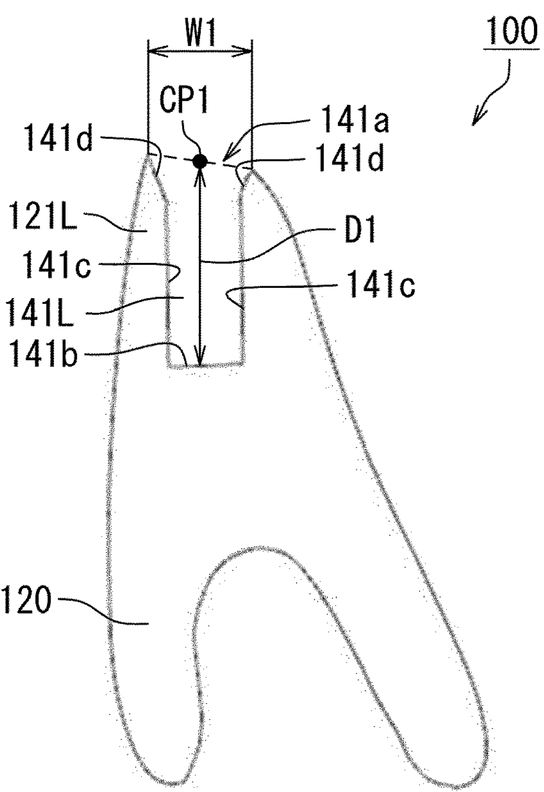
FIG. 24 is a cross-sectional view taken along line A-A of the denture base data illustrated in FIG. 23.
Figure 25:
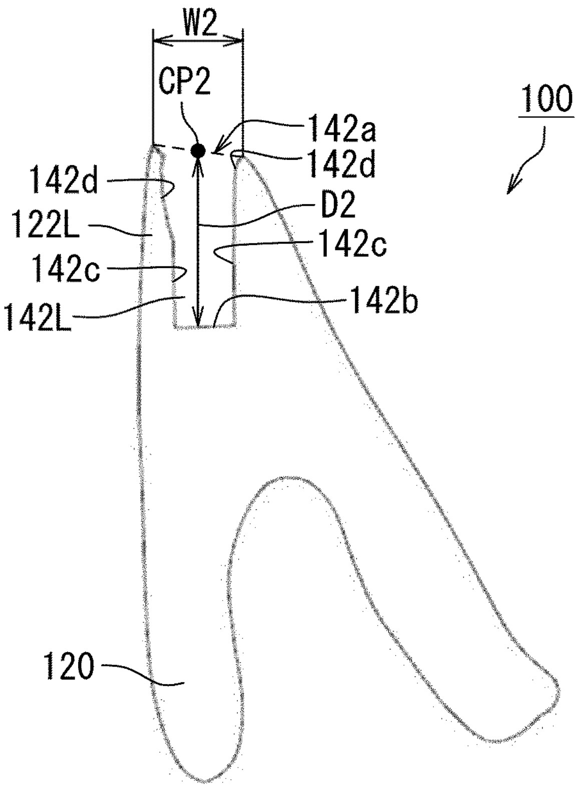
FIG. 25 is a cross-sectional view taken along line B-B of the denture base data illustrated in FIG. 23.
Figure 26:
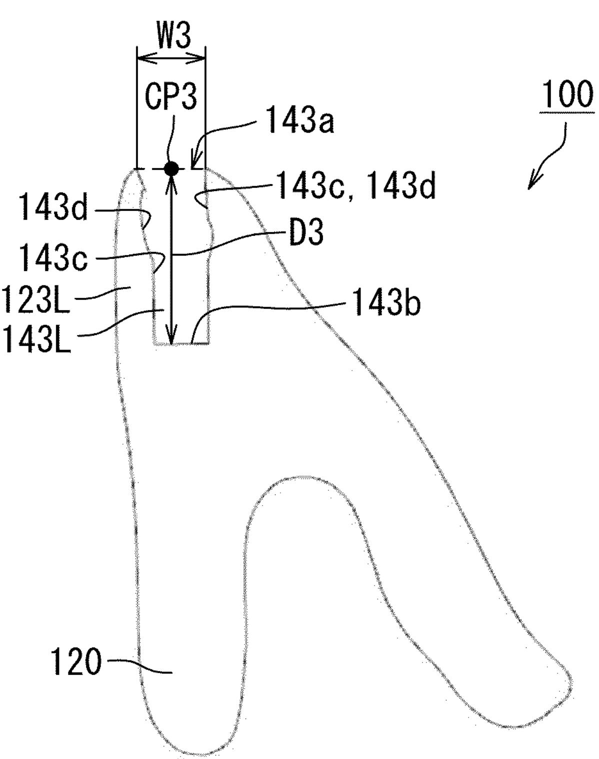
FIG. 26 is a cross-sectional view taken along line C-C of the denture base data illustrated in FIG. 23.
Figure 27:
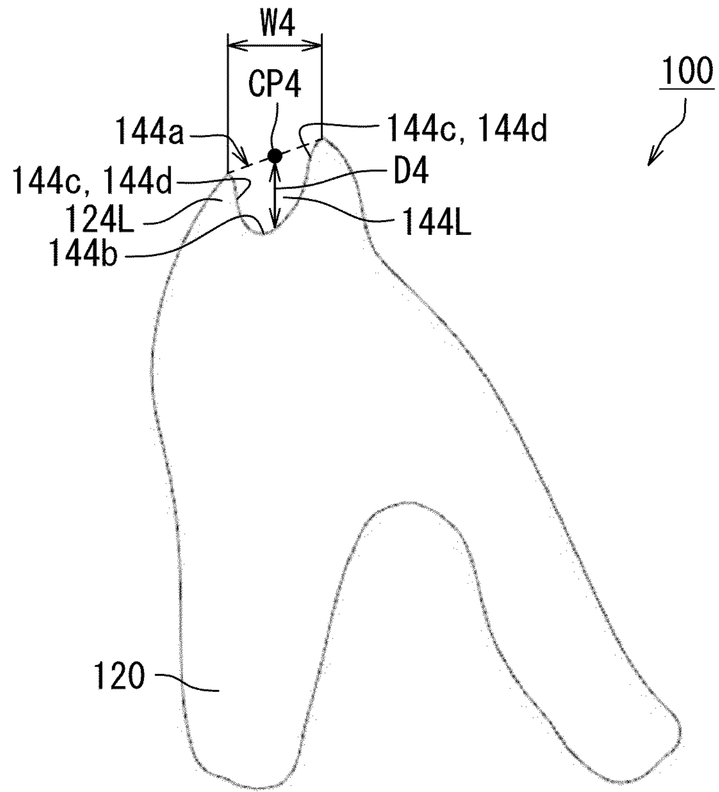
FIG. 27 is a cross-sectional view taken along line D-D of the denture base data illustrated in FIG. 23.
Figure 28:
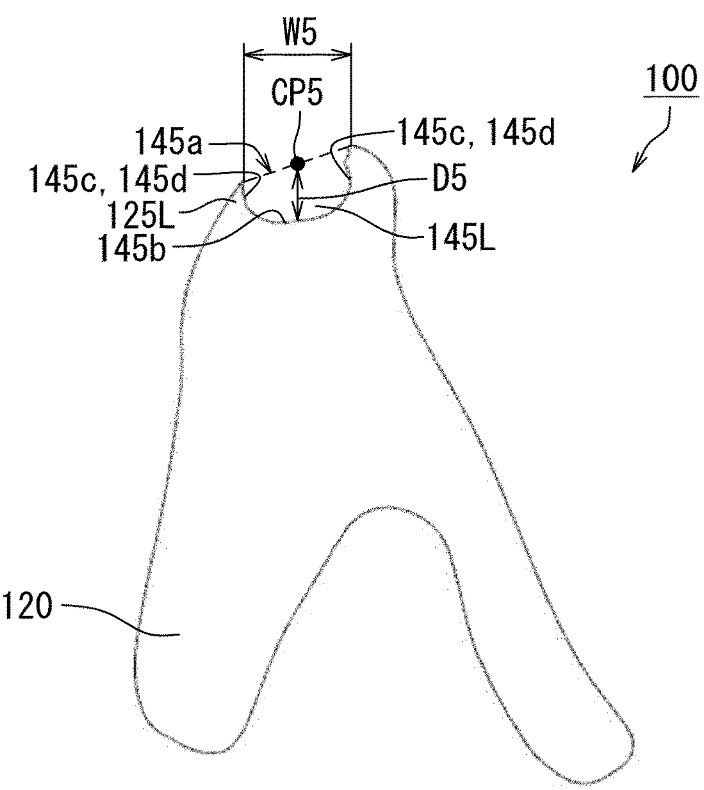
FIG. 28 is a cross-sectional view taken along line E-E of the denture base data illustrated in FIG. 23.
Figure 29:
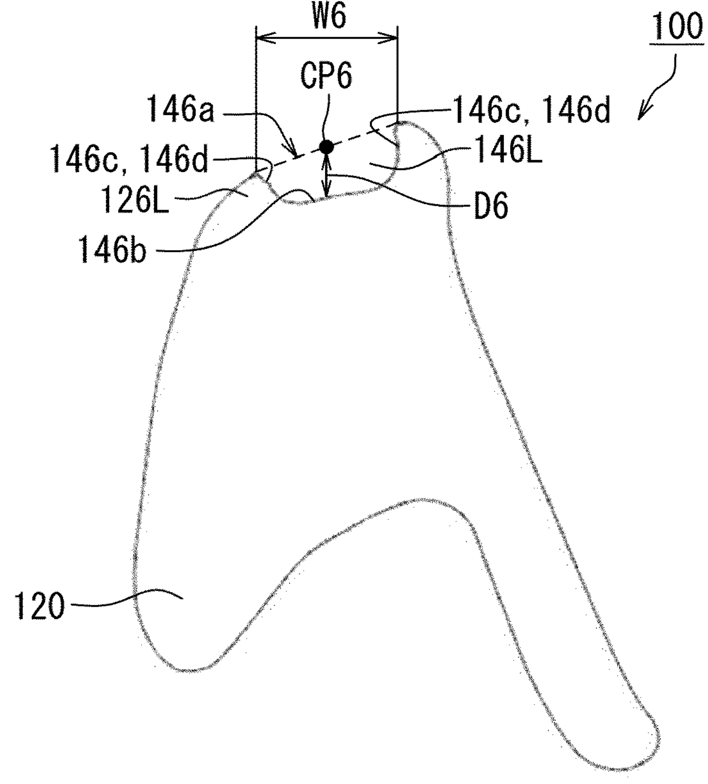
FIG. 29 is a cross-sectional view taken along line F-F of the denture base data illustrated in FIG. 23.
Figure 30:
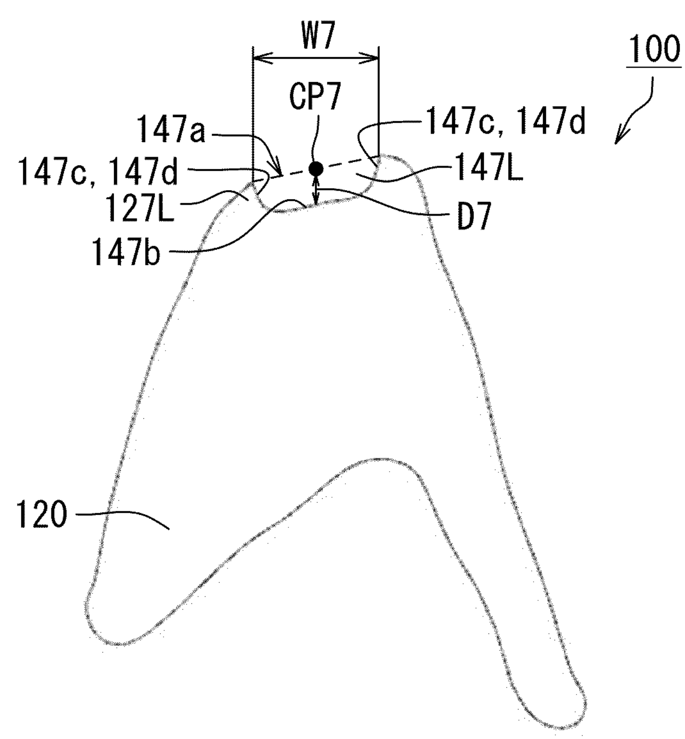
FIG. 30 is a cross-sectional view taken along line G-G of the denture base data illustrated in FIG. 23.

The cross-sectional analysis of a socket connection site of the denture base data 100 of example 1 was performed for comparison. The socket connection site refers to a socket partition wall provided between adjacent sockets. FIG. 23 illustrates a cross-sectional analysis site of the denture base data 100 of example 1. As illustrated in FIG. 23, a cross section obtained by cutting the denture base data 100 along lines A-A to G-G was used as a cross-sectional analysis site. In FIG. 23, first to seventh sockets 131L and 131R to 137L and 137R of the denture base data 100 correspond to the first to seventh sockets 31L and 31R to 37L and 37R of the denture base 10. First to seventh socket partition walls 121C to 127L and 127R of the denture base data 100 correspond to the first to seventh socket partition walls 21 to 27L and 27R of the denture base 10.

FIGS. 24 to 30 are schematic cross-sectional views obtained by cutting the denture base data 100 illustrated in FIG. 23 along lines A-A to G-G, respectively. FIGS. 24 to 30 illustrate schematic cross sections obtained by cutting the first to seventh socket partition walls 121C to 127L of the denture base data 100, respectively.

As illustrated in FIGS. 24 to 30, the first to seventh socket partition walls 121C to 127L of the denture base data 100 are provided with first to seventh grooves 141 to 147L, respectively. The first to seventh grooves 141 to 147L of the denture base data 100 correspond to the first to seventh grooves 41 to 47L of the denture base 10.

The first to seventh grooves 141 to 147L are recessed toward basal portions of the first to seventh sockets 131L to 137L. The first to seventh grooves 141 to 147L penetrate the first to seventh socket partition walls 121C to 127L in the thickness direction of the first to seventh socket partition walls 121C to 127L. The "thickness direction of the first to seventh socket partition walls 121C to 127L" means a direction in which the first to seventh sockets 131L to 137L are adjacent to each other.

The first to seventh grooves 141 to 147L are concave portions having openings 141*a* to 147*a* in the groove depth direction. Specifically, the first to seventh grooves 141 to 147L are defined by bottoms 141*b* to 147*b* and two side walls 141*c* to 147*c* extending from the bottoms 141*b* to 147*b* facing each other. The two side walls 141*c* to 147*c* have inclined walls 141*d* to 147*d* inclined in a direction of increasing the distance between the two side walls 141*c* to 147*c* from the bottoms 141*b* to 147*b* toward the openings 141*a* to 147*a*.

The openings 141*a* to 147*a*, the bottoms 141*b* to 147*b*, the side walls 141*c* to 147*c*, and the inclined walls 141*d* to 147*d* of the denture base data 100 correspond to the openings 41*a* to 47*a*, the bottoms 41*b* to 47*b*, the side walls 41*c* to 47*c*, and the inclined walls 41*d* to 47*d* of the denture base 10, respectively.

Next, a dimensional relationship of the first to seventh grooves 141 to 147L will be described.

Returning to FIGS. 24 to 30, the depths D1 to D3 of the first to third grooves 141 to 143L are larger than the depths D4 to D7 of the fourth to seventh grooves 144L to 147L. Therefore, in the denture base 10 produced on the basis of the denture base data 100, when the plurality of artificial teeth 60 are bonded by the adhesive 70, the adhesive 70 disposed in the first to third grooves 41 to 43L can be made larger in the groove depth direction than the adhesive 70 disposed in the fourth to seventh grooves 144L to 147L.

In the base main body 20 of the denture base 10, the anterior teeth part provided with the first to third sockets 31L to 33L in which the artificial teeth of the central incisor, the lateral incisor, and the canine tooth are arranged is a portion that is easily broken in the longitudinal direction by an external impact such as dropping. The artificial teeth of the central incisor, the lateral incisor, and the canine tooth arranged in the anterior teeth part of the denture base 10 have a role of biting foods, and a force is easily applied in the occlusal direction of the maxilla and the mandibula, that is, the longitudinal direction of the denture base 10. The artificial teeth of the central incisor, the lateral incisor, and the canine tooth are smaller than the artificial teeth of the first premolar to the second molar. For this reason, the artificial teeth of the central incisor, the lateral incisor, and the canine tooth become smaller than the artificial teeth of the first premolar to the second molar in contact area between the food and the teeth at the time of biting the food. As a result, when the artificial teeth of the central incisor, the lateral incisor, and the canine tooth bite food, a force is likely to be locally applied in the longitudinal direction of the denture base 10, and stress is likely to be concentrated.

In the denture base 10, by increasing the depths D1 to D3 of the first to third grooves 41 to 43L, the adhesive 70 in the first to third grooves 41 to 43L is disposed to extend in the longitudinal direction of the denture base 10. Due to this, the anterior teeth part of the denture base 10 can be reinforced in the longitudinal direction, and the strength against the force applied in the longitudinal direction of the denture base 10 is improved.

In the denture base data 100, the depth D3 of the third groove 143L is larger than the depths D1 and D2 of the first and second grooves 141 and 142L. Therefore, in the denture base 10 produced on the basis of the denture base data 100, when the plurality of artificial teeth 60 are bonded by the adhesive 70, the adhesive 70 disposed in the third groove 43L can be made larger in the groove depth direction than the adhesive 70 disposed in the first and second grooves 141 and 142L.

In the anterior teeth part of the denture base 10, the portion of the third socket 33L in which the artificial tooth of canine tooth is disposed is a portion that is more easily broken in the longitudinal direction by an external impact than the first and second sockets 31L and 32L. Therefore, in the depth direction of the groove, by making the adhesive 70 disposed in the third groove 43L larger than that in the first and second grooves 41 and 42L, the portion of the denture base 10 near the third socket 33L can be firmly reinforced in the depth direction of the groove by the adhesive 70.

In the denture base data 100, the widths W4 to W7 of the fourth to seventh grooves 144L to 147L are larger than the widths W1 to W3 of the first to third grooves 141 to 143L. Therefore, in the denture base 10 produced on the basis of the denture base data 100, when the plurality of artificial teeth 60 are bonded by the adhesive 70, the adhesive 70 disposed in the fourth to seventh grooves 44L to 47L can be made larger in the width direction of the groove than the adhesive 70 disposed in the first to third grooves 41 to 43L.

In the base main body 20 of the denture base 10, the molar teeth part provided with the fourth to seventh sockets 34L to 37L in which the first premolar to the second molar are arranged is a portion that is less likely to be broken in the longitudinal direction by an external impact such as dropping than the anterior teeth part provided with the first to third sockets 31L to 37L. The artificial teeth of the first premolar to the second molar disposed in the molar teeth part of the denture base 10 are larger than the artificial teeth of the central incisor, the lateral incisor, and the canine tooth. For this reason, the artificial teeth of the first premolar to the second molar become larger than the artificial teeth of the central incisor, the lateral incisor, and the canine tooth in contact area between the food and the teeth at the time of biting the food. Furthermore, the artificial teeth of the first premolar to the second molar have a role of grinding and shredding the food cut so as to be easily bitten by the anterior teeth part. The artificial teeth of the first premolar to the second molar have a role of bringing the maxillary molar teeth part and the mandibular molar teeth part into contact with each other to stabilize occlusion. Therefore, the artificial teeth of the first premolar to the second molar are likely to be applied with a force in the width direction of the denture base 10, that is, the width direction of the groove, as compared with the artificial teeth of the central incisor, the lateral incisor, and the canine tooth.

In the denture base 10, the widths W4 to W7 of the fourth to seventh grooves 44L to 47L are made larger than the widths W1 to W3 of the first to third grooves 41 to 43L, so that the adhesive 70 in the fourth to seventh grooves 44L to 47L extends in the width direction of the denture base 10. Due to this, the molar teeth part of the denture base 10 can be reinforced in the width direction, and the strength against the force applied in the width direction of the denture base 10 is improved.

The widths W1 to W7 of the first to seventh grooves 141 to 147L illustrated in FIGS. 24 to 30 mean the dimensions of the openings 141*a* to 147*a* in the width direction. As illustrated in FIGS. 24 to 30, the widths W1 to W7 of the first to seventh grooves 141 to 147L are the shortest distances connecting the two side walls 141*c* to 147*c* defining the openings 141*a* to 147*a* when viewed from the groove depth direction. The depths D1 to D7 of the first to seventh grooves 141 to 147L are distances of line segments drawn straight from center points CP1 to CP7 of line segments connecting, at the shortest distance, the two side walls 141*c* to 147*c* defining the openings 141*a* to 147*a* to the centers of the bottoms 141*b* to 147*b* when viewed from the groove depth direction.

The description of the first to seventh grooves 141 to 147L of the denture base data 100 described with reference to FIGS. 24 to 30 is description of the left side of the denture base data 100, but the same applies to the first to seventh grooves 141 to 147R on the right side of the denture base data 100.

Table 1 below illustrates the dimensional ranges of the first to seventh grooves 141 to 147R.

TABLE 1

| | Width mm | Depth mm |
|---|---|---|
| First groove | 2.1-2.8 | 4.4-5.9 |
| Second groove | 2.4-3.2 | 4.7-6.3 |
| Third groove | 1.9-2.6 | 5.4-7.2 |
| Fourth groove | 2.5-3.3 | 1.8-2.5 |
| Fifth groove | 3.5-4.7 | 1.8-2.4 |
| Sixth groove | 4.8-5.7 | 1.5-2.0 |
| Seventh groove | 4.4-5.9 | 1.1-1.5 |

The dimensions of the second to seventh grooves 142L to 147L on the left side of the denture base data 100 are the same as the dimensions of the second to seventh grooves 142R to 147R on the right side of the denture base data 100 illustrated in Table 1.

Comparative Analysis of Heights of Socket Connection Site in Denture Base Data of Comparative Example 1 and Example 1

The denture base data 100 and 200 of comparative example 1 and example 1 and shape data of an artificial tooth were read into the general-purpose CAD software. Then, a point was arranged at a position of an adjacent surface contact point between the artificial teeth. The arranged point was perpendicularly moved toward the basal surface, and a point was arranged at positions in contact with the basal surface. The distance between these two points was measured as the height of the socket connection site. As described above, in the measurement result, the basal surface of the socket was set to 0, and the height to the portion (contact point) where the adjacent surfaces of the artificial teeth were in contact with each other was set to 100. The height of the socket connection site in the denture base data 200 of comparative example 1 was 97. The height of the socket connection site in the denture base data 100 of example 1 was 3.

Comparison of Shapes of Adhesive Layers of Molar Teeth Part Cross Section in Dentures Produced on the Basis of Denture Base Data of Comparative Example 1 and Example 1

The denture base 10 was produced by a 3D printer on the basis of the denture base data 100 of example 1. The adhesive 70 was applied to the denture base 10, the plurality of artificial teeth 60 were arrayed and bonded, and then the plate denture 50 was scraped with a technical trimmer. Then, the molar teeth part cross section was captured with a digital camera, the obtained image was read into the general-purpose CAD software, and the adhesive layer including the adhesive 70 was traced with a free curve, whereby cross-sectional data of the adhesive layer in the molar teeth part cross section was acquired. The molar teeth part cross section is similar to the cross-sectional view taken along line P-P illustrated in FIG. 17. In comparative example 1, the cross-sectional data of the adhesive layer in the molar teeth part cross section was acquired by the same method.

A DLP type 3D printer (IMD-2.0, Carima, South Korea) was used as the 3D printer. As a denture base material for producing the denture base 10, an acrylic resin was used. As the plurality of artificial teeth 60, single ready-made artificial teeth (Veracia SA, Shofu, Japan) were used. As the adhesive 70, an autopolymer resin (Provinice, Shofu) was used.

Figure 31:
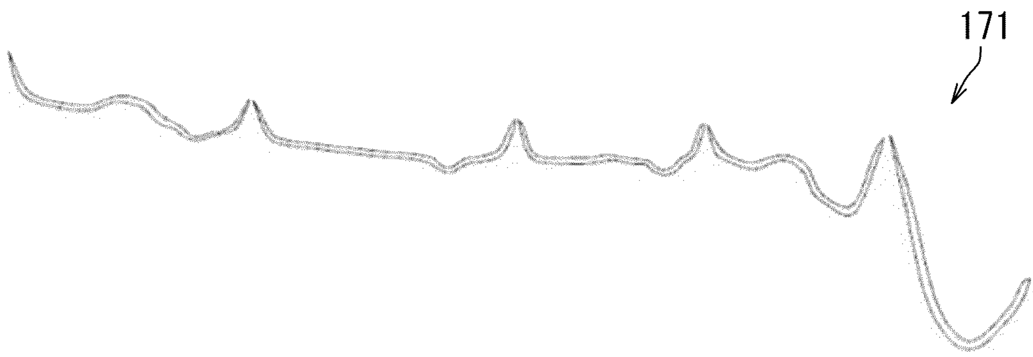
FIG. 31 is a schematic cross-sectional view of an adhesive layer of molar teeth part in a denture produced on the basis of comparative example 1.
Figure 32:
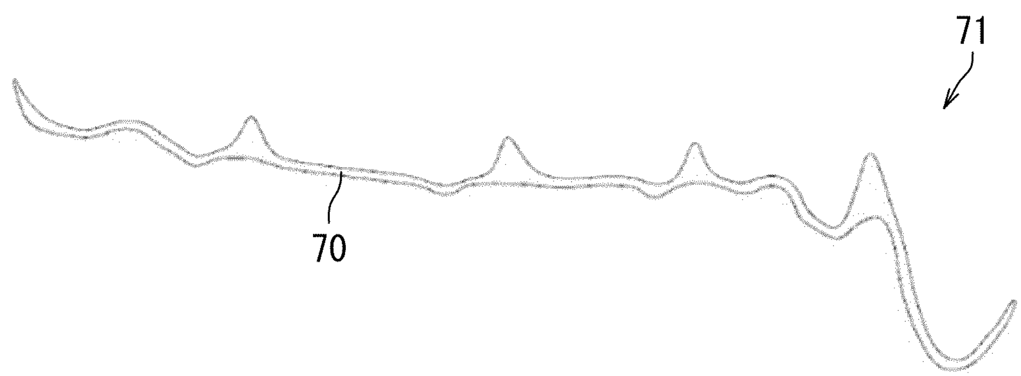
FIG. 32 is a schematic cross-sectional view of an adhesive layer of molar teeth part in a denture produced on the basis of example 1.

FIG. 31 illustrates the adhesive layer of the molar teeth part cross section in the denture produced on the basis of comparative example 1. FIG. 32 illustrates the adhesive layer of the molar teeth part cross section in the denture produced on the basis of example 1. For ease of explanation, FIGS. 31 and 32 do not illustrate the denture base and the artificial teeth is omitted, and illustrate the adhesive layer.

In the denture base produced on the basis of the denture base data 200 of comparative example 1, since the plurality of sockets were independent in the molar teeth part, it was confirmed that an adhesive layer 171 was also independent for each socket as illustrated in FIG. 31. That is, in the molar teeth part of comparative example 1, the adhesive layer 171 is divided between the adjacent sockets and is not continuous. The thickness of the adhesive layer 171 is substantially constant. On the other hand, in the denture base 10 produced on the basis of the denture base data 100 of example 1, since the plurality of sockets 30 were connected in the molar teeth part, it was confirmed that the adhesive layer 71 of the plate denture 50 was also continuous as illustrated in FIG. 32. That is, in the molar teeth part of example 1, since the plurality of sockets 30 of the denture base 10 are communicated by the grooves 44L and 44R to 47L and 47R, the adhesive 70 is disposed in a seamless manner over the plurality of sockets 30. In the molar teeth part of example 1, since the denture base 10 was filled with the adhesive 70 also in the lower embrasure in the single ready-made artificial teeth, it was confirmed that the shape of the adhesive layer 71 had a wave shape when viewed from the side surface. That is, in the molar teeth part of example 1, the adhesive 70 is disposed in the grooves 44L and 44R to 47L and 47R provided between the adjacent sockets 30. Due to this, the thickness of the adhesive layer 71 disposed in the grooves 44L and 44R to 47L and 47R is larger than the thickness of the adhesive layer 71 disposed in the plurality of sockets 30.

Comparison of Shapes of Adhesive Layers of Anterior Teeth Part Cross Section in Dentures Produced on the Basis of Denture Base Data of Comparative Example 1 and Example 1

Cross-sectional data of the adhesive layer in the anterior teeth part cross section of the dentures produced in comparative example 1 and example 1 were acquired by the same method as the comparison of shapes of adhesive layers of molar teeth part cross section. The anterior teeth part cross section is similar to the cross-sectional view taken along line Q-Q illustrated in FIG. 20. Also in comparative example 1, cross-sectional data of the adhesive layer in the anterior teeth part section was acquired by the same method.

Figure 33:
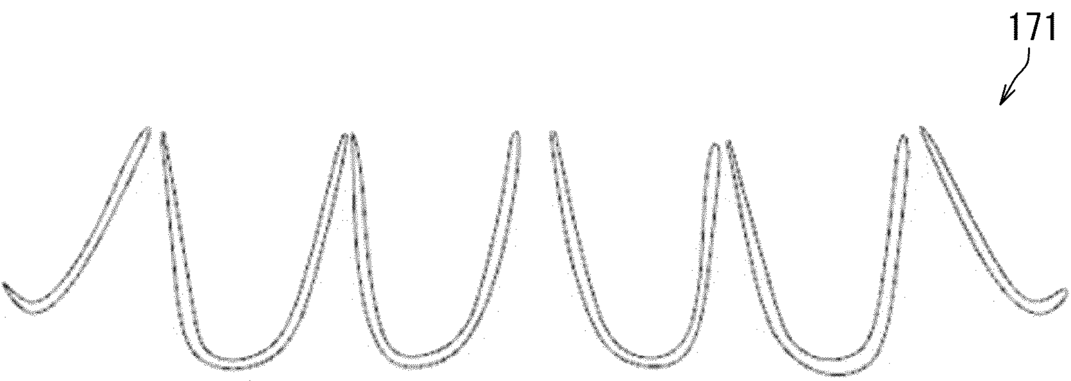
FIG. 33 is a schematic cross-sectional view of an adhesive layer of anterior teeth part in the denture produced on the basis of comparative example 1.
Figure 34:
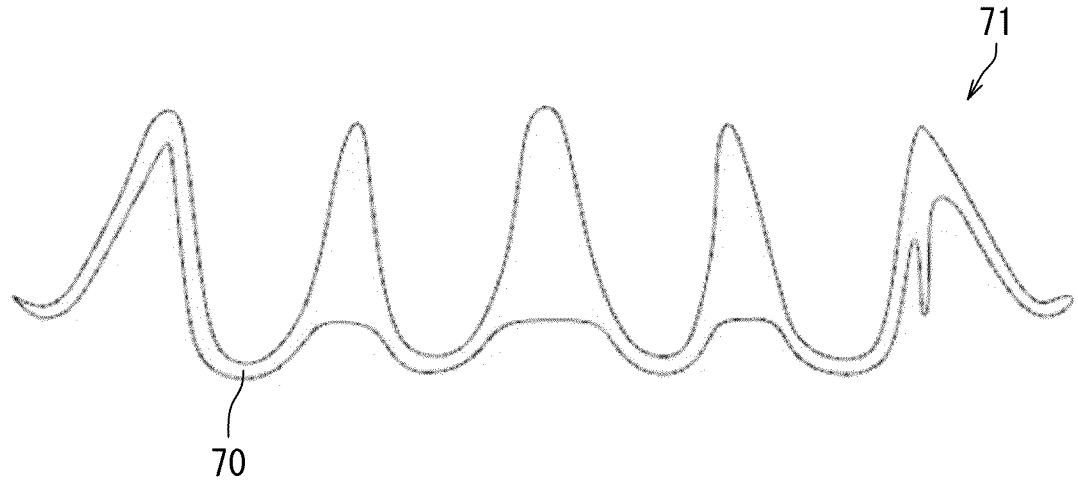
FIG. 34 is a schematic cross-sectional view of an adhesive layer of anterior teeth part in the denture produced on the basis of example 1.

FIG. 33 illustrates the adhesive layer 171 of the anterior teeth part cross section in the denture produced on the basis of comparative example 1. FIG. 34 illustrates an adhesive layer 71 of the anterior teeth part cross section in the denture produced on the basis of example 1. For ease of explanation, FIGS. 33 and 34 do not illustrate the denture base and the artificial teeth is omitted, and illustrate the adhesive layer.

In the denture base produced on the basis of the denture base data 200 of comparative example 1, since the plurality of sockets were independent in the anterior teeth part similarly to the molar teeth part, it was confirmed that the adhesive layer 171 was also independent for each socket as illustrated in FIG. 33. That is, also in the anterior teeth part of comparative example 1, similarly to the molar teeth part, the adhesive layer 171 is divided between the adjacent sockets and is not continuous. On the other hand, in the denture base produced on the basis of the denture base data 100 of example 1, since the plurality of sockets 30 were connected in the anterior teeth part, it was confirmed that the adhesive layer 71 was also continuous as illustrated in FIG. 34. That is, in the anterior teeth part of example 1, since the plurality of sockets 30 of the denture base 10 are communicated by the grooves 41 to 43L and 43R, the adhesive 70 is disposed in a seamless manner over the plurality of sockets 30. In the anterior teeth part of example 1, since the denture base 10 was filled with the adhesive 70 also in the lower embrasure in the single ready-made artificial teeth, it was confirmed that the shape of the adhesive layer 71 had a wave shape when viewed from the side surface. That is, in the anterior teeth part of example 1, the adhesive 70 is disposed in the grooves 41 to 43L and 43R provided between the adjacent sockets 30. Due to this, the thickness of the adhesive layer 71 disposed in the grooves 41 to 43L and 43R is larger than the thickness of the adhesive layer 71 disposed in the plurality of sockets 30.

Comparison of Shapes of Adhesive Layers in Dentures Produced on the Basis of Denture Base Data of Comparative Example 1 and Example 1

Figure 35:
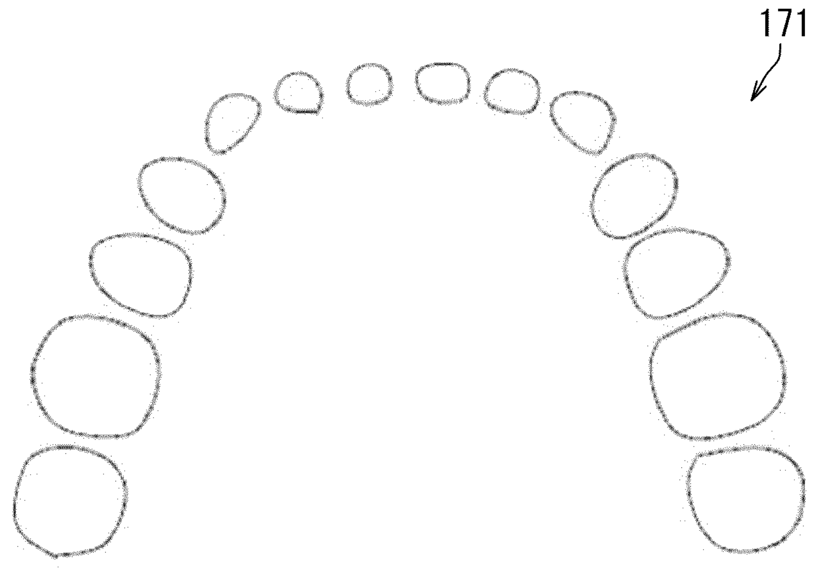
FIG. 35 is a schematic cross-sectional view of an adhesive layer in the denture produced on the basis of comparative example 1 in plan view.
Figure 36:
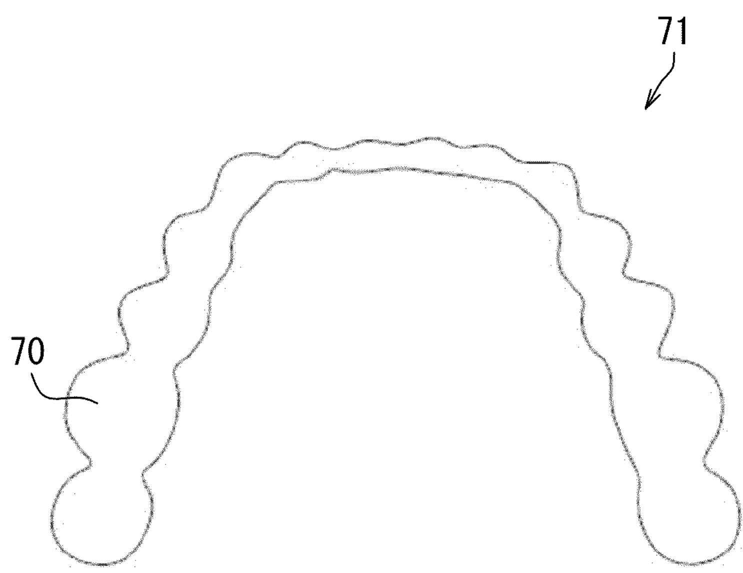
FIG. 36 is a schematic cross-sectional view of an adhesive layer in the denture produced on the basis of example 1 in plan view.

Cross-sectional data in plan view of the adhesive layer of the dentures produced in comparative example 1 and example 1 were acquired by the same method as the comparison of shapes of adhesive layers of molar teeth part cross section. FIG. 35 illustrates a cross section in plan view of the adhesive layer 171 in the denture produced on the basis of comparative example 1. FIG. 36 illustrates a cross section in plan view of the adhesive layer 71 in the denture produced on the basis of example 1. For ease of explanation, FIGS. 35 and 36 do not illustrate the denture base and the artificial teeth is omitted, and illustrate the adhesive layer.

In the denture base produced on the basis of the denture base data 200 of comparative example 1, since the plurality of sockets were independent, it was confirmed that the adhesive layer 171 was also independent. On the other hand, in the denture base 10 produced on the basis of the denture base data 100 of example 1, since the plurality of sockets 30 were connected, it was confirmed that the adhesive layer 71 was also continuous. It was also confirmed that the adhesive layer 71 of the denture base 10 of example 1 had a U shape when viewed from above.

(Production of Mandibular Denture for Drop Test)

As mandibular dentures for a drop test, four types of dentures were produced on the basis of the denture base data of comparative example 1 and examples 2 to 4.

Example 2 is denture base data in which six sockets of the anterior teeth part are connected. Example 2 is different from the denture base data 100 of example 1 in that the socket of the molar teeth part is not connected. In the denture base data of example 2, the first to third grooves 41 to 43L and 43R for allowing the first to third sockets 31L and 31R to 33L and 33R to communicate are provided, but the fourth to seventh sockets 34L and 34R to 37L and 37R do not communicate with each other and are independent of one another.

The basal surface of the socket is defined as 0, and the height to the portion (contact point) where the adjacent surfaces of the adjacent artificial teeth are in contact with each other is defined as 100. When defined in this way, in example 2, the height from the basal surface of the socket of the anterior teeth part (6 teeth: No. 1 to 3 on both sides) to the bottoms 41*b* to 43*b* of the grooves 41 to 43L and 43R is 5.

Examples 3 and 4 are denture base data in which 14 sockets are connected. The basic shape of the denture base data of examples 3 and 4 is the same as that of the denture base data 100 of example 1. In example 3, the heights of the bottoms 41*b* to 43*b* of the grooves 41 to 43L and 43R of the anterior teeth part are lower than those in example 4. That is, in example 3, the depths of the grooves 41 to 43L and 43R of the anterior teeth part are larger than those in example 4.

The basal surface of the socket is defined as 0, and the height to the portion (contact point) where the adjacent surfaces of the adjacent artificial teeth are in contact with each other is defined as 100. When defined in this way, in example 3, the height from the basal surface of the socket of the anterior teeth part (6 teeth: No. 1 to 3 on both sides) to the bottoms 41*b* to 43*b* of the grooves 41 to 43L and 43R is 20, and the height from the basal surface of the socket of the molar teeth part (8 teeth: No. 4 to 8 on both sides) to the bottoms 44*b* to 47*b* of the grooves 44L and 44R to 47L and 47R is 5.

In example 4, the height from the basal surface of the socket of the anterior teeth part (6 teeth: No. 1 to 3 on both sides) to the bottoms 41*b* to 43*b* of the grooves 41 to 43L and 43R is 5, and the height from the basal surface of the socket of the molar teeth part (8 teeth: No. 4 to 8 on both sides) to the bottoms 44*b* to 47*b* of the grooves 44L and 44R to 47L and 47R is 5.

In comparative example 1 and examples 2 to 4, denture bases were shaped using a DLP type 3D printer (IMD-2.0, Carima, South Korea) and a denture base material (acrylic resin). Then, the adhesive surface of the single ready-made artificial teeth (Veracia SA, Shofu, Japan) was roughened with a carborundum point, and the artificial teeth were bonded to the denture base with the autopolymer resin (Provinice, Shofu). Then, finish polishing was performed. In each of comparative example 1 and examples 2 to 4, three mandibular dentures for a drop test were produced.

(Drop Test of Mandibular Denture)

Figure 37:
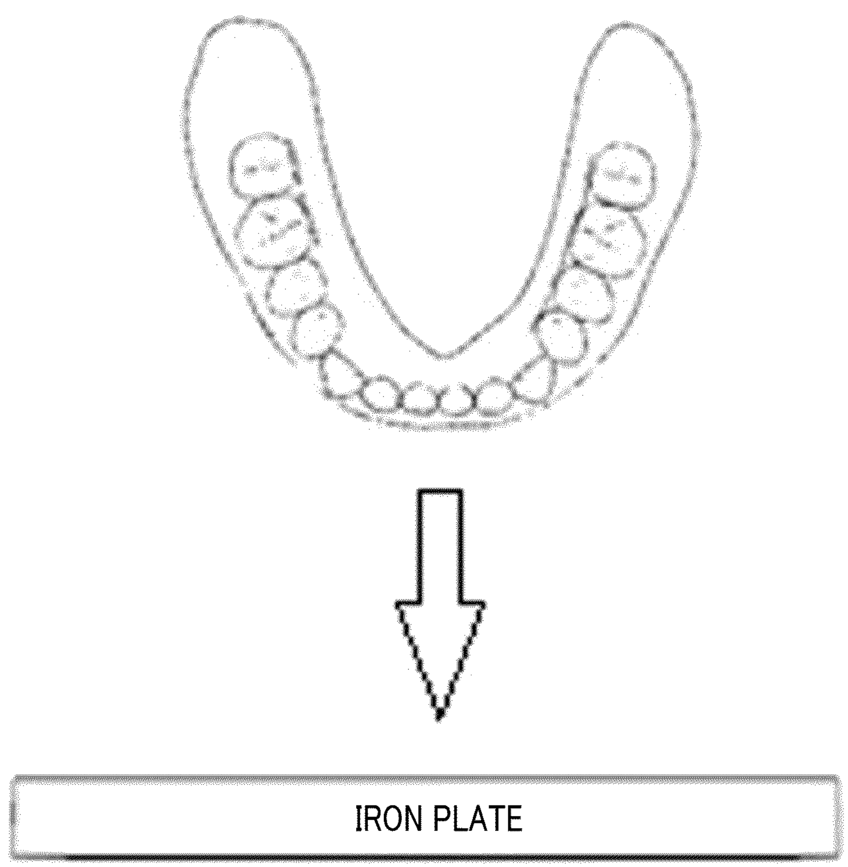
FIG. 37 is a schematic diagram of a drop test of a mandibular denture.

FIG. 37 illustrates a schematic diagram of a drop test of the mandibular denture. The single ready-made artificial tooth adhesive type mandibular dentures produced in comparative example 1 and examples 2 to 4 were dropped from a predetermined height onto an iron plate to confirm whether or not the dentures were broken. Specifically, the dentures were dropped at heights of 50 cm, 100 cm, 150 cm, and 200 cm from the iron plate. In the drop test, the dentures were dropped in ascending order of height, whether or not the dentures were broken was confirmed, and the test was stopped for broken dentures.

The drop test results of the single ready-made artificial tooth adhesive type mandibular denture in comparative example 1 are illustrated in Table 2.

TABLE 2

| | Comparative Example 1 | | |
|---|---|---|---|
| Sample No | 1 | 2 | 3 |
| Drop from 50 cm | Broken | Broken | Broken |
| Drop from 100 cm | | | |
| Drop from 150 cm | | | |
| Drop from 200 cm | | | |

The drop test results of the single ready-made artificial tooth adhesive type mandibular denture in example 2 are illustrated in Table 3.

TABLE 3

| | Example 2 | | |
|---|---|---|---|
| Sample No | 1 | 2 | 3 |
| Drop from 50 cm | Not Broken | Not Broken | Not Broken |
| Drop from 100 cm | Not Broken | Broken | Broken |
| Drop from 150 cm | Broken | | |
| Drop from 200 cm | | | |

The drop test results of the single ready-made artificial tooth adhesive type mandibular denture in example 3 are illustrated in Table 4.

TABLE 4

| | Example 3 | | |
|---|---|---|---|
| Sample No | 1 | 2 | 3 |
| Drop from 50 cm | Not Broken | Not Broken | Not Broken |
| Drop from 100 cm | Not Broken | Broken | Broken |
| Drop from 150 cm | Broken | | |
| Drop from 200 cm | | | |

The drop test results of the single ready-made artificial tooth adhesive type mandibular denture in example 4 are illustrated in Table 5.

TABLE 5

| | Example 4 | | |
|---|---|---|---|
| Sample No | 1 | 2 | 3 |
| Drop from 50 cm | Not Broken | Not Broken | Not Broken |
| Drop from 100 cm | Not Broken | Not Broken | Not Broken |
| Drop from 150 cm | Not Broken | Not Broken | Not Broken |
| Drop from 200 cm | Broken | Broken | Broken |

In the present drop test, those dentures that were not broken were described as "Not Broken", and those dentures that were broken were described as "Broken". The "broken" means that the denture is fractured. In comparative example 1, it was confirmed that all the dentures were broken when dropped from the height of 50 cm. In example 2, two dentures were broken when dropped from the height of 100 cm, and one denture was broken when dropped from the height of 150 cm. In example 2, it was confirmed that the reinforcing effect was obtained as compared with comparative example 1.

In example 3, the denture was not stably broken when dropped from the height of 50 cm. However, it was confirmed that two dentures broken when dropped from the height 100 cm, and one denture was broken when dropped from the height 150 cm. In example 4, there was no variation between samples, and it was confirmed that all the dentures were not broken up to being dropping from the height of 150 cm.

The difference in conditions among comparative example 1 and examples 2 to 4 is the number of socket connections, the height of the socket side surface (the depth of the groove), and the shape of the adhesive associated to that. From the present test result, it was confirmed that the assembled denture was less likely to be broken when dropped as the number of socket connections was larger and the height of the socket side surface was lower (the depth of the groove was deeper).

(Breakage Phase of Single Ready-Made Artificial Tooth Adhesive Type Mandibular Denture after Drop Test)

Figure 38:
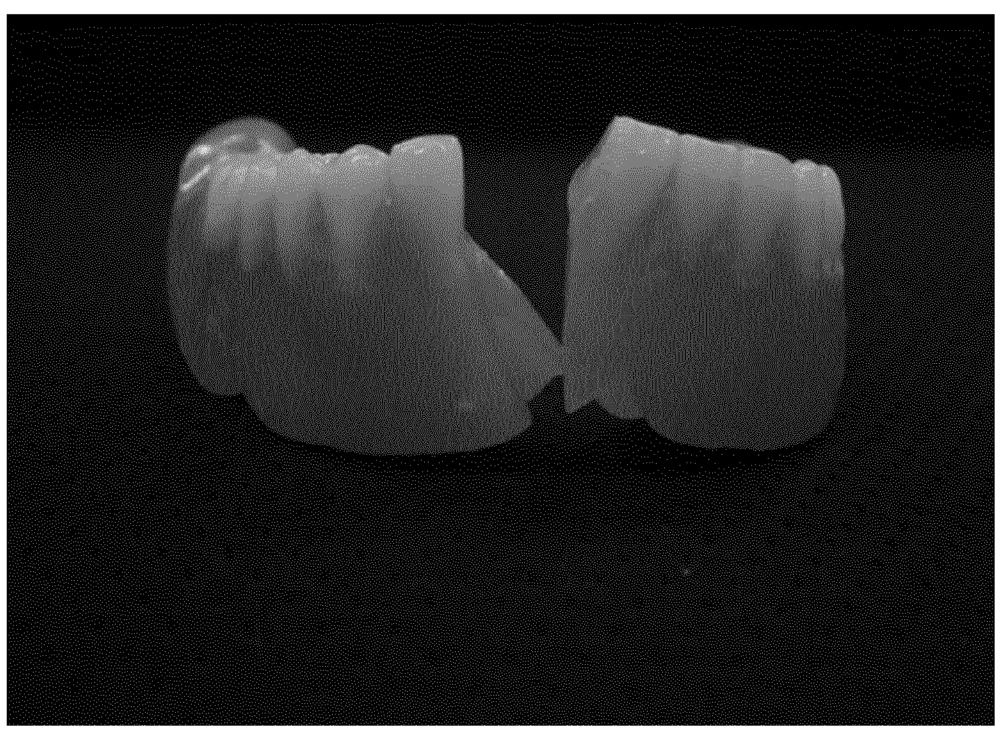
FIG. 38 is a photograph of a breakage phase of a single ready-made artificial tooth adhesive type mandibular denture of comparative example 1 captured from the labial side of the denture.
Figure 39:
FIG. 39 is a photograph of a breakage phase of the single ready-made artificial tooth adhesive type mandibular denture of comparative example 1 captured from the upper surface side of the denture.
Figure 40:
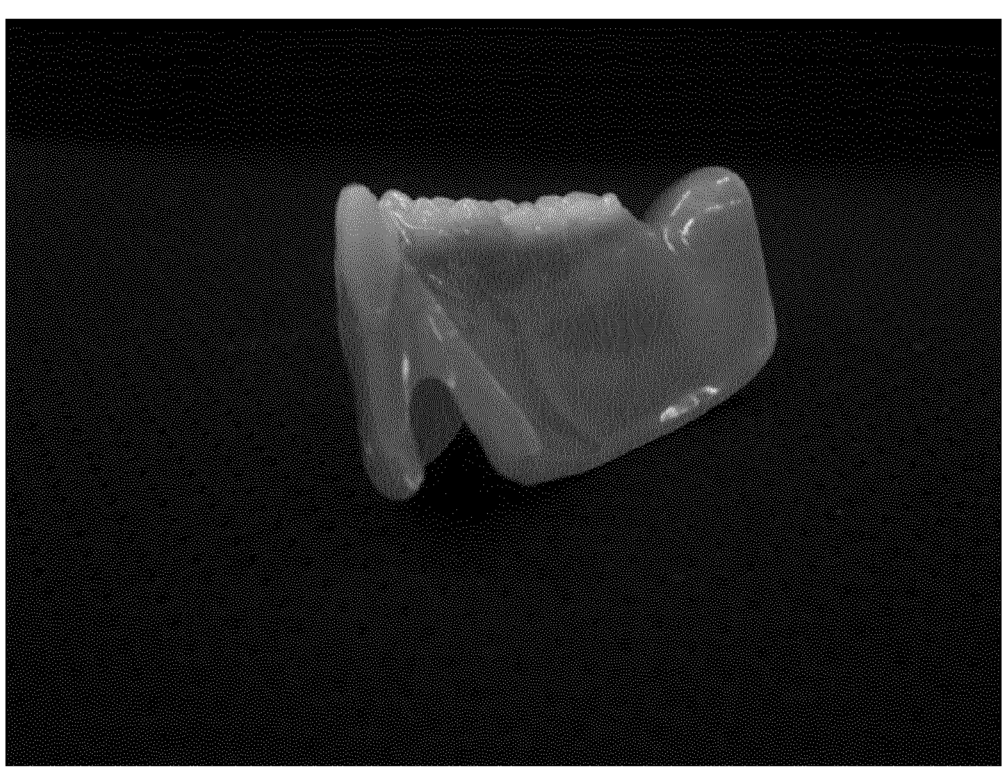
FIG. 40 is a photograph of a fracture surface of the single ready-made artificial tooth adhesive type mandibular denture of comparative example 1.
Figure 41:
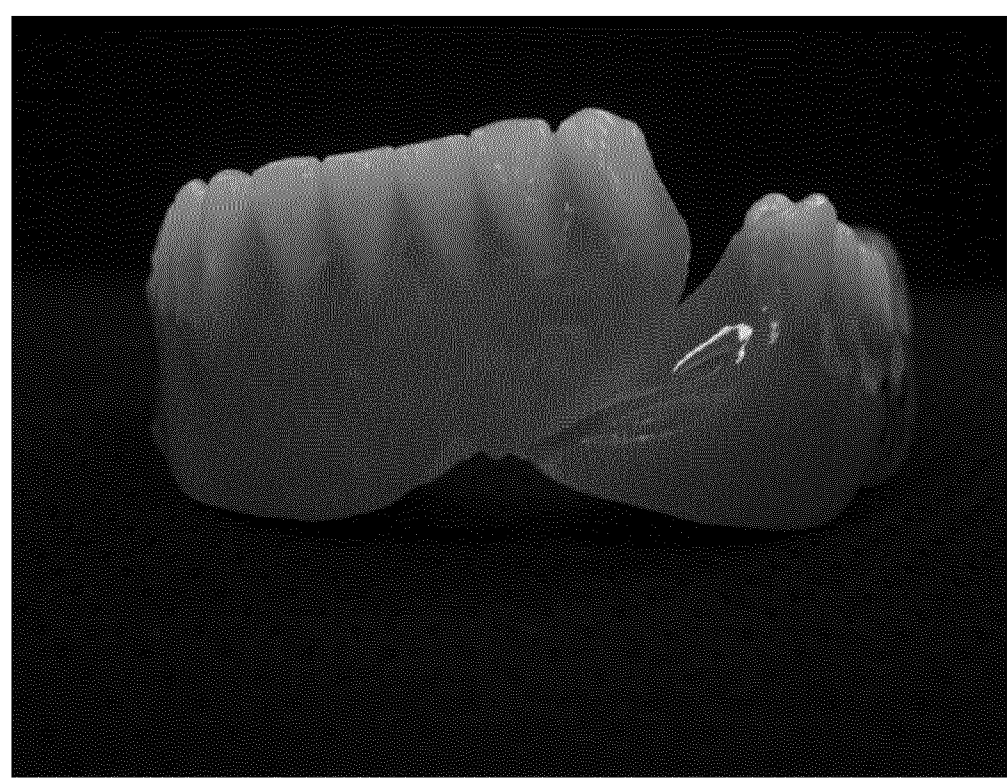
FIG. 41 is a photograph of a breakage phase of a single ready-made artificial tooth adhesive type mandibular denture of example 2 captured from the labial side of the denture.
Figure 42:
FIG. 42 is a photograph of a breakage phase of the single ready-made artificial tooth adhesive type mandibular denture of example 2 captured from the upper surface side of the denture.
Figure 43:
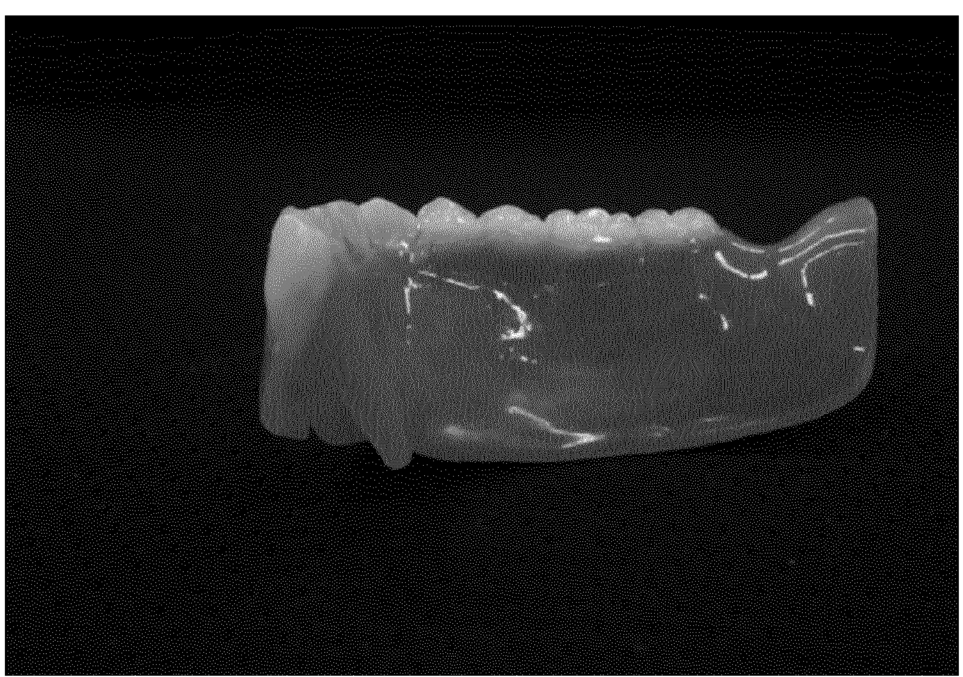
FIG. 43 is a photograph of a fracture surface of the single ready-made artificial tooth adhesive type mandibular denture of example 2.
Figure 44:
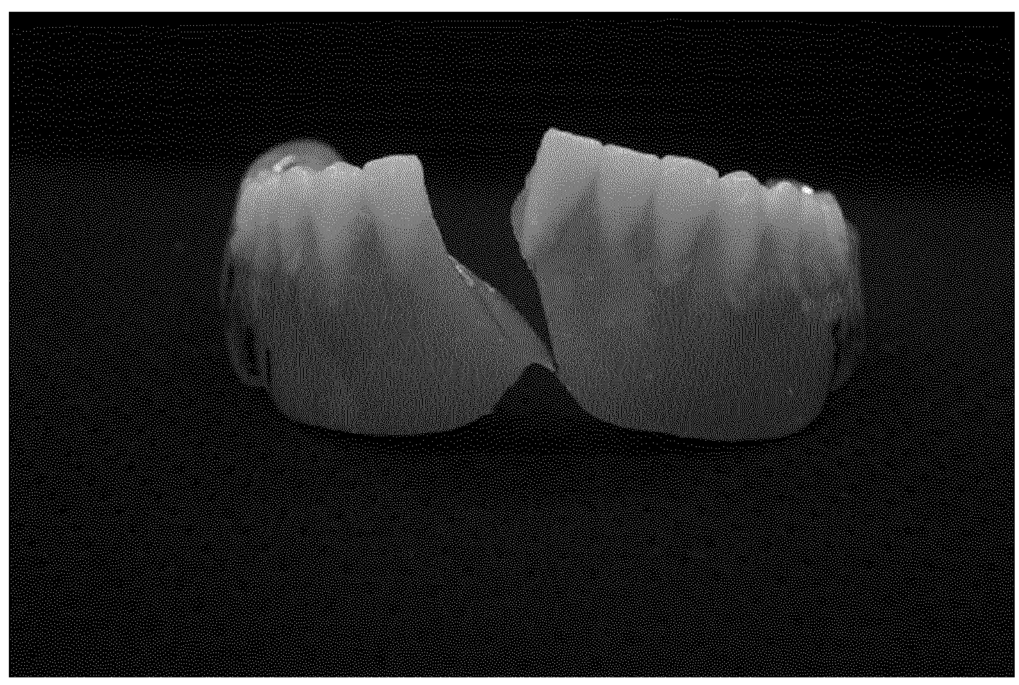
FIG. 44 is a photograph of a breakage phase of a single ready-made artificial tooth adhesive type mandibular denture of example 3 captured from the labial side of the denture.
Figure 45:
FIG. 45 is a photograph of a breakage phase of the single ready-made artificial tooth adhesive type mandibular denture of example 3 captured from the upper surface side of the denture.
Figure 46:
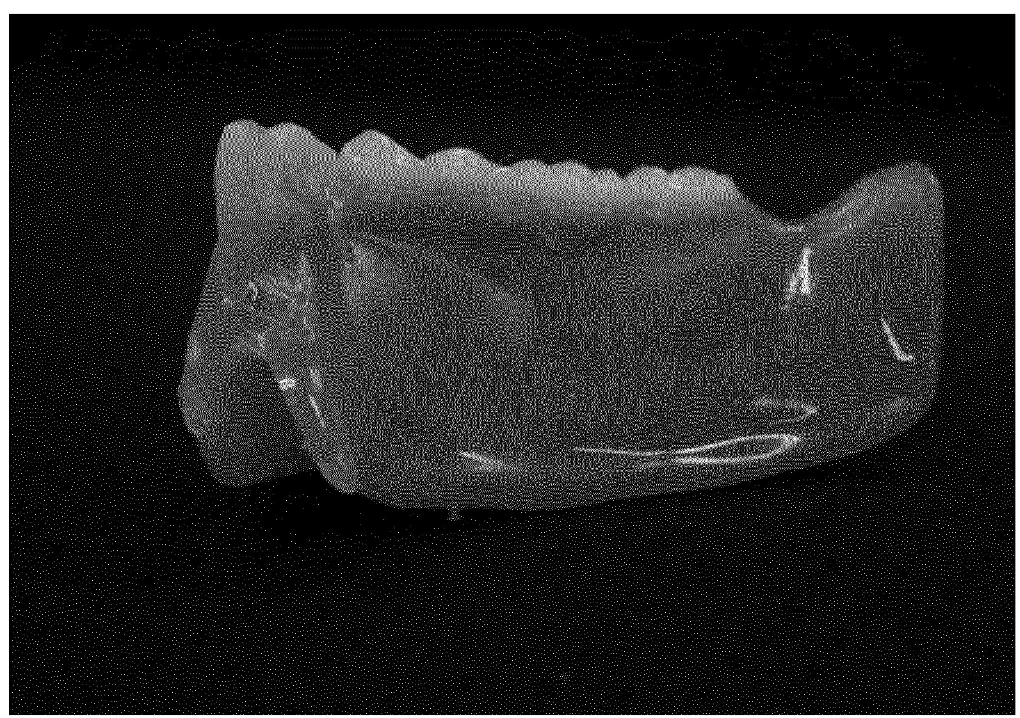
FIG. 46 is a photograph of a fracture surface of the single ready-made artificial tooth adhesive type mandibular denture of example 3.

FIGS. 38 to 40 illustrate a breakage phase of the denture of comparative example 1. FIGS. 41 to 43 illustrate a breakage phase of the denture of example 2. FIGS. 44 to 46 illustrate a breakage phase of the denture of example 3. As illustrated in FIGS. 38 to 40, it was confirmed that the denture of comparative example 1 was linearly broken from the zonule to the single ready-made artificial teeth. The fracture surface exhibited glossiness. As illustrated in FIGS. 41 to 43, it was confirmed that the denture of example 2 was greatly curved from the zonule to the mesial first premolar when broken. The fracture surface exhibited glossiness. As illustrated in FIGS. 44 to 46, it was confirmed that the denture of example 3 was slightly curved from the zonule to the mesial surface of the mandibular lateral incisor when broken. The broken surface had irregularities, and had little glossiness. From the present results, in the denture of comparative example 1, the material itself of the denture base was brittle and fractures as glass, but as the number of socket connections increased as in examples 2 and 3, there was a clear difference in the breakage phase of the denture. This indicates that the reinforcing effect can be obtained in the single ready-made artificial tooth adhesive type mandibular denture depending on the characteristics and shape of the adhesive layer.

(Comparison of Aesthetics of Denture)

Figure 47:
FIG. 47 is a photograph of a single ready-made artificial tooth adhesive type denture without a metal reinforcement wire captured from above in comparative example 1.
Figure 48:
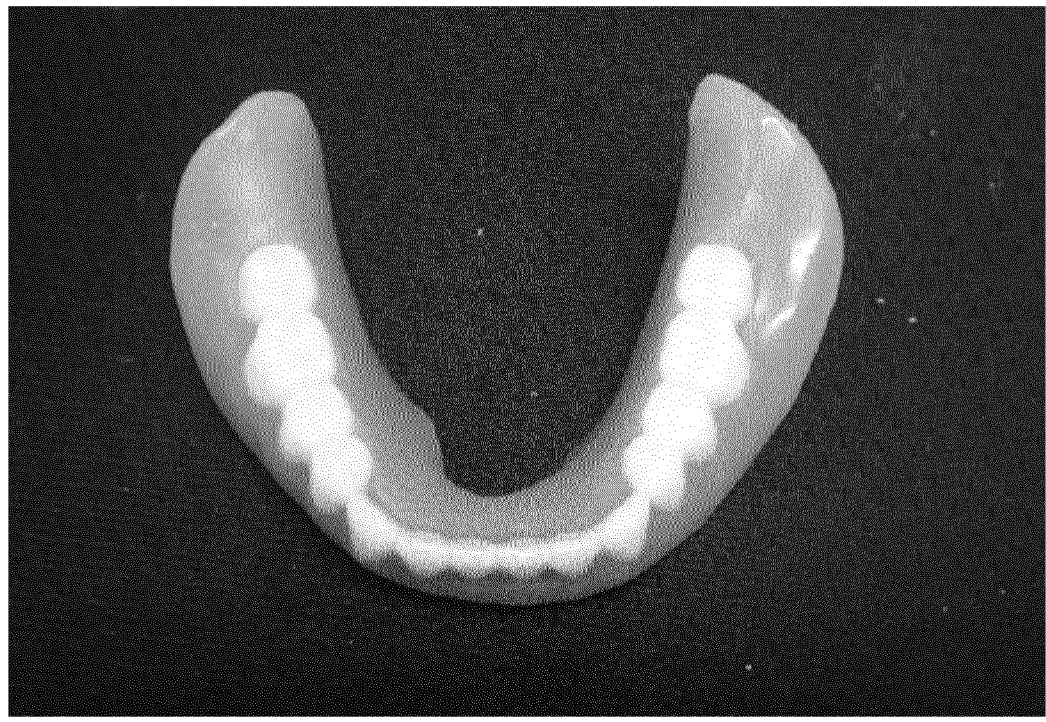
FIG. 48 is a photograph of a single ready-made artificial tooth adhesive type denture in which a metal reinforcement wire is embedded immediately below anterior teeth part, in comparative example 1, captured from above.
Figure 49:
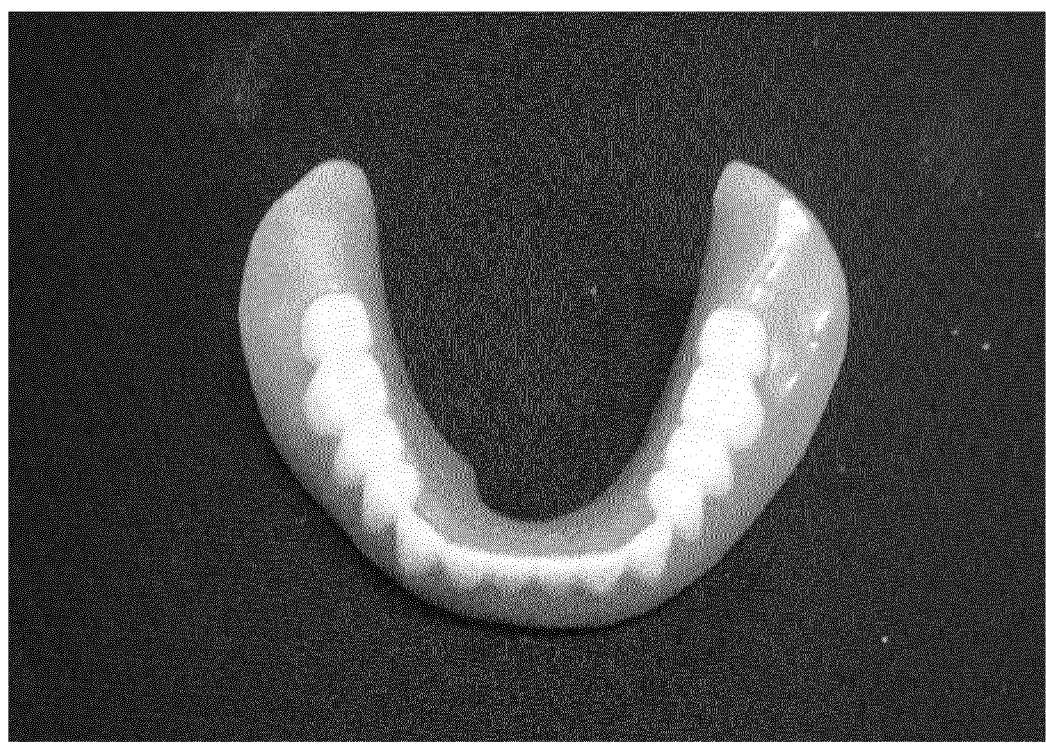
FIG. 49 is a photograph of a single ready-made artificial tooth adhesive type denture in which a metal reinforcement wire is embedded in a lingual polish surface, in comparative example 1, captured from above.
Figure 50:
FIG. 50 is a photograph of a single ready-made artificial tooth adhesive type denture in example 1 captured from above.

The single ready-made artificial tooth adhesive type denture created on the basis of the denture base data 100 of example 1 is reinforced with the adhesive of the gingival color, and thus has an advantage that aesthetics is not impaired as compared with a case where a reinforcing material such as metal is embedded. A single ready-made artificial tooth adhesive type mandibular denture in which a metal reinforcement wire was not embedded in comparative example 1, a single ready-made artificial tooth adhesive type mandibular denture in which a metal reinforcement wire was embedded immediately below the anterior teeth part in comparative example 1, a single ready-made artificial tooth adhesive type mandibular denture in which a metal reinforcement wire was embedded in the lingual polish surface in comparative example 1, and a single ready-made artificial tooth adhesive type mandibular denture in example 1 were produced, and images were acquired. FIG. 47 illustrates an image of the single ready-made artificial tooth adhesive type mandibular denture in which a metal reinforcement wire is not embedded in comparative example 1. FIG. 48 illustrates an image of the single ready-made artificial tooth adhesive type mandibular denture in which the metal reinforcement wire is embedded immediately below the anterior teeth part in comparative example 1. FIG. 49 illustrates an image of the single ready-made artificial tooth adhesive type mandibular denture in which the metal reinforcement wire is embedded in the lingual polish surface in comparative example 1. FIG. 50 illustrates an image of the single ready-made artificial tooth adhesive type mandibular denture in example 1. As illustrated in FIGS. 47 to 49, it was confirmed that the portion in which the metal reinforcement wire was embedded in comparative example 1 was blackened as the metal color was seen through the denture base. On the other hand, as illustrated in FIGS. 48 and 50, it was confirmed that the single ready-made artificial tooth adhesive type mandibular denture in example 1 had the same aesthetics as that of the single ready-made artificial tooth adhesive type mandibular denture in which the metal reinforcement wire was not embedded in comparative example 1. The present disclosure is also considered to be useful from the viewpoint of aesthetics.

It should be noted that, in this description, the terms such as “first” and “second” are used for explanation, and should not be understood as something explicitly or implicitly presenting relative importance or a rank of technical features. Features limited to “first” and “second” are intended to explicitly or implicitly present the inclusion of one or more such features.

Although the present disclosure has been described in each embodiment with a certain degree of detail, the disclosure content of these should change in details of the configuration, and the combination of elements and the change in order in each embodiment can be implemented without departing from the scope and spirit of the claimed present invention.

General and specific aspects of the present disclosure may be implemented by a system, a method, a computer program, a computer-readable recording medium, and a combination thereof.

Outline of Embodiment (1) A denture base of the present disclosure includes: a base main body; and a plurality of sockets provided in the base main body and having a concave shape, in which the plurality of sockets are provided along a shape of the base main body, the base main body includes a socket partition wall provided between adjacent sockets among the plurality of sockets, the socket partition wall is provided with a groove that communicates with the adjacent sockets each other, and the plurality of sockets communicate with each other through the groove.

(2) In the denture base of (1), the base main body may have a dental arch shape. The plurality of sockets may include, on each of both left and right sides of the base main body with respect to a center line, a first socket provided near the center line of the base main body, a second socket provided on a distal side of the base main body relative to the first socket, a third socket provided on a distal side of the base main body relative to the second socket, a fourth socket provided on a distal side of the base main body relative to the third socket, a fifth socket provided on a distal side of the base main body relative to the fourth socket, a sixth socket provided on a distal side of the base main body relative to the fifth socket, and a seventh socket provided on a distal side of the base main body relative to the sixth socket. The socket partition wall may include a first socket partition wall provided between two of the first sockets provided across the center line of the base main body, a second socket partition wall provided between the first socket and the second socket on each of both the left and right sides of the base main body, a third socket partition wall provided between the second socket and the third socket on each of both the left and right sides of the base main body, a fourth socket partition wall provided between the third socket and the fourth socket on each of both the left and right sides of the base main body, a fifth socket partition wall provided between the fourth socket and the fifth socket on each of both the left and right sides of the base main body, a sixth socket partition wall provided between the fifth socket and the sixth socket on each of both the left and right sides of the base main body, and a seventh socket partition wall provided between the sixth socket and the seventh socket on each of both the left and right sides of the base main body. The groove may include a first groove provided in the first socket partition wall and allowing adjacent two of the first sockets, a second groove provided in the second socket partition wall and allowing the first socket and the second socket to communicate with each other, a third groove provided in the third socket partition wall and allowing the second socket and the third socket to communicate with each other, a fourth groove provided in the fourth socket partition wall and allowing the third socket and the fourth socket to communicate with each other, a fifth groove provided in the fifth socket partition wall and allowing the fourth socket and the fifth socket to communicate with each other, a sixth groove provided in the sixth socket partition wall and allowing the fifth socket and the sixth socket to communicate with each other, and a seventh groove provided in the seventh socket partition wall and allowing the sixth socket and the seventh socket to communicate with each other The first to seventh sockets may communicate with one another through the first to seventh grooves.

(3) In the denture base of (2), depths of the first to third grooves may be larger than depths of the fourth to seventh grooves.

(4) In the denture base of (2) or (3), widths of the fourth to seventh grooves may be larger than widths of the first to third grooves.

(5) In the denture base of any one of (2) to (4), a depth of the third groove may be larger than depths of the first and second grooves.

(6) In the denture base of any one of (1) to (5), the groove may be defined by a bottom and two side walls extending from the bottom and facing each other. In a depth direction of the groove, the two side walls define an opening of the groove, and the opening of the groove may be larger than the bottom of the groove.

(7) In the denture base of (6), the two side walls may have inclined walls inclined in a direction of increasing a distance between the two side walls from the bottom of the groove toward the opening.

(8) In the denture base of any one of (1) to (7), a thickness of the socket partition wall may decrease toward the groove.

(9) In the denture base of (1), the plurality of sockets may include adjacent two or more sockets from among a first socket in which an artificial tooth of a central incisor is disposed, a second socket in which an artificial tooth of a lateral incisor is disposed, a third socket in which an artificial tooth of a canine tooth is disposed, a fourth socket in which an artificial tooth of a first premolar is disposed, a fifth socket in which an artificial tooth of a second premolar is disposed, a sixth socket in which an artificial tooth of a first molar is disposed, and a seventh socket in which an artificial tooth of a second molar is disposed.

(10) A plate denture of the present disclosure includes: the denture base of any one of (1) to (9); a plurality of artificial teeth arranged in the plurality of sockets of the denture base; and an adhesive that is continuously disposed on the plurality of sockets via the groove and bonds the plurality of artificial teeth and the denture base.

(11) In the plate denture of (10), the adhesive may bond adjacent artificial teeth via the groove.

(12) In the plate denture of (10) or (11), the adhesive may be a dental resin.

(13) In the plate denture of any one of (10) to (12), the plurality of artificial teeth may include a plurality of artificial teeth independent of one another, the artificial teeth being selected from a central incisor, a lateral incisor, a canine tooth, a first premolar, a second premolar, a first molar, or a second molar.

(14) A manufacturing method for a denture base of the present disclosure is a manufacturing method for a denture base to be executed by a computer, the method including: acquiring intraoral scan data; arranging, in the scan data, virtual artificial tooth data including a plurality of interconnected virtual artificial teeth; and creating denture base data by forming a virtual gingiva portion on a basis of the scan data in which the virtual artificial tooth data is arranged, The denture base data includes: a base main body; and a plurality of sockets provided in the base main body and having a concave shape, in which the plurality of sockets are provided along a shape of the base main body, the base main body includes a socket partition wall provided between adjacent sockets among the plurality of sockets, the socket partition wall is provided with a groove that communicates with the adjacent sockets each other, and the plurality of sockets communicate with each other through the groove.

(15) In the manufacturing method for a denture base of (14), the virtual artificial tooth data may further include a coupling part that couples adjacent virtual artificial teeth from among the plurality of virtual artificial teeth The creating the denture base data may include forming the virtual gingiva portion along an outer shape of the coupling part between the adjacent virtual artificial teeth.

(16) The manufacturing method for a denture base of (14) or (15) may further include producing a denture base by a 3D printer on the basis of the denture base data.

(17) A manufacturing method for a plate denture includes: applying an adhesive to the plurality of sockets of the denture base produced by the manufacturing method for a denture base of any one of (14) to (16); and arranging a plurality of artificial teeth on the plurality of sockets to which the adhesive is applied.

(18) In the manufacturing method for a plate denture of (17), the arranging the plurality of artificial teeth may include bonding the plurality of artificial teeth and the denture base by the adhesive continuously arranged on the plurality of sockets via the groove.

(19) In the manufacturing method for a plate denture of (17) or (18), the arranging the plurality of artificial teeth may include bonding adjacent artificial teeth by the adhesive disposed in the groove.

(20) A program of the present disclosure causes a computer to execute the method of any one of (14) to (19).

(21) A computer-readable storage medium of the present disclosure stores a program for causing a computer to execute the method of any one of (14) to (19).

The denture base and the manufacturing method for the same according to the present disclosure are useful for improving the quality of the denture.

What is claimed is:

1. A denture base comprising:

a base main body; and a plurality of sockets provided in the base main body and each having a concave shape, the plurality of sockets being arranged along a longitudinal extent of the base main body, wherein the base main body includes a plurality of socket partition walls, a respective one of the socket partition walls being provided between each pair of adjacent sockets among the plurality of sockets, each of the socket partition walls having a groove configured to allow each pair of the adjacent sockets to communicate with each other such that each pair of adjacent sockets of the plurality of sockets communicate with each other through the respective groove of one of the socket partition walls, and wherein a bottom surface of the groove of each of the plurality of socket partition walls is higher in a depth direction than the bottom surface of each of the pair of adjacent sockets.

2. The denture base according to claim 1, wherein:

the base main body has a dental arch shape, the plurality of sockets include, on each of both left and right sides of the base main body with respect to a center line;

a first socket provided at the center line of the base main body, a second socket on a distal side of the base main body relative to the first socket, a third socket on a distal side of the base main body relative to the second socket, a fourth socket on a distal side of the base main body relative to the third socket, a fifth socket on a distal side of the base main body relative to the fourth socket, a sixth socket on a distal side of the base main body relative to the fifth socket, and a seventh socket on a distal side of the base main body relative to the sixth socket, the plurality of socket partition walls include:

a first socket partition wall between two of the first sockets provided across the center line of the base main body, a second socket partition wall between the first socket and the second socket on each of both the left and right sides of the base main body, a third socket partition wall between the second socket and the third socket on each of both the left and right sides of the base main body, a fourth socket partition wall between the third socket and the fourth socket on each of both the left and right sides of the base main body, a fifth socket partition wall between the fourth socket and the fifth socket on each of both the left and right sides of the base main body, a sixth socket partition wall between the fifth socket and the sixth socket on each of both the left and right sides of the base main body, and a seventh socket partition wall between the sixth socket and the seventh socket on each of both the left and right sides of the base main body, the groove of each of the plurality of socket partition walls includes;

a first groove in the first socket partition wall and allowing adjacent two of the first sockets to communicate with each other, a second groove in the second socket partition wall and allowing the first socket and the second socket to communicate with each other, a third groove in the third socket partition wall and allowing the second socket and the third socket to communicate with each other, a fourth groove in the fourth socket partition wall and allowing the third socket and the fourth socket to communicate with each other, a fifth groove in the fifth socket partition wall and allowing the fourth socket and the fifth socket to communicate with each other, a sixth groove in the sixth socket partition wall and allowing the fifth socket and the sixth socket to communicate with each other, and a seventh groove in the seventh socket partition wall and allowing the sixth socket and the seventh socket to communicate with each other, and the first to seventh sockets communicate with one another through the first to seventh grooves.

3. The denture base according to claim 2, wherein depths of the first to third grooves are larger than depths of the fourth to seventh grooves.

4. The denture base according to claim 3, wherein a depth of the third groove is larger than depths of the first and second grooves.

5. The denture base according to claim 2, wherein widths of the fourth to seventh grooves are larger than widths of the first to third grooves.

6. The denture base according to claim 1, wherein:

the groove of each of the plurality of socket partition walls is defined by a bottom and two side walls extending from the bottom and facing each other, in a depth direction of the groove of each of the plurality of socket partition walls, the two side walls define an opening of the respective groove, and the opening of the respective groove is larger than the bottom of the groove.

7. The denture base according to claim 6, wherein the two side walls have inclined walls inclined in a direction of increasing a distance between the two side walls from the bottom of the groove toward the opening.

8. The denture base according to claim 1, wherein a thickness of the socket partition wall decreases toward the groove.

9. The denture base according to claim 1, wherein the plurality of sockets include adjacent two or more sockets from among:

a first socket configured to receive an artificial tooth of a central incisor, a second socket configured to receive an artificial tooth of a lateral incisor, a third socket configured to receive an artificial tooth of a canine tooth, a fourth socket configured to receive an artificial tooth of a first premolar, a fifth socket configured to receive an artificial tooth of a second premolar, a sixth socket configured to receive an artificial tooth of a first molar, and a seventh socket configured to receive an artificial tooth of a second molar.

10. A plate denture comprising:

the denture base according to claim 1;

a plurality of artificial teeth arranged in the plurality of sockets of the denture base; and an adhesive continuously disposed on the plurality of sockets via the groove to bond the plurality of artificial teeth and the denture base.

11. The plate denture according to claim 10, wherein the adhesive bonds adjacent artificial teeth via the groove.

12. The plate denture according to claim 10, wherein the adhesive is a dental resin.

13. The plate denture according to claim 10, wherein the plurality of artificial teeth include a plurality of artificial teeth independent of one another, the artificial teeth being selected from a central incisor, a lateral incisor, a canine tooth, a first premolar, a second premolar, a first molar, or a second molar.

* * * * *